US012668304B2

(12) United States Patent
Lyzen et al.

(10) Patent No.: US 12,668,304 B2
(45) Date of Patent: Jun. 30, 2026

(54) CORRECTION OF REAL TIME KINEMATICS POSITION LOCATION DATA FOR SEMI-AUTOMATED STEERING OF A POWER EQUIPMENT DEVICE

(71) Applicant: MTD PRODUCTS INC, Valley City, OH (US)

(72) Inventors: Zachary A. Lyzen, Seattle, WA (US); Adam J. Woodrum, Wakeman, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 18/510,291

(22) Filed: Nov. 15, 2023

(65) Prior Publication Data

US 2024/0140528 A1 May 2, 2024

Related U.S. Application Data

(60) Division of application No. 18/132,809, filed on Apr. 10, 2023, now Pat. No. 12,269,528, which is a
(Continued)

(51) Int. Cl.
B62D 15/02 (2006.01)
B60W 30/18 (2012.01)
(Continued)

(52) U.S. Cl.
CPC ..... B62D 15/021 (2013.01); B60W 30/18172 (2013.01); G01C 21/3461 (2013.01);
(Continued)

(58) Field of Classification Search
CPC .......... B62D 15/021; B60W 30/18172; G01C 21/3461; G01C 21/3469; G01S 13/931;
(Continued)

(56) References Cited

U.S. PATENT DOCUMENTS 6,272,405 B1 * 8/2001 Kubota ................ G05D 1/0265
701/472
7,313,404 B2 12/2007 Anderson
(Continued)

FOREIGN PATENT DOCUMENTS

CN        112697140        4/2021
CN        113326800        8/2021
(Continued)

OTHER PUBLICATIONS

International Preliminary Report on Patentability for International Patent Application No. PCT/US2020/049962 dated Mar. 9, 2022 (20 pages long).
(Continued)

*Primary Examiner* — Christopher George Fees
(74) *Attorney, Agent, or Firm* — Wegman Hessler

(57) ABSTRACT

An automated steering device is provided usable in conjunction with power equipment machines. By way of example, the automated steering device can provide user-assisted steering for a power equipment machine to maintain tight parallel paths. The user-assisted steering can be defined relative to an initial vector traversed through user directed operation of the power equipment machine, independent of or at least in part independent of a predefined area of operation for the power equipment machine. Position location data refined by local terrestrial positioning system correction devices, or onboard rotational correction devices can be provided to obtain high positioning accuracy, and minimal path deviation. As a result, highly accurate pathing can be provided by way of the disclosed automated steering devices.

20 Claims, 41 Drawing Sheets

Related U.S. Application Data continuation of application No. 17/016,022, filed on Sep. 9, 2020, now Pat. No. 11,623,689.

(60) Provisional application No. 62/966,139, filed on Jan. 27, 2020, provisional application No. 62/897,684, filed on Sep. 9, 2019.

(51) Int. Cl.

| | |
|---|---|
| *G01C 21/34* | (2006.01) |
| *G01S 13/931* | (2020.01) |
| *H04W 4/40* | (2018.01) |

(52) U.S. Cl.
CPC ........ *G01C 21/3469* (2013.01); *G01S 13/931* (2013.01); *H04W 4/40* (2018.02); *G01S 2013/9316* (2020.01); *G01S 2013/932* (2020.01)

(58) Field of Classification Search
CPC ...... G01S 2013/9316; G01S 2013/932; H04W 4/40

See application file for complete search history.

(56) References Cited

U.S. PATENT DOCUMENTS

| | | | | |
|---|---|---|---|---|
| 8,604,972 | B2 * | 12/2013 | Miyake | G01S 19/43 |
| | | | | 342/357.26 |
| 8,639,416 | B2 * | 1/2014 | Jones | G01S 19/04 |
| | | | | 701/41 |
| 9,273,966 | B2 * | 3/2016 | Bartels | G01C 21/12 |
| 9,448,561 | B2 | 9/2016 | Fujimoto et al. | |
| 9,538,706 | B2 | 1/2017 | Haun | |
| 9,562,975 | B2 * | 2/2017 | Vollath | G01S 19/42 |
| 9,645,250 | B2 | 5/2017 | Zeng et al. | |
| 10,139,835 | B2 | 11/2018 | Hitosugi et al. | |
| 10,222,484 | B2 * | 3/2019 | Dai | G01S 19/32 |
| 10,234,566 | B2 * | 3/2019 | Wilson | G01S 19/44 |
| 10,266,201 | B2 | 4/2019 | Dang et al. | |
| 10,324,195 | B2 * | 6/2019 | Garin | G01S 19/485 |
| 10,605,926 | B2 * | 3/2020 | Lie | G01S 19/426 |
| 10,768,309 | B1 | 9/2020 | Alexander | |
| 10,784,841 | B2 | 9/2020 | Berkemeier et al. | |
| 10,809,726 | B2 | 10/2020 | Kong et al. | |
| 10,816,675 | B2 * | 10/2020 | Yoshino | G01S 19/49 |
| 10,822,017 | B2 | 11/2020 | Tan et al. | |
| 10,836,426 | B1 | 11/2020 | Busboom et al. | |
| 10,890,922 | B2 | 1/2021 | Ramm et al. | |
| 10,969,226 | B1 | 4/2021 | Jankowski et al. | |
| 11,008,731 | B2 | 5/2021 | Hoshino et al. | |
| 11,014,569 | B2 | 5/2021 | Ghasemalizadeh et al. | |
| 11,187,812 | B2 * | 11/2021 | Yamazaki | G01S 19/43 |
| 11,372,114 | B2 * | 6/2022 | Carcanague | G01S 19/52 |
| 11,780,499 | B2 | 10/2023 | Kobayashi et al. | |
| 2003/0016147 | A1 | 1/2003 | Evans | |
| 2007/0095040 | A1 | 5/2007 | Berkeley | |
| 2011/0248462 | A1 | 10/2011 | Schaedler et al. | |
| 2012/0215410 | A1 | 8/2012 | McClure et al. | |
| 2013/0041549 | A1 | 2/2013 | Reeve et al. | |
| 2013/0325242 | A1 | 12/2013 | Cavender-Bares et al. | |
| 2014/0168009 | A1 | 6/2014 | Peake | |
| 2015/0369924 | A1 * | 12/2015 | Hedgecock | G01S 19/51 |
| | | | | 342/357.34 |
| 2016/0366815 | A1 | 12/2016 | Guyette et al. | |
| 2017/0102702 | A1 | 4/2017 | Ishijima et al. | |
| 2017/0177002 | A1 | 6/2017 | Ogura et al. | |
| 2017/0219715 | A1 * | 8/2017 | Ashjaee | G01S 19/09 |
| 2017/0299730 | A1 * | 10/2017 | Lie | G01S 19/426 |
| 2018/0039284 | A1 * | 2/2018 | Hitosugi | B62D 6/001 |
| 2018/0321682 | A1 | 11/2018 | Matsumoto et al. | |
| 2019/0031237 | A1 | 1/2019 | Wang et al. | |
| 2019/0369620 | A1 | 12/2019 | Zhou et al. | |
| 2020/0088521 | A1 | 3/2020 | Glevarec et al. | |
| 2020/0251809 | A1 | 8/2020 | Hanada | |
| 2020/0292714 | A1 * | 9/2020 | Yoshino | G01S 19/52 |
| 2020/0400430 | A1 | 12/2020 | Kim | |
| 2021/0016511 | A1 | 1/2021 | Yamazaki | |
| 2021/0070356 | A1 | 3/2021 | Lyzen et al. | |
| 2021/0311488 | A1 | 10/2021 | Kurogi | |
| 2021/0370958 | A1 | 12/2021 | Moshchuk et al. | |

FOREIGN PATENT DOCUMENTS

| | | |
|---|---|---|
| CN | 113514806 | 10/2021 |
| CN | 113405555 | 11/2021 |
| EP | 1964458 A1 | 9/2008 |
| JP | 6891135 | 6/2021 |
| JP | 6902990 | 7/2021 |
| WO | 2020/0044726 | 3/2020 |
| WO | 2020/099555 | 5/2020 |
| WO | 2021/059107 | 4/2021 |
| WO | 2022/029878 | 2/2022 |

OTHER PUBLICATIONS

Communication pursuant to Rules 161 (1) and 162 EPC for European Patent Application No. 20785617.0 dated Apr. 21, 2022 (3 pages long).

He Bo, "Precise navigation for a 4WS mobile robot", Journal of Zhejiang University Science A., Zhejiang University Press, CN, vol. 7, No. 2, Feb. 1, 2006, pp. 185-193.

International Search Report and Written Opinion for International Application No. PCT/US2020/049962 dated Apr. 19, 2021, (26 pages long).

Invitation to Pay Additional Fees for international application No. PCT/US2020/049962 dated Dec. 22, 2020 (12 pages long).

Non-Final Office Action for U.S. Appl. No. 17/016,022 dated Apr. 27, 2022 (72 pages long).

Notice of Allowance for U.S. Appl. No. 17/016,022 dated Dec. 1, 2022 (17 pages long).

Kevin W. Hall, et al., "GPS accuracy part: RTK float versus RTK fixed", CREWES Research Report—vol. 22 (2010), 8 pages long.

Extended European Search report for EP Application No. 24206869.0-1201, dated Dec. 13, 2024.

* cited by examiner

CONTROL MODULE ARCHITECTURE FOR
POWER EQUIPMENT
200

Figure 3:
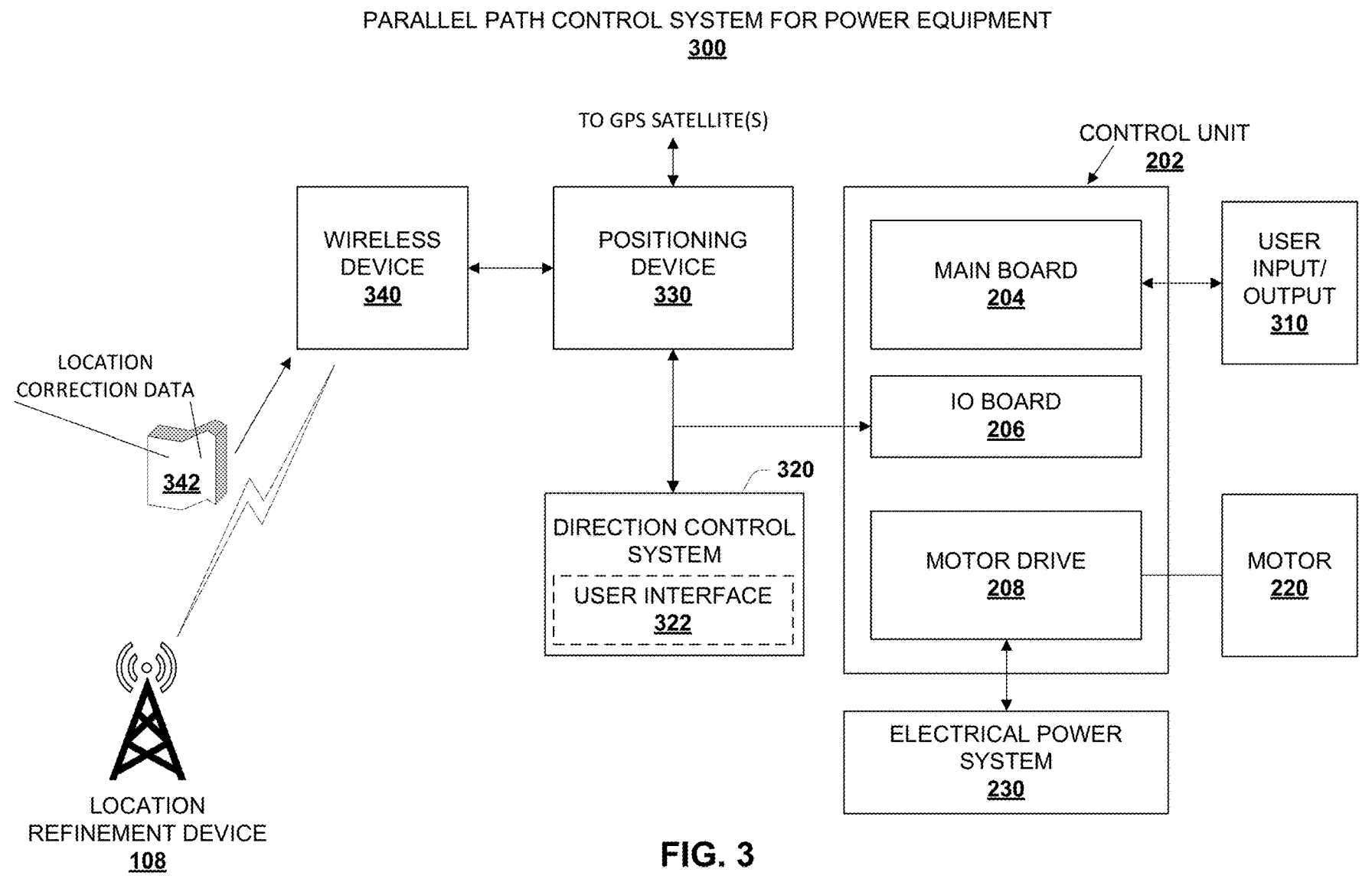

PARALLEL PATH CONTROL SYSTEM FOR POWER EQUIPMENT
300

CONTROL UNIT
202

USER INPUT/OUTPUT
310

MOTOR
220

MAIN BOARD
204

IO BOARD
206

MOTOR DRIVE
208

ELECTRICAL POWER SYSTEM
230

320

POSITIONING DEVICE
330

TO GPS SATELLITE(S)

DIRECTION CONTROL SYSTEM

USER INTERFACE
322

WIRELESS DEVICE
340

LOCATION CORRECTION DATA

342

LOCATION REFINEMENT DEVICE
108

EXAMPLE PARALLEL PATH ROUTING
600

POWER EQUIPMENT DEVICE WITH CONTINUOUS TURN FOR PARALLEL MOWING
700

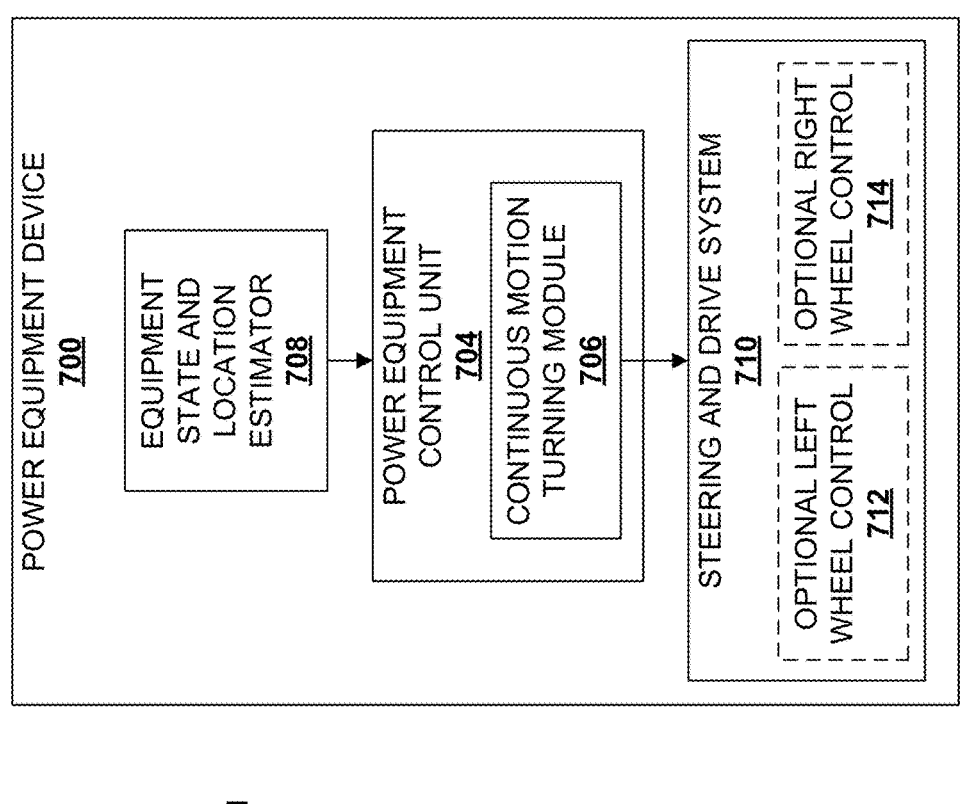

POWER EQUIPMENT DEVICE
700

EQUIPMENT STATE AND LOCATION ESTIMATOR
708

POWER EQUIPMENT CONTROL UNIT
704

CONTINUOUS MOTION TURNING MODULE
706

STEERING AND DRIVE SYSTEM
710

OPTIONAL LEFT WHEEL CONTROL
712

OPTIONAL RIGHT WHEEL CONTROL
714

728

OUTER TURN PATH
722

INNER TURN PATH
724

CENTER OF TURN
726

TARGET OVERLAP
732

WIDTH OF WORK ENGINE
730

Figure 8:
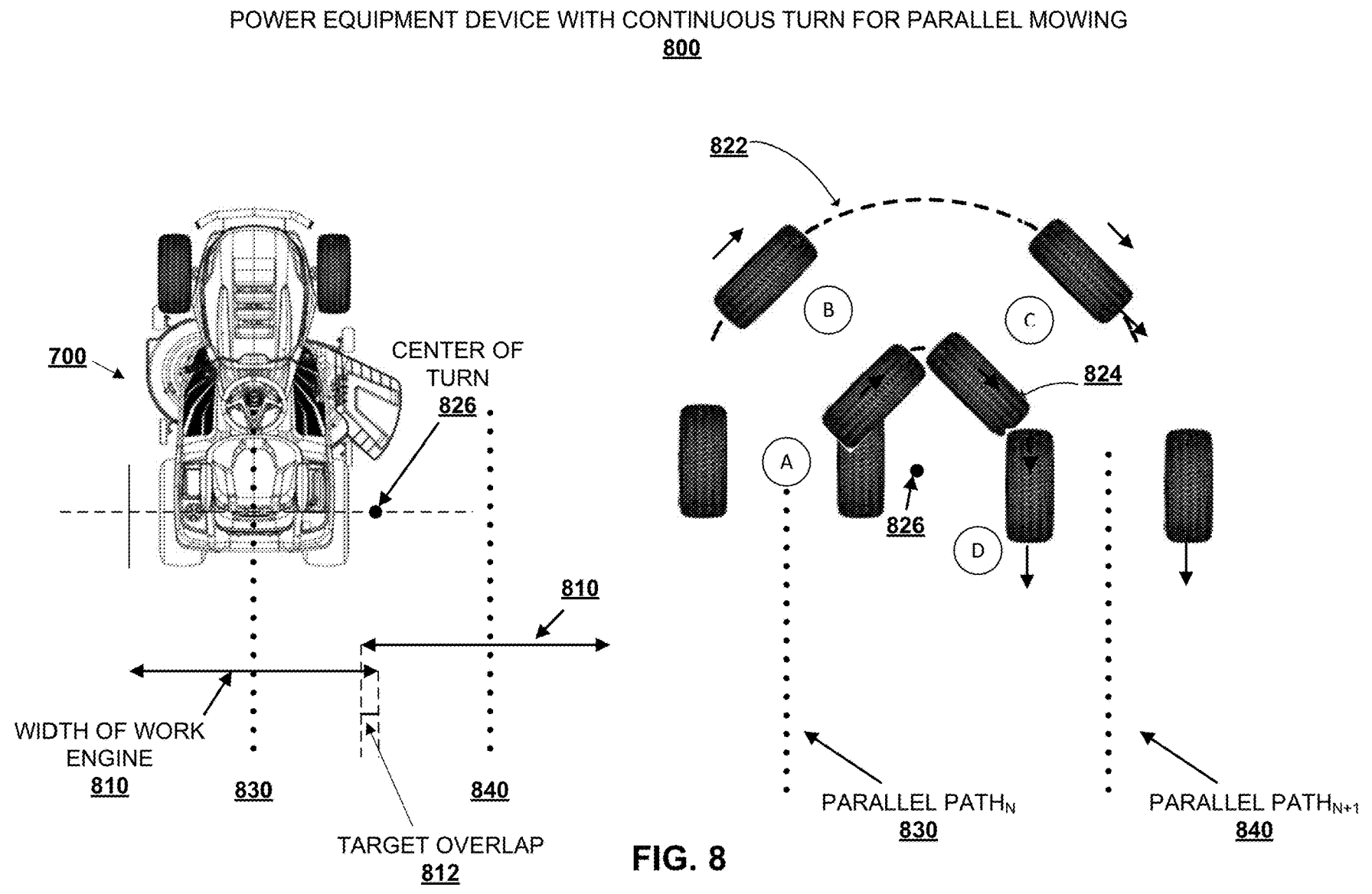

POWER EQUIPMENT DEVICE WITH CONTINUOUS TURN FOR PARALLEL MOWING
800

PARALLEL PATH$_{N+1}$
840

824

C

826

D

PARALLEL PATH$_N$
830

CENTER OF TURN
826

810

840

TARGET OVERLAP
812

830

WIDTH OF WORK ENGINE
810

700

POWER EQUIPMENT DEVICE WITH CONTINUOUS TURN FOR PARALLEL MOWING
800A

EXAMPLE PARALLEL PATH ADJUSTMENT FOR INCLINE SURFACE 900

NORMAL TO INCLINE SURFACE 905

DISPLACEMENT 906

POWER EQUIPMENT DEVICE 902

GRAVITATIONAL CENTER-LINE 908

GYROSCOPE/ INCLINOMETER 910

INCLINE SURFACE 904

ANTENNA LOCATION COMPENSATION (ROLL)
900C

912A

VEHICLE ROLLED RIGHT 'a' DEGREES
902C

'a'

GRAVITY VECTOR
906B

914A

ANTENNA HEIGHT 'h'
920C

PROJECTED ANTENNA POSITION

COMPENSATED ANTENNA POSITION

ACTUAL ANTENNA LOCATION

COMPENSATION DISTANCE 'd$_{(roll)}$'
930C $d_{(roll)} = h*sin(a)$

AXIAL AND LATERAL ANTENNA COMPENSATION
900D

ORIGINAL NON-COMPENSATED POSITION

LATERAL COMPENSATION DISTANCE

AXIAL COMPENSATION DISTANCE

LATERAL AND AXIAL COMPENSATION RESULT

Y+ (N)

X+ (E)

X- (W)

Y- (S)

918D

914D

916D

912D

'a'

VEHICLE HEADING
902D

VEHICLE DIRECTION
904D

FIG. 9G

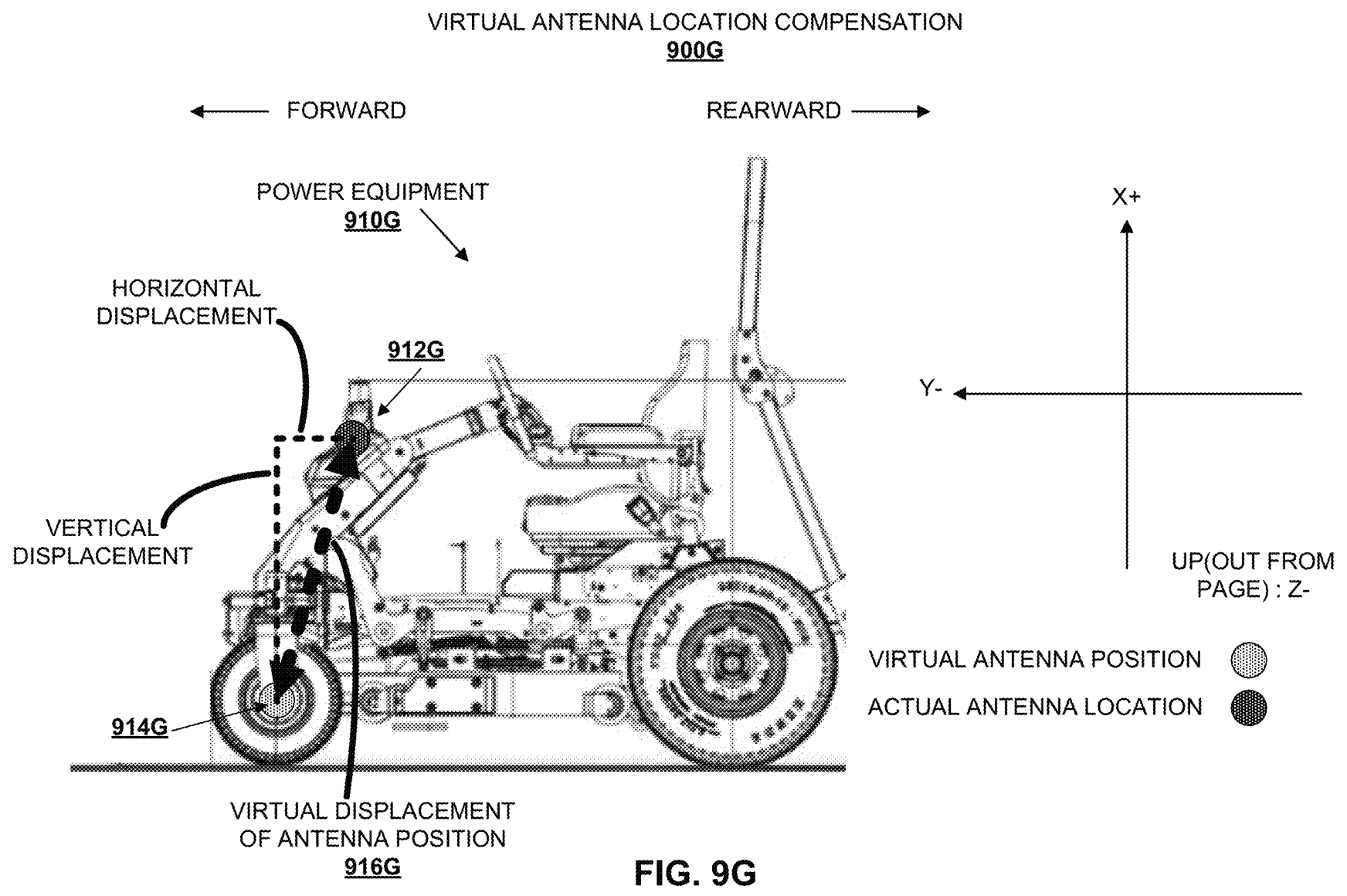

VIRTUAL ANTENNA LOCATION COMPENSATION 900G

UP(OUT FROM PAGE) : Z-

VIRTUAL ANTENNA POSITION

ACTUAL ANTENNA LOCATION

REARWARD

FORWARD

POWER EQUIPMENT 910G

HORIZONTAL DISPLACEMENT

VERTICAL DISPLACEMENT

VIRTUAL DISPLACEMENT OF ANTENNA POSITION 916G

912G

914G

X+

Y-

EXAMPLE PARALLEL PATH ALONG LINEAR BOUNDARY 1000

POWER EQUIPMENT DEVICE 1002

CAMERA 1010

CAMERA 1042

TRIM ARM 1040

MANUFACTURED LINEAR BOUNDARY (e.g., sidewalk, road, etc.) 1030

1020

1015

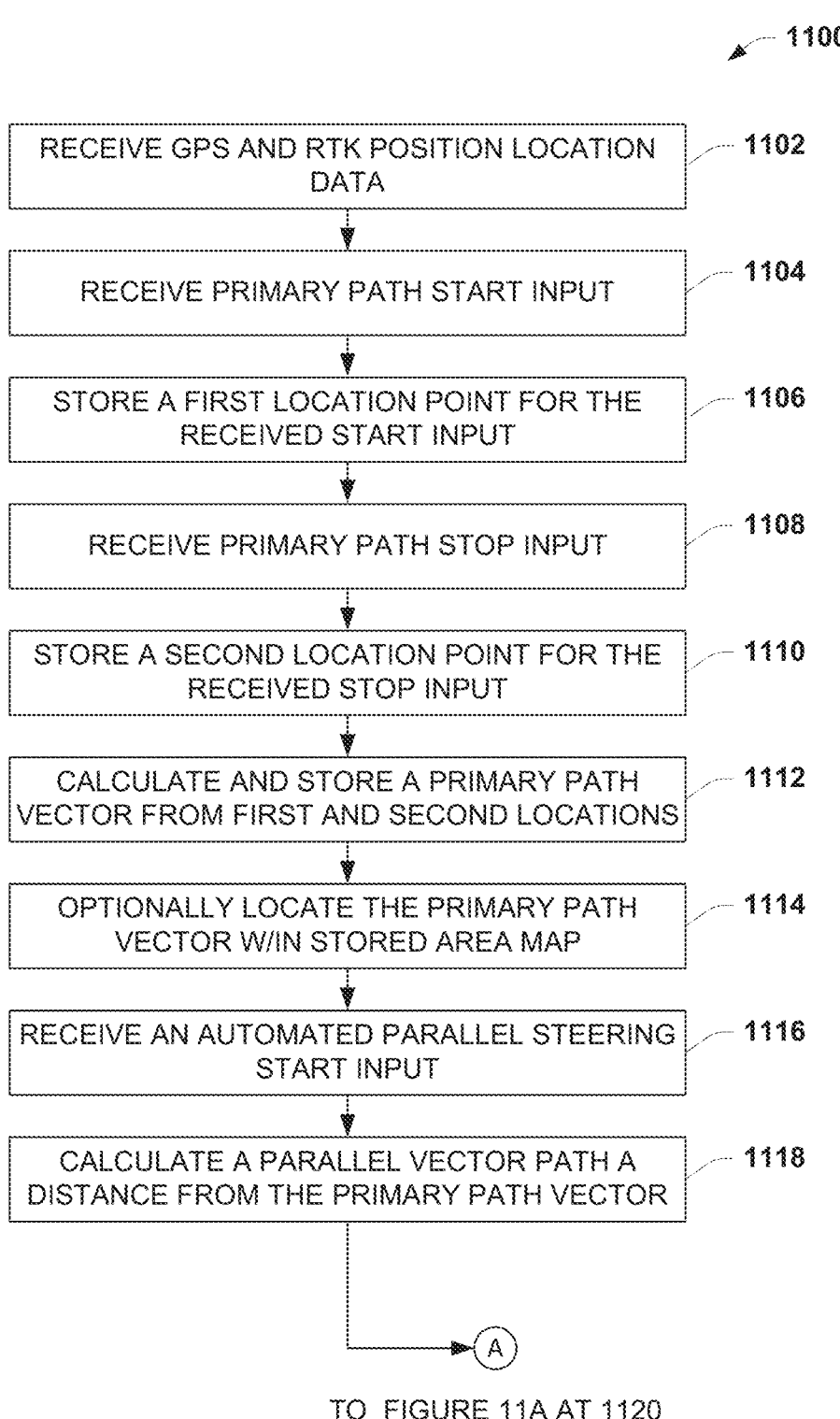

1100

RECEIVE GPS AND RTK POSITION LOCATION DATA — 1102

RECEIVE PRIMARY PATH START INPUT — 1104

STORE A FIRST LOCATION POINT FOR THE RECEIVED START INPUT — 1106

RECEIVE PRIMARY PATH STOP INPUT — 1108

STORE A SECOND LOCATION POINT FOR THE RECEIVED STOP INPUT — 1110

CALCULATE AND STORE A PRIMARY PATH VECTOR FROM FIRST AND SECOND LOCATIONS — 1112

OPTIONALLY LOCATE THE PRIMARY PATH VECTOR W/IN STORED AREA MAP — 1114

RECEIVE AN AUTOMATED PARALLEL STEERING START INPUT — 1116

CALCULATE A PARALLEL VECTOR PATH A DISTANCE FROM THE PRIMARY PATH VECTOR — 1118

EXAMPLE PARALLEL PATHS EXTENDED TO NON-CONTIGUOUS VIRTUAL BOUNDARIES
1300

EXTERIOR BOUNDARY 1202

INTERIOR EXCLUSION ZONE 1204

PARALLEL LINES 1206

AUTO-TURNS 1208

NON-CONTIGUOUS AREA₁ 1310

EXAMPLE PARALLEL LINES 1316

EXTENDED PARALLEL LINES 1316

NON-CONTIGUOUS AREA₂ 1320

EXTENDED PARALLEL LINES 1326

EXAMPLE AUTO-STEER GRAPHICAL USER INTERFACE: LINE LOCKED
1400B

USER CONTROLS 1410

1420

1430

STATUS
RTK STATUS          RTK FIX
HEADING ERROR       91.6
                    DISTANCE FROM LINE    -1.30
                    VELOCITY (MPH)         1.18

STEERING MODE       MANUAL
LINE STATUS         LINE LOCKED

CONTROLS 1432    1434    1436    1438

EXAMPLE AUTO-STEER GRAPHICAL USER INTERFACE: AUTO-STEERING ENGAGED
1400C

USER CONTROLS 1410

LINE-STATUS AND AUTO-TURN INDICATOR 1442D

PARALLEL LINE AND AUTO-TURN COMMAND 1450D

JOYSTICK CONTROL FOR AUTO-STEERING 1400D

GPS INDICATOR 1440D

LEFT TURN COMMAND 1430D

TURN COMMAND INDICATOR 1420D

RIGHT TURN COMMAND 1432D

JOYSTICK GRIP 1410D

JOYSTICK CONTROL FOR AUTO-STEERING 1400E

PRIMARY PATH STATUS INDICATOR 1442E

DRIVER-ASSIST STEERING INDICATOR 1444E

RIGHT TURN COMMAND 1432E

PATH ENGAGEMENT & CLEAR SETTINGS COMMAND 1450E

GPS INDICATOR 1440E

LEFT TURN COMMAND 1430E

JOYSTICK GRIP 1410E

GPS    LINE    AUTO

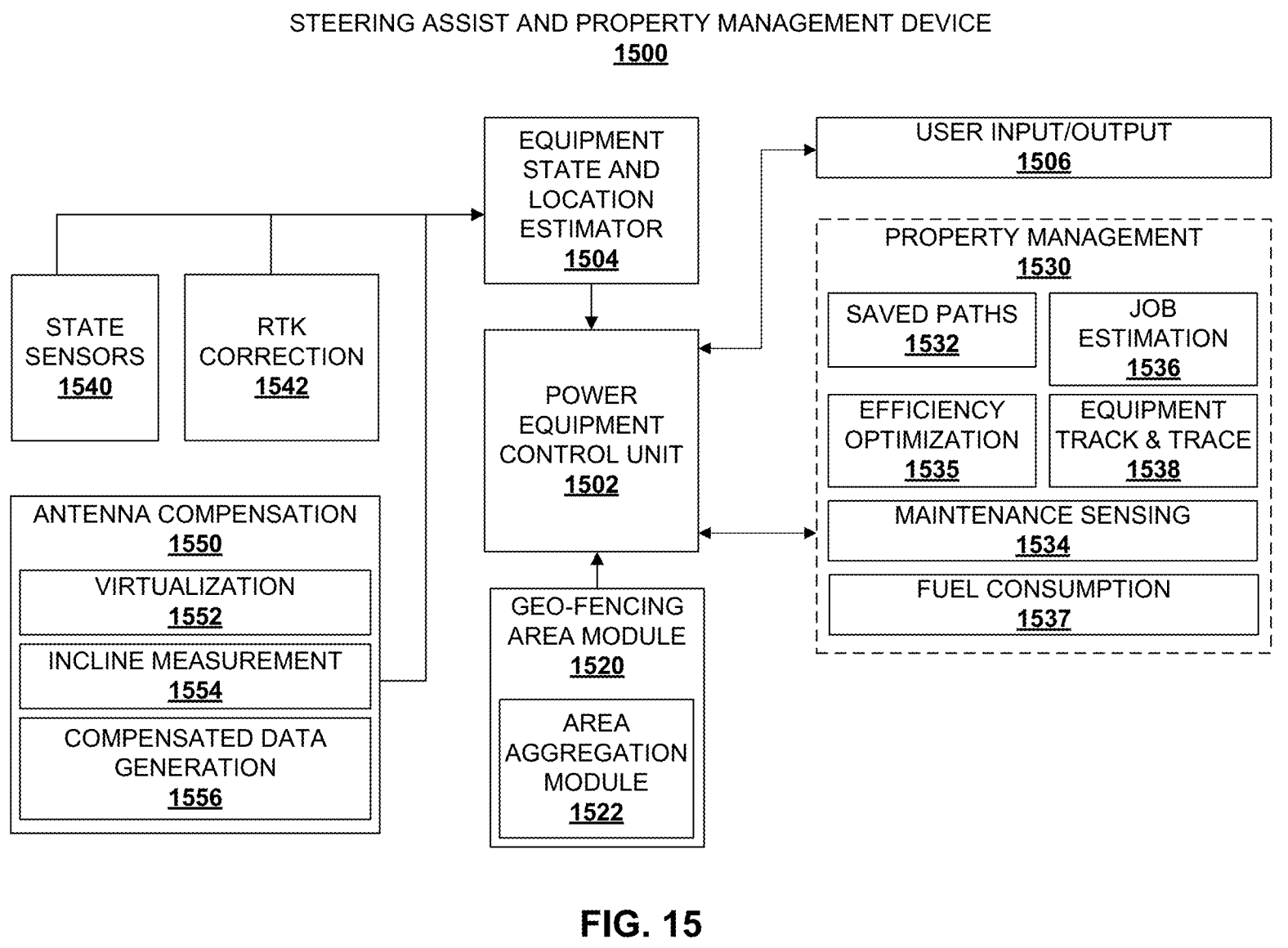

STEERING ASSIST AND PROPERTY MANAGEMENT DEVICE
1500

USER INPUT/OUTPUT
1506

PROPERTY MANAGEMENT
1530

JOB ESTIMATION
1536

EQUIPMENT TRACK & TRACE
1538

SAVED PATHS
1532

EFFICIENCY OPTIMIZATION
1535

MAINTENANCE SENSING
1534

FUEL CONSUMPTION
1537

EQUIPMENT STATE AND LOCATION ESTIMATOR
1504

POWER EQUIPMENT CONTROL UNIT
1502

GEO-FENCING AREA MODULE
1520

AREA AGGREGATION MODULE
1522

STATE SENSORS
1540

RTK CORRECTION
1542

ANTENNA COMPENSATION
1550

VIRTUALIZATION
1552

INCLINE MEASUREMENT
1554

COMPENSATED DATA GENERATION
1556

FIG. 15

CORRECTION OF REAL TIME KINEMATICS POSITION LOCATION DATA FOR SEMI-AUTOMATED STEERING OF A POWER EQUIPMENT DEVICE

CROSS-REFERENCE TO RELATED APPLICATIONS

This present application is a division of U.S. patent application Ser. No. 18/132,809 filed on Apr. 10, 2023, which is a continuation of U.S. patent application Ser. No. 17/016,022 filed on Sep. 9, 2020, which claims the benefit of priority to U.S. Provisional Patent Application No. 62/897,684, filed Sep. 9, 2019 and titled REAL TIME KINEMATICS POWER EQUIPMENT DEVICE WITH AUTO-STEERING, and claims the benefit of priority to U.S. Provisional Patent Application No. 62/966,139, filed Jan. 27, 2020 and titled REAL TIME KINEMATICS POWER EQUIPMENT DEVICE WITH AUTO-STEERING, each of which are hereby incorporated by reference herein in their respective entireties and for all purposes.

INCORPORATION BY REFERENCE

The following are hereby incorporated by reference within the present disclosure in their respective entireties and for all purposes: U.S. Pat. No. 9,409,596 issued Aug. 9, 2016; U.S. Provisional Application No. 60/701,716 filed Jul. 22, 2005; U.S. Provisional Application No. 60/710,231 filed Aug. 22, 2005; U.S. Provisional Application No. 60/731,593 filed Oct. 28, 2005; U.S. Pat. No. 9,944,316 issued Apr. 17, 2018; U.S. Provisional Application No. 61/637,838 filed Apr. 24, 2012, U.S. Provisional Application No. 61/637,842 filed Apr. 24, 2012 and U.S. Provisional Application No. 61/656,9943 filed Jun. 7, 2012.

FIELD OF DISCLOSURE

The disclosed subject matter pertains to apparatuses and methods for improving automated steering control for power equipment, for instance, correcting position location data to improve semi-automated steering of a power equipment device.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Automated vehicle technology has been introduced in test environments in recent years. Many manufacturers have engaged in the effort to produce a reliable, automated driving car and truck. While road vehicles have particular challenges, including differing types of roads and the variance in vehicle density typically observed for the different types of roads, extension of automated driving technology to off-road equipment often presents different challenges. Operator assist systems, for instance, are one category of emerging technologies that are becoming more prevalent for partial automation of off-road vehicle equipment.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Disclosed in various embodiments provided herein is an apparatus for providing automated steering for a power equipment device. As an example, one or more embodiments include user-assisted steering automation to maintain parallel pathing for the power equipment device. Path vectors can be generated and position location data utilized to identify deviations in position of the power equipment device from a current path. Steering adjustment data is generated and provided to an automated steering control unit to correct the deviations in position from the current path, in effect steering the power equipment device along the current path. The position location data can be acquired at a suitable frequency to minimize deviation from a calculated path at speeds commonly employed by the power equipment device.

In some disclosed embodiments, real time kinematic (RTK) terrestrial positioning correction data can be utilized to correct global positioning system (GPS) satellite-based positioning data. RTK-corrected GPS data can facilitate very high position accuracy for the power equipment device, minimizing deviation from calculated path vectors. Accordingly, parallel pathing can be highly accurate, achieving good visual results for a mowing power equipment device, as one example among others.

In still further embodiments, the automated steering can employ continuous wheel rotation (e.g., continuously driven, continuously rolling, or the like) for all front wheels, all rear wheels, or all front and rear wheels of a power equipment device. In applications of turf management (e.g., referring to mowing power equipment or other turf management equipment), continuous wheel rotation can result in visually appealing uniformity of turf, by mitigating or avoiding divots in the turf that result from pivoting about a stationary wheel, rather than maintaining continuous motion of all wheels. Disclosed automated steering systems, by employing continuous wheel rotation while turning or otherwise adjusting steering, can achieve very high visual appeal for turf management applications.

In still further embodiments, automated steering can employ backup positioning or path maintenance in conjunction with RTK-assisted GPS positioning. In some embodiments, optical sensors can be employed to identify motion non-parallel to a current path and utilized to adjust steering of a power equipment device. In further embodiments, optical sensors can be employed to identify a manufactured parallel line external to the power equipment device (e.g., a road, a sidewalk, a concrete path, an edge of a wall, etc.) and monitor distance from the optical sensor to the manufactured parallel line to assist with steering the power equipment device. In still other embodiments, angular rotation of the power equipment device can be monitored and utilized to determine a displacement of a GPS antenna from gravitational axis of the Earth. This displacement can be utilized to further refine positioning data accuracy. In yet other embodiments, parallel pathing can be generated within a user-defined area boundary, to confine autonomous steering to a desired area. Still other alternative or additional embodiments are provided throughout this disclosure.

In a further embodiment, the present disclosure provides an automated steering apparatus for a power equipment device. The automated steering apparatus can include a positioning device configured to wirelessly receive satellite-based location data of the power equipment device and to receive local positioning correction data from a terrestrial transmitter. Further, the positioning device can comprise a processing module to compute corrected location data of the power equipment device by adjusting the satellite-based location data according to the local positioning correction data. Still further, the automated steering apparatus can comprise a direction module configured to utilize the corrected location data calculated by the positioning device and second corrected location data, calculated by the positioning device from second satellite-based location data and from second local positioning correction data at a different time from the corrected location data, to identify a contemporaneous direction of motion of the power equipment device. In addition to the foregoing, the automated steering apparatus can comprise a direction control module configured to compare the contemporaneous direction of motion to a target direction of motion and generate steering adjustment data configured to direct the power equipment device toward a target path of motion. In various embodiments, the automated steering apparatus can also comprise a drive control unit configured to receive the steering adjustment data and activate a steering motor to change a steering apparatus of the power equipment device toward the target path of motion.

In an embodiment(s), the present disclosure provides a method of providing assisted steering for a power equipment device. The method can comprise receiving two or more user input entries on a user input device communicatively coupled to the power equipment device and acquiring respective position location data of the power equipment device for each of the user input entries. In addition, the method can comprise generating a primary path vector through position locations defined by the respective position location data and obtaining stored displacement data. Utilizing the stored displacement data, the method can comprise generating a second path parallel to or approximately parallel to the primary path vector and at a distance from the primary path vector defined by the displacement data. Still further to the foregoing, the method can comprise receiving a third user input on the user input device and acquiring a current position displacement measurement or a direction of motion measurement of the power equipment device in response to receiving the third user input. The method can further comprise determining whether the direction of motion defines an angle greater than ninety degrees from the primary path vector and whether the current displacement measurement exceeds a displacement threshold factor from the primary path vector. In response to determining the direction of motion does define an angle greater than ninety degrees from the primary path vector and does exceed the displacement threshold factor from the primary path vector, the method can comprise engaging automated steering apparatus of the power equipment device to automate steering of the power equipment device onto or along the second path in a direction opposite or approximately opposite the primary path vector.

In a further embodiment, disclosed is a driver-assisted steering apparatus for a power equipment device. The driver-assisted steering apparatus can comprise a location module configured to generate or acquire position location information for the power equipment device. The location module can further comprise a positioning device and an antenna fixed to the power equipment device, the positioning device configured to wirelessly receive satellite-based location data pertaining to the antenna and to wirelessly receive correction data from a stationary transceiver, and a processor configured to compute corrected location data for the antenna at least in part by adjusting the satellite-based location data at least in part with the correction data and generate corrected position data for the antenna. Additionally, the driver-assisted steering apparatus can comprise a path generation module configured to receive a set of user input entries including a first user input entry, and acquire a first corrected position location data from the corrected position data concurrent with receipt of the first user input entry and acquire a second corrected position location data from the corrected position data at a time subsequent to the first user input entry. In addition, the path generation module can be configured to generate primary parallel path data embodied by a first virtual path that intersects the first corrected position location data and the second corrected position location data and generate subsequent path data embodied by a set of virtual paths parallel to or approximately parallel to the first virtual path location at respective integer multiples of a threshold distance from the first virtual path. The driver-assisted steering apparatus can also comprise a direction control module configured to determine a current heading of the power equipment device and determine an offset from a virtual line of the set of virtual lines and generate steering adjustment data configured to direct the power equipment device toward the virtual line and a drive control unit configured to receive the steering adjustment data and activate a steering motor to change a steering apparatus of the power equipment device consistent with the steering adjustment data.

In alternative or additional embodiments, the present disclosure provides a graphic user interface (GUI) for a driver-assisted steering apparatus for a power equipment device. The GUI can comprise an active display configured to render graphical depictions of data display fields and user input command entry fields, and receive user input entry selections at a graphical depiction of a user input command entry field. The data display fields and the user input command entry fields can include: a primary parallel path position entry and acknowledgment field, a positioning system and parallel path status field, a left turn command entry and a right turn command entry. Further, the GUI can comprise a data storage medium for storing instructions pertaining to operations of the graphical user interface and a processor for executing the instructions stored in the data storage medium to perform operations of the driver-assisted steering apparatus. The operations can comprise receiving a first activation of the primary parallel path position entry user input command, and forwarding a first primary parallel path entry to the driver-assisted steering apparatus and receiving a position location acknowledgment from the driver-assisted steering apparatus indicating successful allocation of a first position location data point to the first primary parallel path entry. Moreover, the operations can comprise updating the primary parallel path position entry and acknowledgment field to graphically indicate the successful allocation of the first position location data point and receiving a second activation of the primary parallel path position entry user input command, and forwarding the second primary parallel path entry to the driver-assisted steering apparatus. Still further, the operations can comprise receiving a second position location acknowledgment from the driver-assisted steering apparatus indicating successful allocation of a second position location data point to the second primary parallel path entry and updating the primary parallel path position entry and acknowledgment field to graphically indicate the successful allocation of both the first position location data point and the second position location data point.

In an embodiment, the present application discloses a driver-assisted steering apparatus for a power equipment device, comprising a location module configured to generate or acquire position location information for the power equipment device, including an antenna fixed to the power equipment device for acquiring satellite positioning signals for determining positioning information of the antenna and a processor and a memory for storing instructions that, when executed by the processor perform operations. The operations can comprise: determine a distance between a fixed position of the antenna and a virtual antenna position near a steering axis of the power equipment device, modify the positioning information of the antenna determined from the satellite positioning signals with a variable displacement factor determined from the distance and generate displaced position data for the antenna representative of the virtual antenna position near the steering axis. Further, the driver-assisted steering apparatus can comprise a direction control module configured to determine a current position and a current heading of the power equipment device from the displaced position data and determine a linear or angular offset from a target path stored in a memory, and generate steering adjustment data configured to direct the power equipment device toward the target path and can comprise a drive control unit configured to receive the steering adjustment data and control a steering apparatus of the power equipment device consistent with the steering adjustment data.

According to still further embodiments, the subject disclosure provides a method for correcting real-time kinematic (RTK) global position data for a machine. The method can comprise receiving first real-time kinematic (RTK) position location data for a power equipment device defining a first position location for the power equipment device and acquiring a fix RTK data status for the first RTK position location data. Additionally, the method can comprise receiving second RTK position location data for the power equipment device defining a second position location for the power equipment device, acquiring the fix RTK data status for the second RTK position location data and determining a heading and speed of the power equipment device from the first and second RTK position location data. Still further, the method can comprise receiving third RTK position location data for the power equipment device defining a third position location for the power equipment device and acquiring a float RTK data status for the third RTK position location data. Moreover, the method can comprise extrapolating an expected third position location of the power equipment device from the second RTK position location data, the speed and heading of the power equipment device and time between acquiring the second RTK position location data having the fix RTK data status and acquiring the third RTK position location data having the float RTK data status, and can comprise determining a correction factor at least in part from the expected third position location of the power equipment device and utilizing the correction factor to adjust subsequent RTK position location data for the power equipment device having the float RTK data status. In yet another embodiment, determining the correction factor can further comprise determining a distance vector between the expected third position location and the third RTK position location having the float RTK data status, subtracting the distance vector from the third RTK position location having the float RTK data status and generating corrected third RTK position location data for the power equipment device. Alternatively, or in addition, the method can comprise receiving subsequent RTK position location data defining a subsequent position location for the power equipment device, the subsequent RTK position location data having the fix RTK data status. Still further, the method can comprise terminating the adjusting subsequent RTK position location data for the power equipment device in response to receiving the subsequent RTK position location data having the fix RTK data status in another embodiment.

In alternative or additional embodiments, a method for providing automated steering for a power equipment device is provided. The method can comprise acquiring wireless signals containing position location information and determining position data for the power equipment device, utilizing the position data for determining a position and a heading of the power equipment device and determining a linear or angular displacement between the position and the heading and a target heading associated with a target path of motion stored in a memory. The method can additionally comprise generating steering correction signals for aligning the heading of the power equipment device with the target heading, steering the power equipment device consistent with the steering correction signals and receiving a user input entry to initiate a turn to an adjacent path. Still further, the method can comprise switching heading determinations for the power equipment device from the position data to a localized heading determination device associated with the power equipment device and can comprise initiating a first turn portion changing a direction of the power equipment device from the heading to a threshold angle from the target heading. In alternative or additional embodiments, the method can comprise initiating a second turn portion causing the power equipment device to perform a zero radius turn changing the direction of the power equipment device from the threshold angle to a second threshold angle greater than the threshold angle and less than the target heading, generating additional steering correction signals aligning the direction of the power equipment device with the target heading and initiating a third turn portion steering the power equipment device according to the additional steering correction signals to align the direction of the power equipment device with the target heading. In alternative or additional embodiments, the method can comprise measuring a displacement of the power equipment device following the initiating the third turn portion and returning to utilizing the position data for determining the heading of the power equipment device, and can comprise utilizing the position data and the heading determined from the position data for generating subsequent steering correction signals to maintain the power equipment device along the target heading.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIG. 3 depicts a block diagram of an example RTK-assisted positioning system and direction control device to facilitate automated steering, in an embodiment.

FIG. 5 illustrates a block diagram of an example power equipment device with parallel path assisted steering in still further embodiments.

FIG. 7 illustrates a diagram of parallel path turning utilizing continuous wheel driving turning according to additional embodiments.

FIG. 8 depicts a diagram of alternative continuous wheel turning according to other embodiments of the present disclosure.

FIG. 9G illustrates a diagram of an example antenna virtual displacement for the GPS antenna location of FIG. 9F.

FIGS. 11 and 11A illustrate a flowchart of an example method for providing user-assisted automated steering according to still further disclosed embodiments.

FIG. 15 illustrates a block diagram of an example power equipment device including a steering assist device and property management device, in further embodiments.

Figure 1:
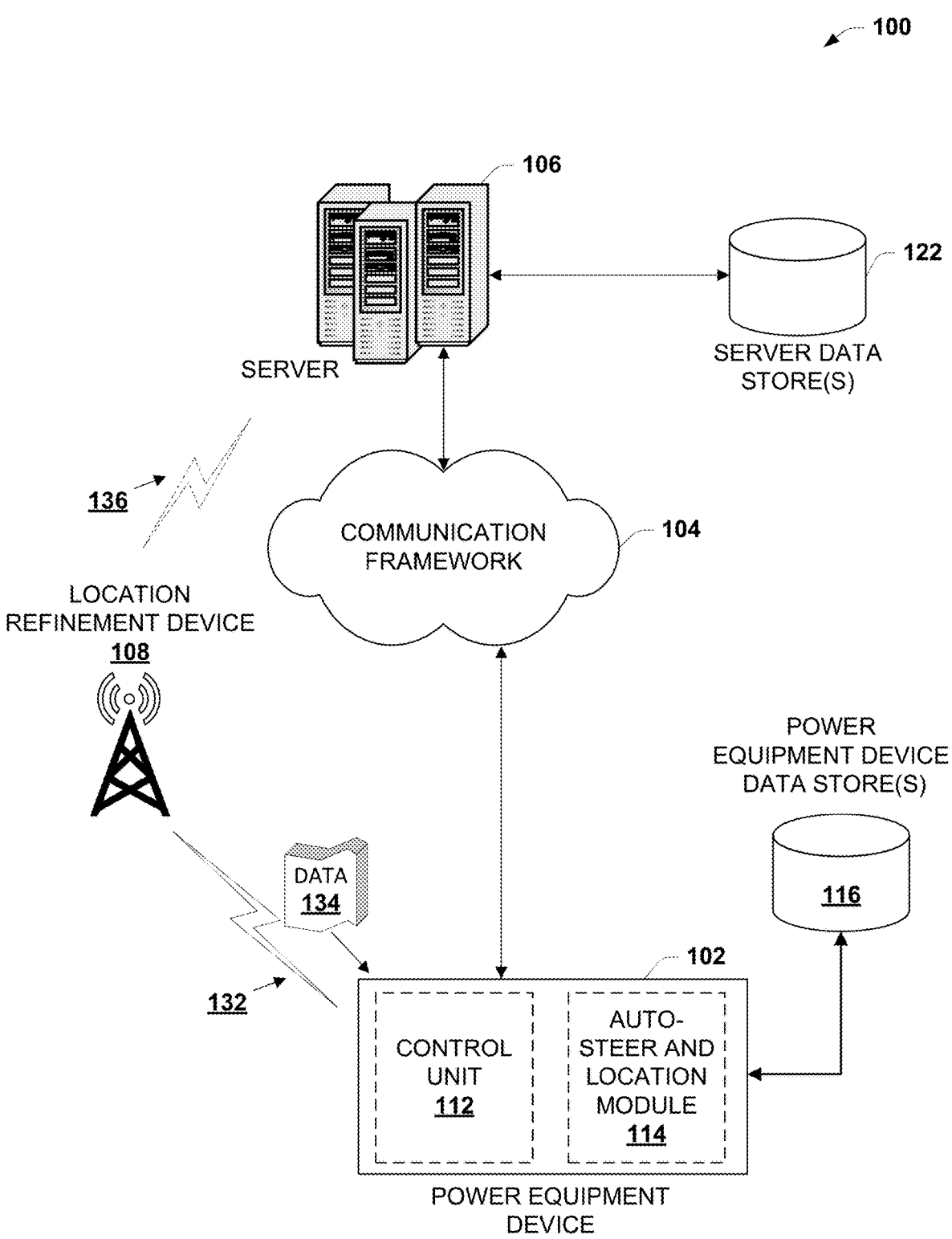
FIG. 1 depicts a block diagram of an example system that provides user-assisted automated steering for a power equipment device, in disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

FIG. 1 illustrates a diagram of an example communication environment 100 for providing position location data for a power equipment device 102, according to one or more embodiments of the present disclosure. Power equipment device 102 can include any suitable power equipment device disclosed herein or known in the art, such as one or more power equipment device(s) listed previously. Power equipment device 102 can be equipped with a data communication interface to communicate electronically by way of a communication framework 104, to one or more server devices 106. Server devices 106 provide position location data to power equipment device 102. The position location data can be stored at a power equipment device data store(s) 116, in an embodiment. In further embodiments, steering and location processes stored in power equipment device data store(s) 116 can be activated by an auto-steer and location module 114, and can utilize the position location data to provide user-assisted steering functionality for power equipment device 102, as described herein.

Communication between power equipment device 102 and server devices 106 can utilize any suitable mechanism known in the art or reasonably suggested to one of ordinary skill in the art by way of the context provided herein together with the knowledge of, or attributable to, such a person. One possible communication between power equipment device 102 and server devices 106 can be in the form of a data packet adapted to be transmitted between two or more computer processes by way of communication framework 104. Auto-steer and location module 114 can establish a connection with server device(s) 106, and can retrieve data, store data, submit processing requests, provide data in conjunction with a processing request, and the like, utilizing data packets or other suitable form of wireless communication.

Communication framework 104 can be employed to facilitate communications between power equipment device 102 (or components thereof) and server devices 106. Communication framework 108 will generally be a wide area network in most disclosed embodiments, although the subject disclosure is not limited by these embodiments. Rather, in various embodiments communication framework 104 can include wired/wireless connectivity to a local area network (LAN) or larger networks, e.g., a wide area network (WAN) which may connect to a global communications network, such as the Internet. In other embodiments, communication framework 104 can comprise wireless communications of a global positioning system (GPS) including a GPS transceiver(s) located at power equipment device 102 and one or more global positioning satellite devices. In some embodiments, communication framework 104 can include connectivity between a combination of the foregoing, such as a LAN or a WAN connected to one or more server devices 106 associated with a GPS system. As more specific examples, communication framework 104 can provide communication utilizing: any suitable public, private or commercial cellular voice or data network (second generation (2G), third generation (3G), fourth generation (4G), wireless interoperability for microwave access (WiMAX®), 4G long term evolution (LTE®), fifth generation (5G®), and so forth), a satellite voice or data network, Bluetooth®, or Wi-Fi technology IEEE 802.11(a, b, g, n, . . . ), infrared, Ultra Wideband (UWB), or a wired connection such as a universal serial bus (USB) connection, Ethernet connection (e.g., Cat 3, Cat 5, Cat 5e, Cat 6, Cat 6A, and others), or the like, or a suitable combination of the foregoing.

In most embodiments provided herein, server devices 106 and the like are referred to as GPS satellite servers, which can include GPS satellite devices themselves, or server devices separate from the GPS satellite devices that generate or convey GPS positioning data to a GPS client device (e.g., a GPS transceiver of auto-steer and location module 114). It should be understood that communication with server devices 106 by way of communication framework 104 can incorporate any suitable direct or indirect (e.g., by way of one or more non-GPS networks) communication between power equipment device 102 and server devices 106 known in the art, or subsequently developed.

Positioning data can be generated utilizing wireless signals transmitted by auto-steer and location module 114, in one or more embodiments. Algorithms for generating position data for power equipment device 102 from such wireless signals can be stored at server data store(s) 122. Alternatively, or in addition, the position data—once generated—can be stored at server data store(s) 122 before being transmitted to power equipment device 102. In addition to the foregoing, position data can be generated periodically (or semi-periodically, or a-periodically where suitable) to provide a set of position location data for power equipment device 102 over time, to facilitate tracking motion of power equipment device 102. In an embodiment, a period, frequency, rate, etc., of position location data generation can be controlled or modified at auto-steer and location module 114. In some embodiments, the period/frequency/rate of generation of position location data (referred to hereinafter as frequency of position location data) can be selected to be sufficient to track displacement of power equipment device 102 of less than ten centimeters (cm), between 1 cm and 10 cm, between 1 cm and 5 cm, between 2 cm and 5 cm, or the like at speeds common to power equipment device 102. Such speeds can include a mile per hour (mph), up to twenty mph, up to thirty mph, or any suitable value or range there between (e.g., 2 or 3 mph, about 5 mph, about 5 to about 10 mph, about 10 to about 15 mph, about 15 to about 20 mph, about 20 to about 30 mph, and so forth). In some embodiments, the frequency of GPS position location data provided by server devices 106 can be greater than 1 hertz (Hz), between about 1 Hz and about 100 Hz, between about 2 Hz and about 50 Hz, between about 5 Hz and about 20 Hz, between about 7 Hz and about 15 Hz, about 8 Hz, about 10 Hz, about 12 Hz or about 15 Hz. Other suitable frequencies of GPS position location data can be provided. Moreover, suitable frequencies or ranges of frequencies of GPS position location located data provision can be selected at auto-steer location module 114 in one or more embodiments, and stored by server devices 106 at server data store(s) 122. Thereafter, generation and provision of GPS position location data can be at (or approximately at) the selected frequency.

GPS position location data determined from wireless signals between a terrestrial device (e.g., power equipment device 102) and a set of orbiting satellite devices can experience small perturbations based on atmospheric conditions (e.g., atmospheric refraction of electromagnetic transmissions) existing between terrestrial and orbiting devices. Moreover, these perturbations can change over time, due to changes in the atmospheric conditions, as one example. Accordingly, communication environment 100 can employ a location refinement device 108 that is terrestrially located. Location refinement device 108 can utilize a known position on the Earth (either a static position, or a position that is static for a suitable period of time, such as an hour or more, to several days, weeks or months) to identify changes to GPS position location data due to dynamic atmospheric conditions. Corrections to the GPS position location data utilizing the known position on the Earth can be generated for location refinement device 108. Moreover, when power equipment device 102 is within suitable proximity of location refinement device 108 such that atmospheric conditions affecting electromagnetic signals between location refinement device 108 and server devices 106 (or GPS satellites associated with server devices 106) are the same or approximately the same as conditions affecting electromagnetic signals between power equipment device 102, corrections to GPS position location data generated by position location device 108 can be used to correct GPS position location data for power equipment device 102 as well. Suitable proximity of location refinement device 108 and power equipment device 102 can be established by design choice, in some embodiments (e.g., a distance that correlates to less than 2 cm error between corrections to GPS position location data at location refinement device 108 and corrections to GPS position location data at power equipment device 102, as one example, or other suitable error values in other examples). Likewise, conditions affecting electromagnetic signals between power equipment device 102 and server devices 106 (or GPS satellites associated with server devices 106) and those affecting electromagnetic signals between location refinement device 108 and server devices 106 can be established as approximately the same based on design choice (e.g., conditions resulting in less than 2 cm deviation of correction data for location refinement device 108 versus power equipment device 102, or other suitable value).

A wireless link 132 between power equipment device 102 and location refinement device 108 can be established for transfer of position location correction data 134. The position location correction data 134 can be received by autosteer and location module 114 and stored at power equipment device data store(s). Moreover, the position location correction data 134 can be utilized to refine GPS data received from server devices 106, to produce corrected position location data for power equipment device 102. In some embodiments, the position location correction data 134 can be generated by location refinement device 108 and received at power equipment device 102 at a frequency equal to the frequency of position location data received from server devices 106. In other embodiments, the position location correction data 134 can be generated and received at power equipment device 102 at a frequency lower than the position location data received from server devices 106. As an example, where position location correction data 134 is received at a frequency 100 times slower than the position location data received from server devices 106, most recent correction data 134 can be utilized for a plurality of cycles of position location data (e.g., 100 cycles of position location data), and updated upon receipt of new position location correction data 134 for a second plurality of position location data (e.g., a second 100 cycles of position location data). In still other embodiments, position location correction data 134 can be fixed for relatively long periods of time (e.g., an hour, several hours, a day, etc.) and can be utilized as a correction constant for position location data received from server devices 106.

In some embodiments, location refinement device 108 can be a base station of a cellular communication network. Position location correction data 134 can be generated by a service provider of a cellular network, or by a third party employing the fixed position of the base station to generate position location correction data. In other embodiments, location refinement device 108 can be embodied as a public radio tower configured to communicate with server devices 106 at a fixed location. Deviations of GPS position location data provided by server devices 106 can be compared to the fixed location and utilized to generate position location correction data 134 for the fixed location, and for nearby locations (e.g., locations presumed to be affected by substantially the same atmospheric conditions as the fixed location). In other embodiments, location refinement device 108 can be a mobile or semi-mobile wireless communication device that is positioned at a location, and then activated to communicate with server devices 106 by a location refinement device communication channel 136 (e.g., a GPS transceiver employed by the mobile or semi-mobile wireless communication device to communicate with GPS satellites embodying data servers 106, among other examples). The mobile or semi-mobile wireless communication device is fixed in position upon activation and can obtain location data from server devices 106 over a determination time at the position. Obtained location data received over time can be utilized to, at least in part, calculate the position location corrected data for the position. In some embodiments, the mobile or semi-mobile wireless communication device can connect with a public atmospheric data source(s) or private atmospheric data source service, to compare changes in position location with prevailing atmospheric condition data received from the atmospheric data source(s). Position location correction data 134 can be generated for the position after the determination time utilizing position location data received during the determination time in conjunction with the atmospheric data received during the determination time.

Figure 2:
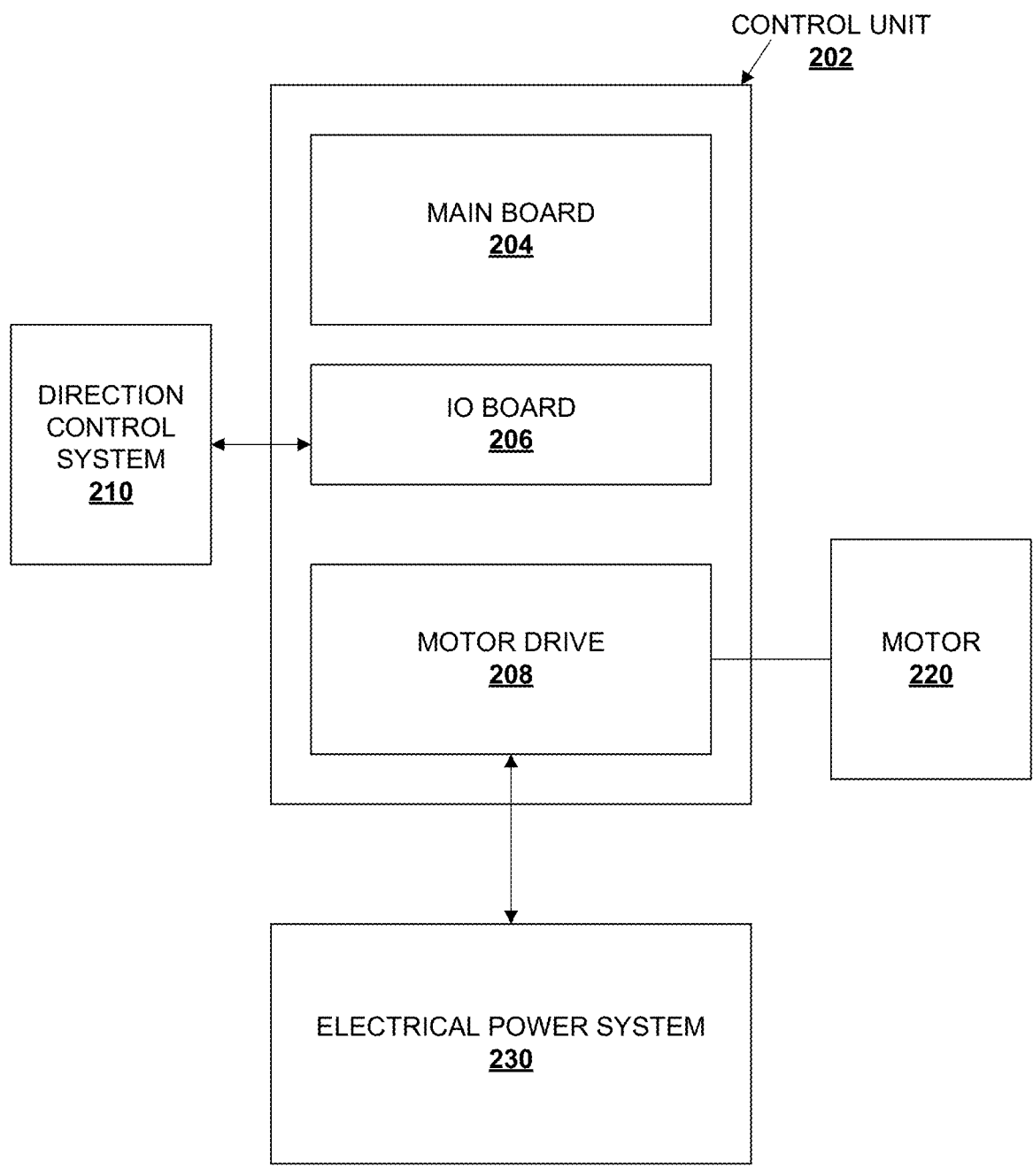
FIG. 2 illustrates a block diagram of a sample mechanical control unit for implementing automated steering according to one or more embodiments.

FIG. 2 illustrates a block diagram of an example control module architecture 200 for a power equipment device, according to some embodiments of the present disclosure. Control module architecture 200 can receive direction change data, and convert the direction change data into an adjusted steering angle for the power equipment device. Changing orientation of a steering apparatus of the power equipment device according to the adjusted steering angle can facilitate changing direction of motion of the power equipment device. Repeating the process of receiving direction change data, generating adjusted steering angles and changing orientation of the steering apparatus to maintain a target path of motion can facilitate automated steering of the power equipment device along the target path of motion, to implement various user-assisted automated steering embodiments of the present disclosure.

Control module architecture 200 can comprise a control unit 202, including a main board 204 and input/output (I/O) board 206. Main board 204 can comprise a suitable computing device, processing device, or the like (e.g., see computer 1202 of FIG. 12, infra). Main board 204 can also comprise one or more communication bus devices to communicatively couple main board 204 with I/O board 206, with a motor drive 208, as well as external devices such as direction control system 210.

Motor drive 208 can be powered by an electrical power system 230. Electrical power system 230 can comprise a battery, an alternator, a generator, or the like, or a suitable combination thereof. Utilizing electrical power from electrical power system 230, motor drive 208 can activate a motor 220 connected to a steering control of a power equipment device (not depicted, but see FIG. 5, infra). Direction control system 210 can utilize position location data and generate direction change data for changing a direction of motion of the power equipment device. In an embodiment, the direction change data can reflect an angular difference between a current direction of motion of the power equipment device, and a target direction of motion. In another embodiment, the direction change data can reflect displacement between a current position of the power equipment device and a position along a target path of motion of the power equipment device. In yet another embodiment, the direction change data can reflect the angular difference between the current direction of motion and the target direction of motion in combination with the displacement between the current position and the position along the target path of motion.

In an embodiment, direction control system 210 can convert the direction change data to a corrected steering angle for the power equipment device. In an alternative embodiment, the direction change data can be provided to mainboard 204 by way of I/O board 206, and mainboard 204 can be configured to convert the direction change data to the corrected steering angle. Once the corrected steering angle is determined, mainboard 204 can convert the corrected steering angle into an angular rotation metric for the steering apparatus of the power equipment device. Motor drive 208 can activate motor 220 to change the steering control of the power equipment device by the angular rotation metric. The angular rotation metric can be measured in any suitable parameter that relates to or can translate to a controlled mechanical change in steering that causes a change to a direction of motion of the power equipment device. In an embodiment, the angular rotation metric can be embodied by a rotational angle of steering wheel(s) of the power equipment device. In other embodiments, the angular rotation metric can be embodied by a change in position of a steering gear that controls the rotational angle of the steering wheel(s) of the power equipment device. Where steering wheels are freely rotating about a center axis of the wheel(s) (and thus are not actively driven), the angular rotation metric will include only the rotational angle(s) of one or more wheels, and not a drive speed for steering wheels (see below).

A speed with which steering motor drive 208 converts angular rotation metric data to motor output at motor 220 can impact a quality of the control module architecture 200 for the power equipment device. For instance, the speed of changes to the motor output at motor 220 can affect perceived smoothness of the automated steering provided by control unit 202, and accordingly the perceived comfort of user-assisted automated steering provided by embodiments of the present disclosure. In various embodiments, a frequency of conversion of angular rotation data to motor output at motor 220 can be greater than 10 hertz (Hz); greater than 100 Hz; between about 100 Hz and about 10,000 Hz; between about 200 Hz and about 2,000 Hz;

between about 500 Hz and about 1,500 Hz; between about 900 Hz and about 1100 Hz; or about 1,000 Hz in various embodiments.

In some disclosed embodiments, the angular rotation metric can be the same or approximately the same (e.g., within a few percent deviation) for each of a plurality of steering wheels of the power equipment device. In alternative or additional embodiments, the angular rotation metric can include first steering data for a first steering wheel and second steering data for a second steering wheel of the power equipment device (e.g., see FIGS. 7 and 8, infra). The first steering data can differ from the second steering data depending on mechanical characteristics or constraints of the power equipment device (e.g., type of steering apparatus, type of steering wheels, mechanical drive utilized to change direction of steering wheels, mechanical drive utilized to rotate steering wheels, and so forth), a type of turn being initiated, or the like. For instance, where the steering wheels are actively driven by motor 220 (or another motor of the power equipment device—not depicted) the first steering data can specify a relatively large drive speed for an outside turn wheel making a turn with a larger turn radius and a relatively small drive speed for an inside wheel making a turn with a smaller turn radius compared with the outside turn (e.g., see FIG. 7, infra). In other embodiments, the first steering data can specify a different turn angle and the different drive speed from the second steering data. As one example, the first steering data can specify a turn in a first direction at a first rotational speed and the second steering data can specify a turn in a second direction opposite the first direction at a second rotation speed for a first portion of a turn, followed by a turn in the first direction at the second or a third rotational speed for a second portion of the turn (e.g., see FIG. 8, infra). As exemplified by this latter embodiment, the angular rotation metric can include complex data with multiple steering directions and rotation speeds for a single turn, which can be different for different steering wheels, and can vary depending on the type of turn (e.g., a zero radius turn, a small radius turn in which a displacement of the power equipment device is less than twice the width of the power equipment device, or the like, as is known in the art or reasonably conveyed to one of ordinary skill in the art through the context provided herein).

In still other embodiments, the angular rotation metric can specify a rotation of a common steering axle for each of a plurality of freely rotating (about a common rotational axis), and freely pivoting steering wheels (about an axis perpendicular to a surface upon which the wheels are resting). In these embodiments the steering wheels can pivot independently to accommodate the rotation of the common steering axle, and thereby achieve a turn established by the rotation of the common steering axle. For large radius turns, steering wheels may pivot at similar angles and at similar speeds to accomplish the large radius turn. For small radius or zero radius turns, one steering wheel may rotate backwards for a first portion of the small (or zero) radius turn and rotate forward for a second portion of the small (or zero) radius turn, whereas a second steering wheel may rotate forward throughout the small (or zero) radius turn (see, e.g., FIG. 8, infra).

Figure 14:
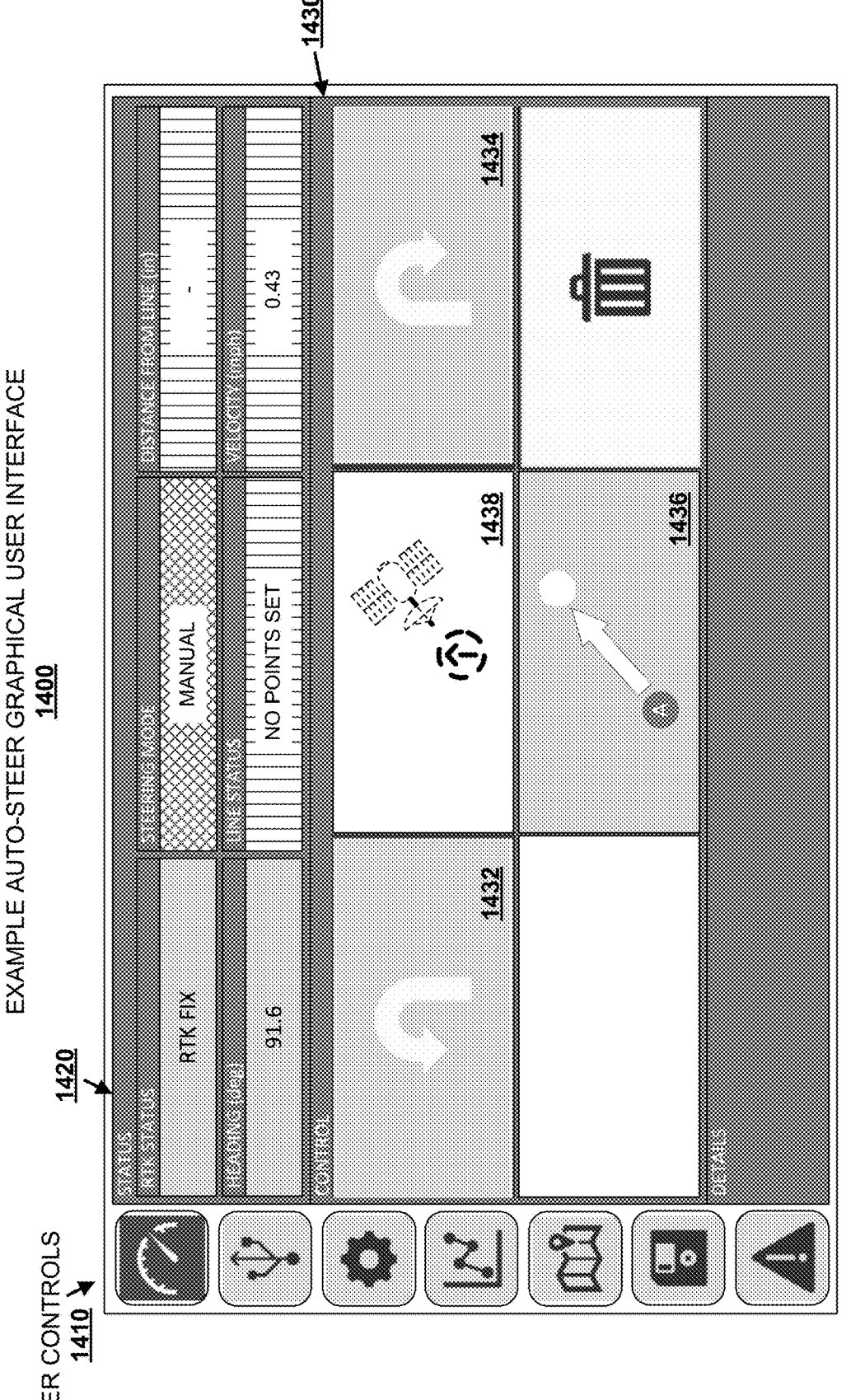
FIGS. 14-14C illustrate diagrams of an example graphical user interface for an operator-assisted steering device for a power equipment device, in some disclosed embodiments.

Turning now to FIG. 3, there is depicted a block diagram of an example parallel path control system 300 for a power equipment device according to further embodiments of the present disclosure. Parallel path control system 300 can include control unit 202 as described above with respect to FIG. 2 (although parallel path control system 300 is not limited to the embodiments described above), including mainboard 204, I/O board 206 and motor drive 208. Further, an electrical power system 230 is provided that generates electrical power for powering motor drive 208, and a motor 220 for changing angle of a steering wheel(s) in response to motor drive 208, driving the steering wheel(s) in response to motor drive 208, or combinations of the foregoing in some embodiments. A user input/output 310 is also provided, which can include user command or data entry to mainboard 204 (e.g., turning control unit 202 on or off; providing auto-steering assist activation input(s), such as depicted at FIGS. 14-14C, infra; inputs for establishing a primary parallel path vector(s); and so forth), as well as user-operated controls for a power equipment device in other embodiments (e.g., manual acceleration pedal, manual steering, and so forth).

Communicatively connected to control unit 202 is a direction control system 320 and a positioning device 330. Positioning device 330 can be a GPS position location device, in some embodiments. In other embodiments, positioning device 330 can be a cellular position location device configured to obtain position location data from one or more base stations of a cellular communication network. In still other embodiments, positioning device 330 can be an RTK-assisted positioning location device, in which satellite-based GPS position location data for positioning device 330 is refined by local positioning correction data 342 generated by a terrestrial-based location refinement device 108 to produce corrected positioning data, in an embodiment (e.g., see FIG. 1, supra). In this latter embodiment a wireless device 340 is provided to communicate with location refinement device 108 and obtain the local positioning correction data 342 for correcting the satellite-based GPS position location data acquired by positioning device 330. In still other embodiments, positioning device 330 can include a like position location system or subsequently developed position location system, or a suitable combination of the foregoing.

In various embodiments, direction control system 320 can optionally include a user interface 322 for user input of parameter values, user input of commands, user selection of operation modes, user entry of data (e.g., parallel path vector points, auto-steering trigger input, and so forth), or the like, and for output of data to a user, such as acknowledgment(s) of a user input(s), display of operation mode(s), display of input parameter values, display a command(s) being actively processed or list of commands previously processed, and so forth. In some embodiments, user input/output 310 can be utilized for user input and output functions of direction control system 320, instead of a user interface 322 particular to direction control system 320. In other embodiments, user input/output 310 can incorporate a user interface for control unit 202 in combination with a user interface for direction control system 320.

In various embodiments, a target path of motion for a power equipment device can be established by direction control system 320. The target path of motion can be equated to, or generated from, a primary vector path entered utilizing user input(s) at user interface 322 (or user input/output 310), in various embodiments. As one example, a first user input (e.g., a button press, a release of a button press, activation of a switch, turn of a dial, a verbal instruction, a display screen menu selection, etc.) can establish a first point of the primary vector path and a second user input can establish a second point of the primary vector path. In an alternative embodiment, which can be applicable to other user input(s) references or sequence of user input references provided throughout this disclosure where suitable, a first user input can establish the first point of the primary vector path and the second point can be determined at least in part algorithmically in response to the first user input (e.g., the second point can be established following a fixed time after the first user input; the second point can be established following a fixed displacement from the first point, or the like, or a suitable combination of the foregoing). Direction control system 320 can acquire (corrected) position location data from positioning device 330 contemporaneous with the first user input and with the second user input (or, alternatively, can acquire position location data a fixed time, displacement, etc. following the first user input instead of in response to a second user input), resulting in first (corrected) location data associated with the first user input, and second (corrected) location data associated with the second user input (or associated with the fixed time, fixed displacement, etc.). Where these user input(s) represent different positions of a power equipment device during user operated movement of the power equipment device, a path vector of the power equipment device can be generated by direction control system 320 at least from the first (corrected) location data and the second (corrected) location data (see, e.g., FIG. 6, infra, including point A 602 and point B 604).

In some embodiments, a further input to direction control system 320 can activate user-assisted automated steering of control unit 202. The automated steering can maintain the power equipment device on a primary path vector (e.g., established from user inputs to direction control system 320) or on a secondary (or subsequent) parallel path generated from the primary path vector, in various embodiments. Automated steering can be implemented by generating position location points along a calculated path of motion (e.g., the primary path vector or a subsequent parallel path), and comparing contemporaneous (corrected) position location data received from positioning device 330 to the position location points along the calculated path of motion. Where comparison of the (corrected) position location data deviates from the position location points along the calculated path of motion by a threshold amount, direction control system 320 (or mainboard 204) can generate steering adjustment data configured to direct the power equipment device toward the calculated path of motion (e.g., see FIG. 6-6B, infra, among others).

Quality and accuracy (e.g., in terms of displacement error of the power equipment device from the target path of motion) of the user-assisted automated steering can depend on accuracy of the position location data obtained from positioning device 330 (see also FIGS. 9-9G, and 9J-9L infra), as well as speed with which deviations from the target path of motion can be corrected by parallel path control system 300. The latter factor can depend on a frequency with which contemporaneous (corrected) position location data is acquired by positioning device 330, a frequency with which contemporaneous (corrected) position location data is compared with position location points along the target path of motion, and a frequency with which the steering adjustment data is calculated and provided to control unit 202, and applied by motor drive 208 to motor 220. In some disclosed embodiments, a first frequency at which steering adjustment data provided by direction control module 320 (or mainboard 204) is converted to motor output at steering motor 220, can be different from a second frequency at which (corrected) position location data is received by positioning device 330 and steering adjustment data is calculated by direction control module 320 (or mainboard 204). In some embodiments, the first frequency can be equal to or greater than 100 Hz, and the second frequency can be less than 100 Hz. As one example, the first frequency can be between about 200 Hz and about 2000 Hz, between about 500 Hz and about 1500 Hz, between about 900 Hz and about 1100 Hz, or about 1,000 Hz, and the second frequency can be between about 2 Hz and about 50 Hz, between about 5 Hz and about 20 Hz, between about 7 Hz and about 15 Hz, about 8 Hz, about 10 Hz, about 12 Hz or about 15 Hz.

It is worth noting that primary path vector and secondary parallel paths for automated steering can be generated independent of map data detailing surrounding features of a geographic area, according to various embodiments. The primary path vector can be generated from two user input data points, as outlined above. Subsequent parallel paths can be generated utilizing multiples of a predetermined displacement distance from the primary path vector. For instance, the second parallel path can be generated parallel to and one displacement distance from the primary path vector, a third parallel path can be generated parallel to and two displacement distances from the primary path vector, a fourth parallel path can be generated parallel to and three displacement distances from the primary path vector, and so forth. (See, for example, FIGS. 6-8 and 12-13, infra, among others).

Figure 4:
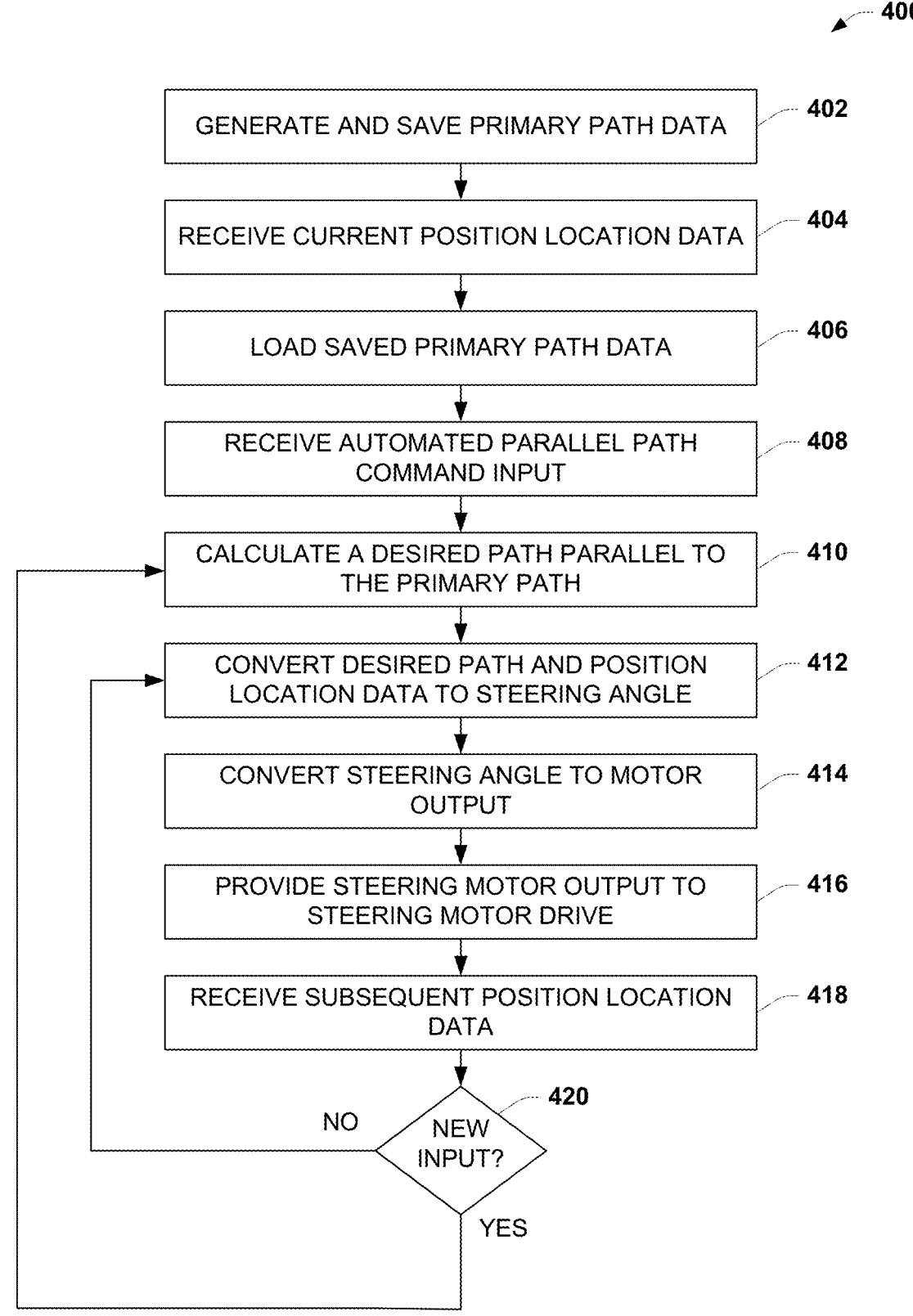
FIG. 4 illustrates a flowchart of an example method for implementing user-assisted parallel path steering according to alternative or additional disclosed embodiments.

Turning now to FIG. 4, there is depicted a flowchart of an example method 400 for providing user-assisted automated steering, in various disclosed embodiments. At 402, method 400 can comprise generating and saving primary path data. The primary path data can be a primary path vector, as described herein, including calculated position location points along the primary path vector. At 404, method 400 can comprise receiving current position location data. The current position location data can be acquired from a position location device, in an embodiment, such as an RTK-assisted GPS location device. In at least one embodiment, the current position location data provided by the RTK-assisted GPS location device can be further refined by displacement of a GPS/wireless antenna to a gravitational centerline of the earth (e.g., utilizing a gyro-meter or inclinometer; see FIG. 9, infra).

At 406, method 400 can comprise loading saved primary path data from data storage. At 408, method 400 can comprise receiving an automated parallel path command input and, in response to receiving the automated parallel path command input, method 400 can comprise at 410 calculating a desired path parallel to the primary path. At 412, method 400 can comprise converting a desired path and position location data establishing a current heading into an adjusted steering angle. At 414, method 400 can comprise converting the adjusted steering angle to a steering motor output and, at 416, method 400 can comprise providing the steering motor output to a steering motor drive.

At 418, method 400 can comprise receiving subsequent location data. A determination is made at 420 as to whether a new parallel path command input has been received. If no new parallel path command input has been received, method 400 can return to reference number 412 to convert the subsequent position location data to a subsequent adjusted steering angle along the desired path. Otherwise, if a new parallel path command has been received, method 400 can return to 410 and calculate a new desired path parallel to the primary path.

Figure 5:
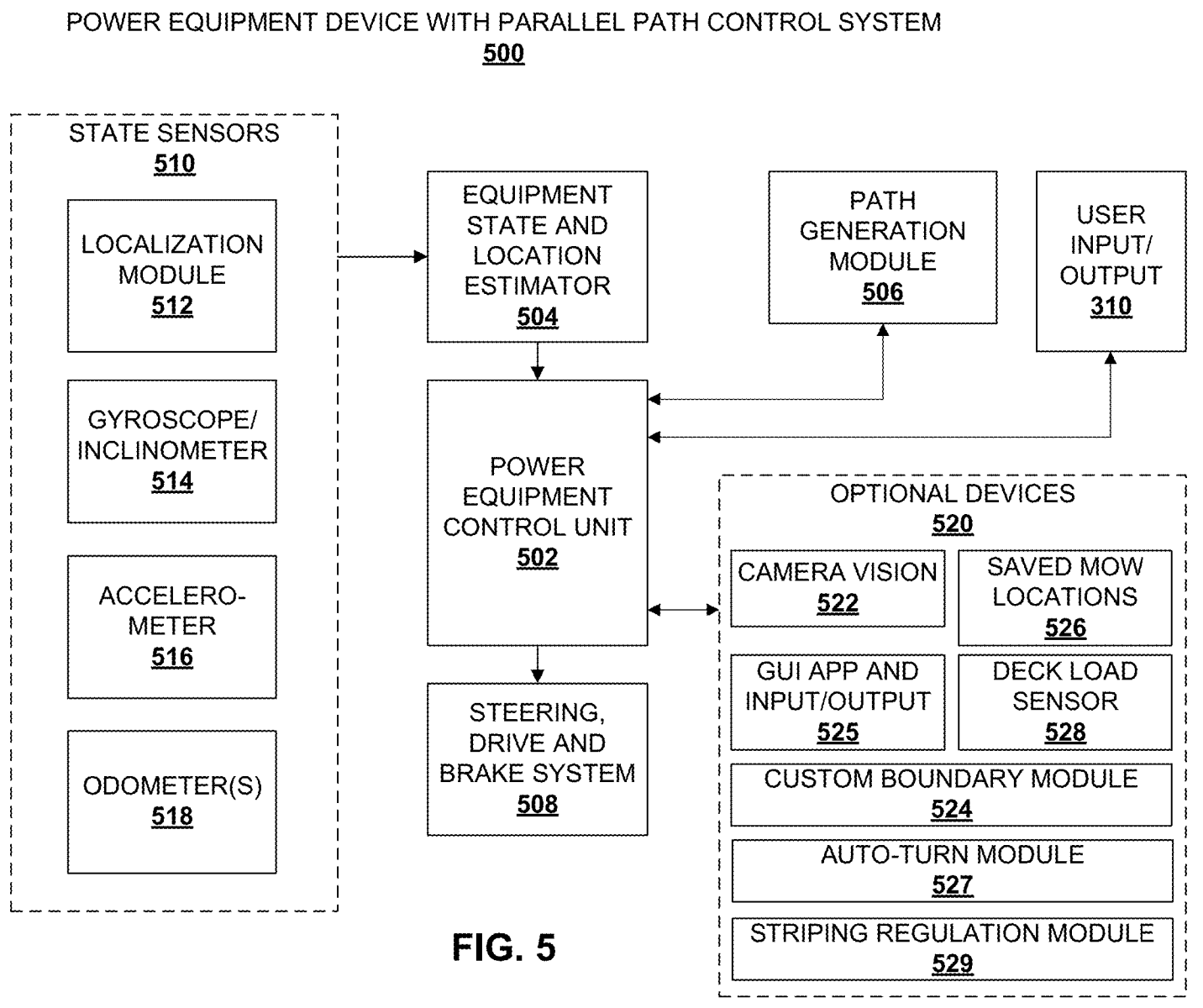

Referring now to FIG. 5, there is depicted a block diagram of an example power equipment device 500 with parallel path control system, according to alternative or additional embodiments of the present disclosure. Power equipment device 500 can comprise a power equipment control unit 502, communicatively and mechanically coupled with steering, brake and drive systems 508 of the power equipment device 500. An equipment state and location estimator 504 can provide guidance data to automate steering of power equipment device 500, according to various disclosed embodiments. In some embodiments, equipment state and location estimator 504 can provide information usable by power equipment control unit 502 to drive and stop power equipment device 500, in addition to steering power equipment device 500. In these latter embodiments, power equipment device 500 can be an autonomous device. However, the subject disclosure is not limited to these embodiments, as in other embodiments power equipment device 500 provides steering, drive or brake automation to supplement or assist a user of power equipment device 500, rather than as a fully autonomous device.

Equipment state and location estimator 504 provides position location data for power equipment device 500. In an embodiment, equipment state and location estimator 504 can provide RTK-corrected GPS position location data to achieve high accuracy position information for power equipment device 500. In still further embodiments, equipment state and location estimator can provide angular offset adjusted data to further refine the RTK-corrected GPS position location data, utilizing additional correction data determined from displacement of a wireless antenna from a gravitational centerline (see below, and see also FIG. 9, infra). Position location data can be utilized by power equipment control unit 502 to identify displacement from a target path of motion determined by a path generation module 506. In response to the displacement equaling or exceeding a threshold displacement (e.g., two or more centimeters) from a closest point along the target path of motion determined by path generation module 506, power equipment control unit 502 can generate steering adjustment data calculated to minimize both the displacement and an angular difference between a current heading of power equipment device 500 relative to the target path of motion. The steering adjustment data is utilized to change a steering motor of steering, drive and brake system 506 to reorient power equipment device 500 along the target path of motion.

Path generation module 506 can be substantially similar to direction control system 320, in an embodiment(s) (incorporating some or all functionality therein), though the subject disclosure is not limited by this embodiment(s). In other embodiments path generation module 506 can include some of the functionality of direction control system 320, all of the functionality thereof, or additional functionality in combination of any of the foregoing. It should be appreciated that direction control system 320 can likewise incorporate any suitable functionality specified for path generation module 506, in an embodiment.

Path generation module 506 can receive user input data at user input/output 310 to generate path vectors for power equipment device 500. In some embodiments, path vectors can be generated beginning with a primary path vector from two (or more) user input entries at user input/output 310 representing two (or more) position location points of power equipment device 500, and subsequent path vectors generated parallel to the primary path vector at respective multiples of a displacement factor from the primary path vector. The displacement factor can be a distance determined from a width of a work device (e.g., a mow deck) of power equipment device 500, in an embodiment. In another embodiment, the displacement factor can be determined from the width of the work device plus an overlap value (see FIGS. 7 and 8, infra).

To implement automated steering for power equipment device 500, a path vector of the generated path vectors can be established as an active path vector (also referred to herein as a target path or target path vector) and equated by path generation module 506 (or power equipment control unit 502) as the target path of motion. In some embodiments, user input at user input/output 310 can be utilized to explicitly specify the active path vector from the generated path vectors (e.g., see auto-turn module 527, below). In other embodiments, a user input at user input/output 310 in conjunction with a current heading of power equipment device 500 or a current position displacement of power equipment device 500 relative to a current active path vector can be utilized to select the target path vector.

For instance, as a non-limiting illustrative example of the foregoing, where a current position displacement of power equipment device 500 relative to a nearest point on the current active path is less than a displacement threshold in response to the user input at user input/output 310, power equipment control unit 502 can be configured to maintain the current active path as the active path. In response, power equipment control unit 502 can generate steering adjustment data to align position location data for power equipment device 500 with position data of the current active path. In contrast, where the current position displacement of power equipment device 500 relative to the nearest point on the current active path is greater than the displacement threshold in response to the user input at user input/output 310, power equipment control unit 502 can be configured to select a new (e.g., a subsequent) path vector as the active path. In response to this selection, power equipment control unit 502 can generate steering adjustment data to align position location data for power equipment device 500 with position data of the new path vector.

For direction and heading determinations, a similar arrangement can be configured to power equipment control unit 502. As an illustrative example, where an angular displacement between the current heading and the current active path vector is calculated to be less than ninety degrees (or less than about ninety degrees, or less than another suitable angular displacement programmed to power equipment control unit 502 to imply a turn of power equipment device 500 to a new direction of a path vector) in response to the user input at user input/output 310, power equipment control unit 502 can be configured to maintain the current direction of the active path vector (e.g., whether the active path vector is the current path vector or the new path vector) as the active direction. In response, power equipment control unit 502 can generate steering adjustment data calculated to align the current heading with the current direction of the active path vector. In contrast, where the angular displacement between the current heading and the current active path vector is calculated to be greater than ninety degrees (or greater than the value programmed to cause the turn to the new path vector), power equipment control unit 502 can be configured to select a new direction (e.g., a reverse direction, a 180 degree redirection, an approximately 180 degree redirection, etc.) as the active direction (e.g., for the current path vector or the new path vector). In response, power equipment control unit 502 can generate steering adjustment data to align the current heading with the new direction (e.g., see FIG. 6, infra).

In alternative or additional embodiments, power equipment control unit 502 can facilitate user-assisted autonomous driving for power equipment device 500. The user-assisted autonomous driving receives a user input identifying a pre-determined path or route, and power equipment control unit 502 can autonomously drive power equipment device 500 to a starting point of the path or route, and follow the identified path or route. This can be implemented for multiple successive paths/routes, in response to multiple user inputs. For instance, a GUI app and input/output 525 can display calculated path vectors provided by path generation module 506 on a user output device (e.g., a touch screen display, or the like) and receive a selected path vector of the displayed calculated path vectors as an input. An auto-turn module 527 can receive the selected path vector and determine direction and distance from a current position location and current heading of power equipment device, and calculate a route from the current position location to a start of the selected path vector. Power equipment control unit 502 can generate steering adjustment data to cause steering, drive and brake system 508 to drive power equipment device 500 to a start of the selected path vector. In alternative embodiments, GUI app and input/output 525 can receive a direction and a path advancement selection. A user can select one (or other number) path to the left (or compass direction) to transition to, following completion of a current path. Alternatively, the user can select two (or other number) paths to the right (or compass direction, etc.) to transition to, following completion of a current path. Other path selection modalities known to one of ordinary skill in the art or made known to one of ordinary skill by way of the context provided herein are considered within the scope of the present disclosure.

State sensors 510 can be utilized in conjunction with position location determinations for power equipment device 500. A localization module 512 can be a wireless communication device in communication with a terrestrial-based local position correction device (e.g., local refinement device 108, among others), providing local correction data for satellite-based position data, as described herein or known in the art. As an example, localization module 512 can be an RTK device configured to receive RTK correction data from a local refinement device 108 (see FIGS. 1 and 3, supra).

In addition to the foregoing, a gyroscope/inclinometer 514 can be provided to detect a displacement of a wireless antenna of localization module 512 (or of a GPS transceiver). Position location refinement data based on the displacement of the wireless antenna can be utilized to further refine the RTK-corrected position location data, where power equipment device 500 is on an inclined surface (e.g., inclined relative to a gravitational center of the Earth).

Further, an accelerometer 516 and odometer 518 are provided that can be configured to track a position of power equipment device 500, in the absence of GPS position location data. In an embodiment, odometer 518 can include an odometer assembly having a left side odometer for monitoring and measuring rotation of a left wheel(s) of power equipment device 500 and a right side odometer for monitoring and measuring rotation of a right wheel(s) of power equipment device 500. Further, the left and right side odometers can provide left and right rotation measurement data independently of each other. Moreover, power equipment control unit 502 can be configured to compute a heading of power equipment device 500, as well as store and track changes to the heading. Accelerometer 516 can measure (and monitor over time) a rotational acceleration from a most recent point of GPS position location data, and odometer 518 can output (relative) tire rotation data facilitating calculation of a speed and heading of power equipment device 500 by power equipment control unit 502. The rotational acceleration, speed and heading determined from accelerometer 516 and odometer(s) 518 can be local to power equipment device 500, and determined independently from or at least in part in conjunction with satellite-based position location data. For instance, utilizing measured rotational acceleration(s) and measured speed, a position of power equipment device 500 relative the most recent point of GPS position location data can be estimated and utilized for a current position of power equipment device 500. This current position can be estimated in response to a loss of GPS position location data, such as failure to communicate with a server device 106 (or satellite device(s) of a set of GPS satellite devices).

In still further embodiments, power equipment device 500 can comprise one or more optional devices 510. A camera vision device 522 can be provided to further assist with position location determination. Camera vision device 522 can be located below power equipment device 500, in an embodiment, and measure displacement of objects below power equipment device 500 and measure or infer movement of power equipment device 500 in response to such movement. Measurements/inferences of movement of power equipment device 500 can be utilized to replace position location determinations of equipment state and location estimator 504 (e.g., in an analogous manner as described above for accelerometer 516 and odometer 518), in some embodiments, where GPS location position determinations are lost. In other embodiments, movement of power equipment device 500 can be utilized to supplement position location determinations of equipment state and location estimator 504. For instance, the movement of power equipment device 500 determined by camera vision 522 can be utilized as a refinement of, alternative to, or backup for position location determinations of equipment state and location estimator 504. In at least one embodiment, camera vision 522 can identify and track position of a manufactured linear boundary to assist in measuring movement of power equipment device 500 (e.g., see FIG. 10, infra).

In further embodiments, optional devices 520 can comprise a custom boundary module 524. A graphical user interface (GUI) application and input/output 525 can enable a user to enter a geographic boundary on a geographical mapping application. The geographical boundary can then be utilized by path generation module 506 to restrict generated path vectors to within the geographic boundary. Thus, custom boundary module 524 can be utilized to program power equipment control unit 502 to limit automated steering to a user-provided geographic area.

Optional devices 520 can further include a saved mow locations module 526. Saved mow locations module 526 can store sets of generated path vectors (optionally within a stored geographic boundary) for respective saved geographic locations. Stored generated path vectors can enable power equipment device 500 to repeat automated steering along previously generated path vectors, saving a user time in re-generating path vectors. As an alternative, stored generated path vectors can facilitate fully autonomous mowing, by positioning power equipment device 500 near a start point of a primary path vector, loading the set of saved path vectors associated with that primary path vector, and engaging power equipment control unit 502 to steer along the set of saved path vectors.

In another embodiment, a deck load sensor 528 can measure a load on a work engine (e.g., mower blades, or the like) of power equipment device 500. Speed of movement of power equipment device 500 can be controlled utilizing steering, drive and brake system 508 in response to measured load in order to achieve a desired cut quality. In alternative or additional embodiments, speed of the mower blades can be controlled in response to measured load to achieve the desired cut quality (e.g., utilizing steering, drive and brake system 508 or a separate mower blade speed control unit—not depicted). In other embodiments, a combination of the foregoing can be implemented.

In an additional embodiment, optional devices 520 can include a striping regulation module 529. Striping regulation module 529 can be configured to define a direction to subsets of stored path vectors. As an example, a first direction can be defined for a first subset of stored path vectors, and a second direction (e.g., opposite the first direction, orthogonal to the first direction, or any suitable relative orientation to the first direction in an embodiment) can be defined for a second subset of stored path vectors (e.g., see FIG. 6F, infra). Accordingly, when auto-steering is engaged (as described throughout this disclosure), striping regulation module 529 can enforce the first direction for all path vectors of the first subset of stored path vectors, and can enforce the second direction for all path vectors of the second subset of stored path vectors. The enforced directionality can provide a desired aesthetic appearance, for instance of alternating path vectors being traversed in opposing directions by a mowing device, although the enforced directionality is not limited to this particular example.

Figure 6:
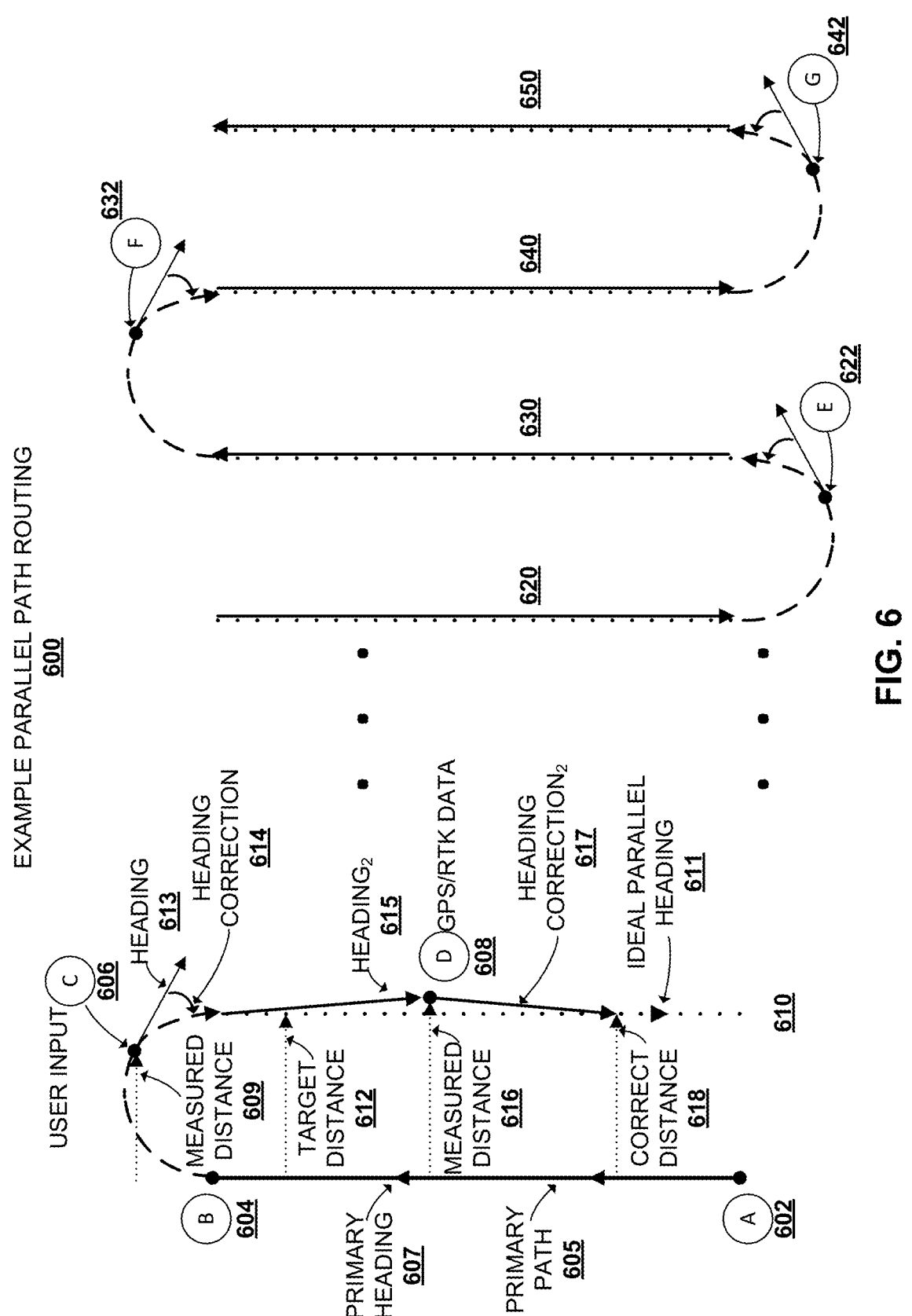
FIG. 6 depicts a diagram of parallel pathing defined from an initial path vector, according to an embodiment(s).

FIG. 6 depicts an example parallel path routing 600 for automated steering of a power equipment device, according to still further embodiments of the present disclosure. Parallel path routing 600 is initiated with a user input entry 602 at a user input/output device, as described herein (e.g., user input/output 310; see also FIGS. 14-14C, infra). A user of the power equipment device provides a second user input entry 604, and a primary path 605 can be generated at least from the user input entry 602 and the second user input entry 604. Subsequent parallel paths 610, 620, 630, 640, 650 (collectively referred to as parallel paths 610-650) are generated at respective multiples of a target distance 612 (also referred to herein as a threshold distance, or other suitable nomenclature) from primary path 605.

By convention, although other conventions within the understanding of one of ordinary skill are considered within the scope of the present disclosure, a target parallel path and a target heading of a power equipment device are defined as a most recent (or initial) parallel path of parallel paths 605 and 610-650, and as a most recent (or initial) heading or direction of motion established by power equipment control unit 502, respectively. In some embodiments, no target parallel path and target heading are defined until user input entry 602 and second user input entry 604 are received. In contrast, a contemporaneous heading or position (also referred to as a current heading or position), is a position or heading of the power equipment device as determined by GPS/RTK corrected position location data, or other suitable position and direction determination device defined herein or known in the art. In response to receipt of user input entry 602 and second user input entry 604, a primary path vector associated with primary path 605 is generated and power equipment control unit 502 establishes primary path 605 as the target parallel path of power equipment device. Power equipment control unit 502 also establishes primary heading 607 as a direction of the primary path vector, and the target heading of the power equipment device, as well as a default direction of a forward heading. A reverse heading can be 180 degrees from the forward heading (or approximately 180 degrees, plus or minus zero to two or three degrees, and any suitable value or range there between; in an embodiment the approximation can be associated with accuracy of GPS/RTK equipment, steering adjustment equipment, or the like). Subsequent parallel paths 610-650 are generated at multiples of a target distance 612, and with alternating forward and reverse headings, as depicted by parallel path routing 600. The target parallel path can be updated by power equipment control unit 502 to one of parallel paths 610-650 and the target heading can be updated to the forward heading or the reverse heading, as provided below.

A further user input 606 is entered to engage automated steering for the power equipment device. In response to the further user input 606, a current position location for the power equipment device is determined from GPS/RTK corrected position location data and a measured distance 609 from a nearest point on a target parallel path is calculated (e.g., primary path vector 605 in the embodiment illustrated by FIG. 6, or one of parallel paths 610-650 in other embodiments). Alternatively, or in addition, a current heading 613 of the power equipment device is calculated and an angular displacement from a target heading is measured (e.g., primary heading 607). In some embodiments, both the measured distance 609 and current heading 613 are obtained. In the example of FIG. 6 (although non-limiting), the target parallel path is primary path 605 and the target heading is primary heading 607. In response to comparing measured distance 609 with a displacement threshold factor power equipment control unit 502 can maintain the target parallel path as primary path 605, or update the target parallel path to second parallel path 610. Likewise, in response to comparing an angular displacement of current heading 613 relative to primary heading 607 with an angular displacement factor, power equipment control unit 502 maintains a target heading as primary heading 607 or updates the target heading to a reverse heading.

As a specific example of target parallel path selection and forward/reverse heading selection (see also FIGS. 6D and 6E, infra), consider a power equipment device at position location identified by the location of further user input 606. In response to further user input 606, position location data is generated to determine measured distance 609 and current heading 613. Power equipment control unit 502 measures angular displacement between current heading 613 and primary heading 607. In response to the measured angular displacement being greater than a threshold angle, the target heading of the power equipment device can be changed (e.g., to a reverse heading when the target heading is currently set to the forward heading). In response to the measured angular displacement being less than the threshold angle, the target heading is maintained (e.g., in the forward heading where the target heading is currently set to the forward heading). Moreover, power equipment control unit 502 is configured to compare measured distance 609 to a displacement threshold factor, to identify which parallel path 605, 610-650 should be set as the target path for the power equipment device. In response to the measured distance 609 being smaller than the displacement threshold factor the target parallel path is maintained (e.g., which can also be referred to as an active parallel path). In response to the position location being greater than the displacement threshold factor, the active path can be set to a subsequent parallel path, such as parallel path 610. As a more specific example, in response to the angular displacement being less than the threshold angle and the measured distance 609 being less than the displacement threshold factor, the primary path 605 and the forward heading or direction can be maintained as the target path and the target heading. In another example, in response to the angular displacement being less than the threshold angle and the measured distance 609 being greater than the displacement threshold factor, power equipment control unit 502 selects second parallel path 610 as the target path with the forward heading as the target heading (opposite the heading depicted by ideal parallel heading 611, for instance). As yet another example, in response to the angular displacement being greater than the threshold angle and the measured distance 609 being greater than the displacement threshold factor, the target path is set to second parallel path 610 and the target heading is set to the reverse heading. In still another example, in response to the angular displacement being greater than the threshold angle and the measured distance 609 being less than the displacement threshold factor, the target path is maintained as primary path 605 and the target heading is set to the reverse heading (opposite primary heading 607). Automated steering data can be generated to adjust steering data to align the power equipment device along the target heading and target parallel path, as established by power equipment control unit 502.

Suitable values can be provided for the angular displacement threshold and for the displacement threshold factor. As an example, power equipment control unit 502 can be configured to utilize an angular displacement threshold of about ninety degrees or larger, about eighty degrees or larger, about one hundred degrees or larger, or any suitable value or range between about 80 degrees and about 100 degrees, to cause a change from one heading (e.g., forward heading; reverse heading) to an opposite heading (e.g., reverse heading; forward heading). As another example, power equipment control unit 502 can be configured to utilize any suitable displacement threshold factor to switch from a current parallel path (e.g., 605, 610-650) to an adjacent parallel path (e.g., 605, 610-650). The suitable displacement threshold factor can be an absolute value or a value relative to a width of a work engine (optionally plus an overlap) of the power equipment device (e.g., see FIGS. 7 and 8, infra). In another embodiment, the displacement threshold factor can be a value relative to target distance 612 between parallel path vectors 605, 610-650. The absolute value can any suitable value greater than zero. Examples can include one foot, two feet, three feet, . . . ten feet, . . . twenty feet, or any suitable value or range there between. Alternatively, the absolute value can be measured in other units, such as yards (rather than feet), or a metric system rather than English system, or the like (e.g., half a meter, two/third of a meter, one meter, one and one third meters, . . . two meters, . . . five meters, . . . etc.). Still further, the displacement threshold factor can be a fraction of a width of a work engine of the power equipment device (e.g., ⅓ width, ½ width, ⅔ width, ¾ width, 1× width, 1½ width, 1¾ width, etc.). In still other embodiments, the displacement threshold factor can be a fraction of a width of a work engine plus or minus an absolute value (e.g., a width of the work engine plus 2 centimeters, the width of the work engine minus two centimeters, ½ the width of the work engine plus one foot, or any other suitable absolute value plus a fraction of the work engine width).

In response to selecting a new path or new heading, such as parallel path 610 and ideal parallel heading 611, automated steering is implemented. As an example, ideal parallel heading 611 is measured against current heading 613 and a heading correction 614 is calculated for automated steering (see also FIG. 9F, infra). Heading correction 614 includes adjusted steering data to align heading 613 with ideal parallel heading 611, and a second heading$_2$ 615 is obtained. Upon receipt of subsequent position location data 608 a measured distance 616 between a current position established by position location data 608 and a target distance 612 separating parallel path 610 from primary path 605 is determined. Alternatively, subsequent position location data

608 can be measured against calculated position data for parallel path 610 to determine a displacement of subsequent position location data 608 from parallel path 610. Second adjusted steering data is generated and a second heading correction$_2$ 617 to align the power equipment device with a correct distance 618 (or zero distance from the calculated position data for parallel path 610) and an ideal parallel heading 611. This process can be repeated for transitions (e.g., turns) to subsequent parallel paths 620, 630, 640, 650. Thus, where a user turns from parallel path 620 to parallel path 630, a fourth user input 622 is provided when the turn is beyond the threshold angle and the power equipment device is beyond the displacement threshold factor from parallel path 620, and a target parallel path is set to parallel path 630 and a target heading is set to the forward heading. Adjusted steering data is generated to align a current heading of the power equipment device and displacement of the power equipment device to align with parallel path 630 and the forward heading. Likewise, a fifth user input 632 is provided when turning (beyond a threshold angle and displacement threshold factor) from parallel path 630 to parallel path 640, and a sixth user input 642 is provided when turning (beyond a threshold angle and displacement threshold factor) from parallel path 640 to parallel path 650.

Figure 12:
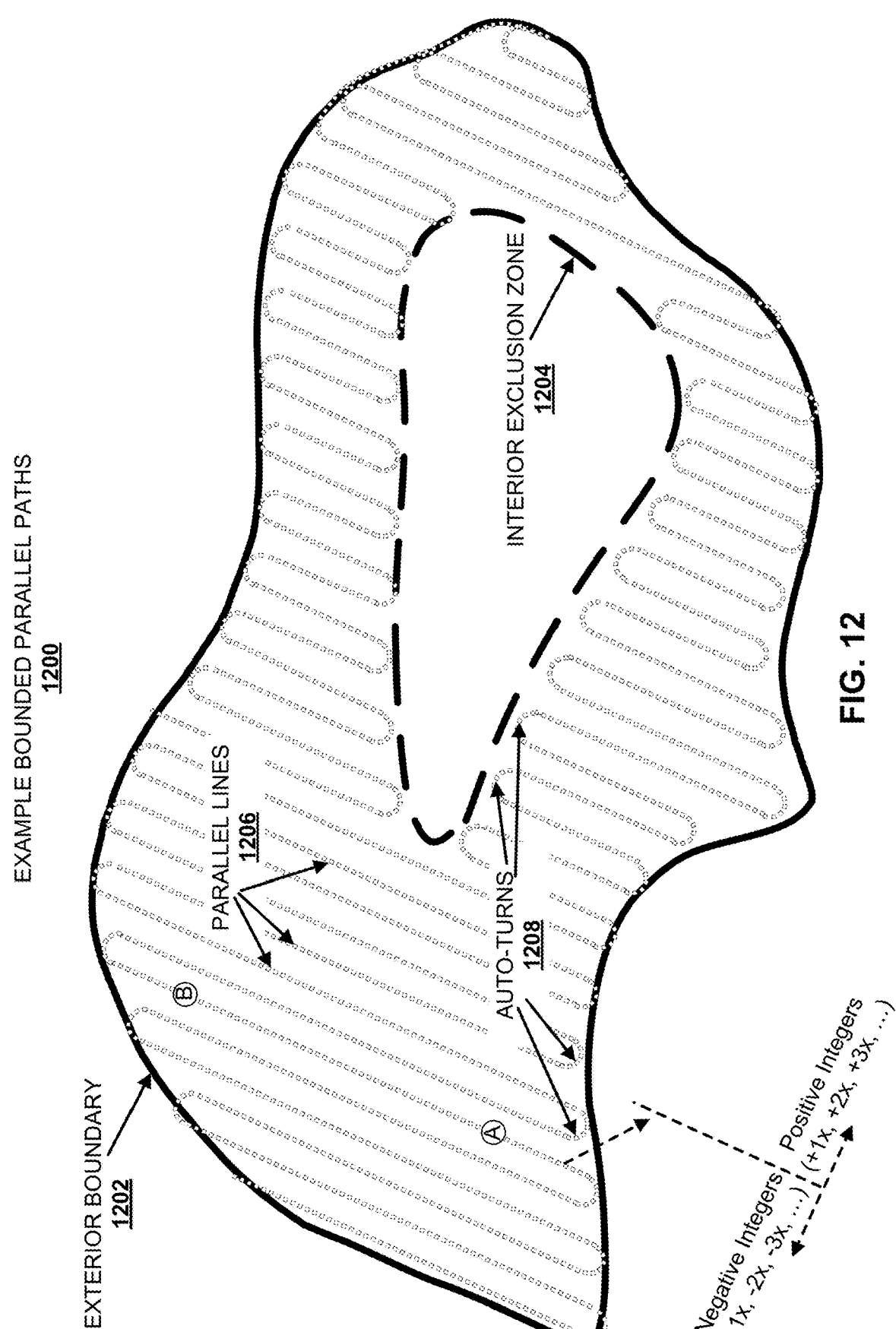
FIG. 12 illustrates a diagram of example parallel paths generated within a virtual boundary for a user-assisted steering device for a power equipment, in an embodiment.
Figure 13:
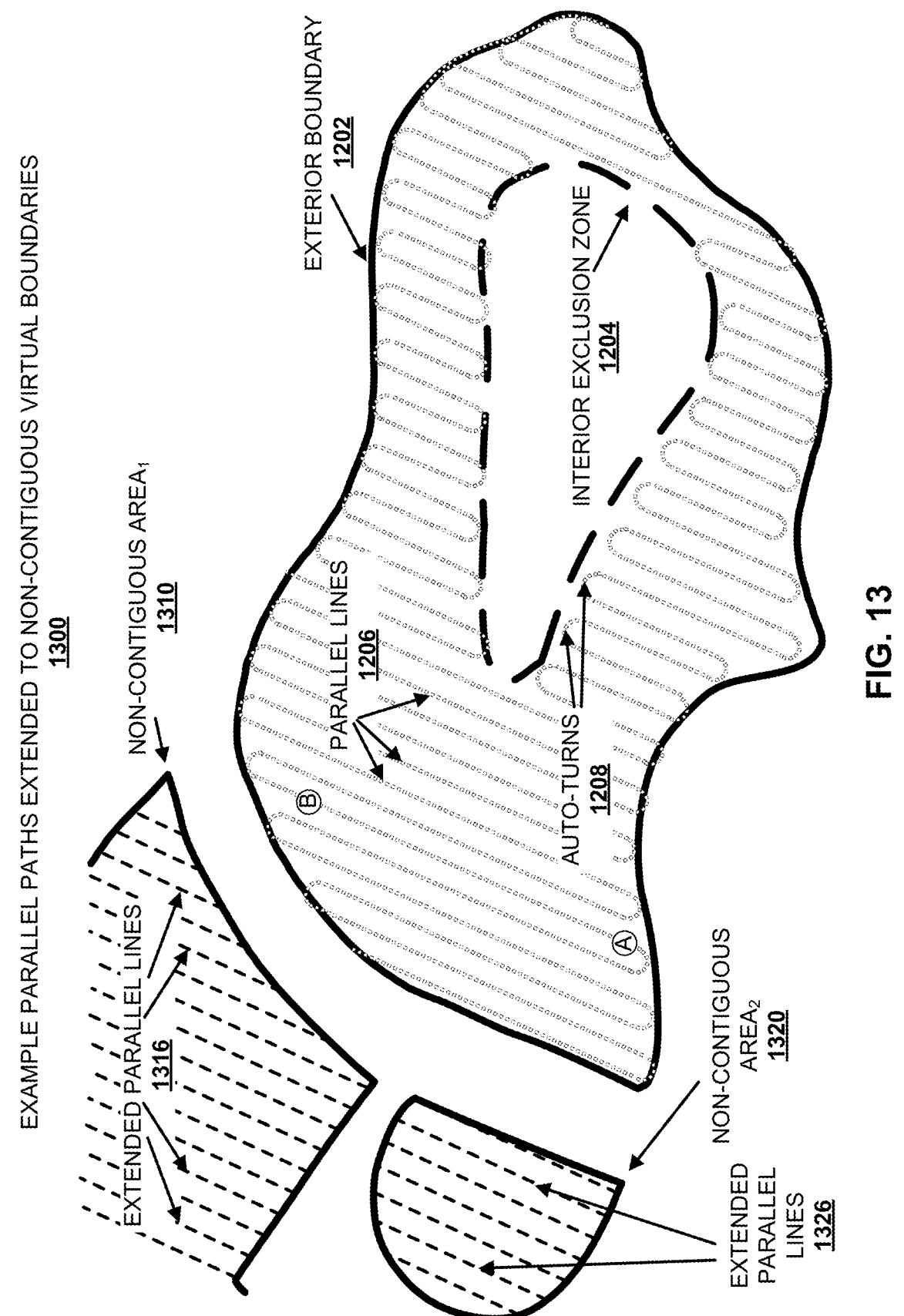
FIG. 13 depicts a diagram of example parallel paths extended to non-contiguous virtual boundaries in a further embodiment.

In embodiments of autonomous operation, parallel paths 605, and 610-650 can be bounded in space (e.g., by a geographic boundary; by a virtual boundary representing the geographic boundary and stored for use at power equipment control unit 502; see e.g., FIGS. 12 and 13 as illustrations). Once an endpoint of a bounded path is reached, autonomous steering will automatically initiate a turn, and user inputs 606, 622, 632, 642 are not necessary to align the power equipment device to a subsequent parallel path and an opposite (e.g., 180 degree reversed) heading. Instead, the active path and heading are switched to a subsequent parallel path and heading in response to the endpoint being reached.

Figure 6A:
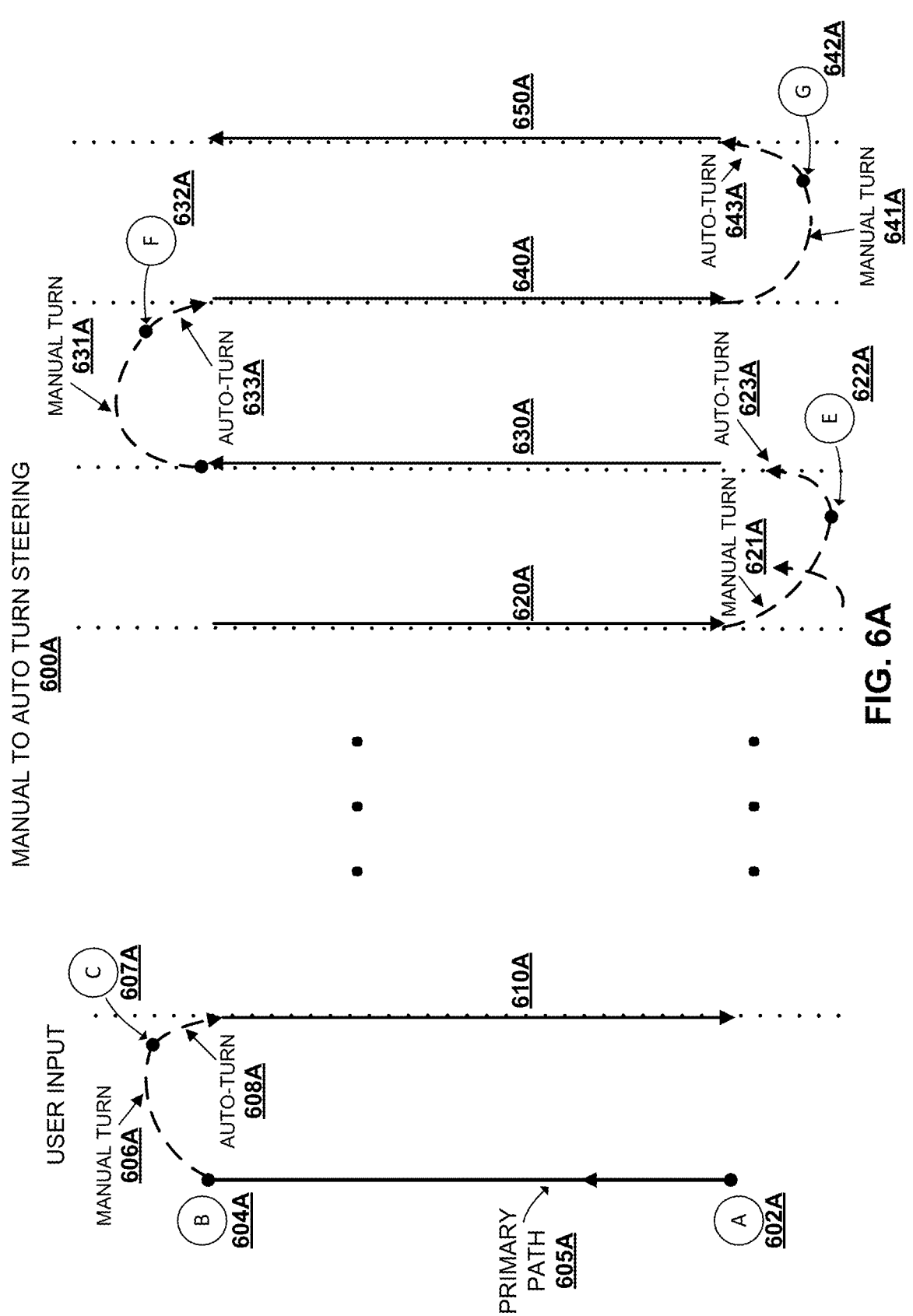
FIG. 6A depicts a diagram of parallel pathing that illustrates a "snap-to-path" embodiment of assisted steering, in additional embodiments.

In embodiments facilitating user-assisted parallel steering, an operator manually turns the power equipment device and re-engages automated steering (see FIG. 6A, infra). In such embodiments, automated steering as described herein can be disengaged when an operator of a power equipment device manually engages a steering apparatus of the power equipment device. Thus, where the operator manipulates left-right steering wheel levers, or turns a steering wheel, the automated steering disengages and reverts solely to manual operator steering. In response to the user input 606 (or user inputs 622, 632, 642) automated steering is re-engaged. Accordingly, the user-assisted automated steering is configured to engage in response to the user inputs 606, 622, 632, 642 and disengage in response to the operator engaging a manual steering apparatus, in one or more disclosed embodiments.

FIG. 6A illustrates a diagram 600A of an example embodiment providing manual-initiated turning with operator-initiated turn assist, in accordance with further embodiments. A primary path 605A can be generated via at least a first user input 602A. Primary path 605A can be completed in response to a second user input 604A, or other mechanism described herein (e.g., expiration of a predetermined time or displacement from the first user input 602A or first location associated with the first user input 602A). Once primary path 605A is generated, subsequent parallel paths 610A, 620A, 630A, 640A, 650A (referred to collectively as subsequent parallel paths 610A-650A) are generated at respective integer multiple threshold distances from primary path 605A. For instance, subsequent parallel paths 610A-650A can be generated at 1× the threshold distance, 2× the threshold distance, up to N× the threshold distance, where N is a suitable integer greater than 1. Further, subsequent parallel paths (not depicted, but see FIGS. 12 and 13) to the left of primary path 605A can also be generated, where suitable.

Following second user input 604A, an operator initiates a manual turn 606A to steer a power equipment device away from primary path 605A. The manual turn can suspend automated steering of a power equipment control unit 502 of a disclosed power equipment device. In response to a third user input 607A, auto steering can be re-engaged and manual turn 606A becomes an automated turn 608A. A position location of the power equipment control unit 502 can be obtained concurrent with receipt of third user input 607A, and associated with a position location of the power equipment device at the time third user input 607A is received. As described above at FIG. 6, supra, a current heading of the power equipment device can then be acquired, and a target path and a target heading selected for the automated turn 608A. The automated turn 608A can generate steering adjustment data to cause the power equipment device to align with the nearest parallel line of primary path 605A and subsequent parallel paths 610A-650A selected for the target path, and to align along a direction consistent with the target heading.

In some embodiments, a target heading selection can be constrained by a virtual geographic boundary (e.g., see exterior boundary 1202 of FIG. 12, infra, or interior exclusion zone 1204 of FIG. 12). For instance, if the position location of the power equipment device is at or near the virtual geographic boundary, the target heading can be constrained to be in a direction away from the virtual geographic boundary, or constrained so as to not cross the boundary. In the latter instance, a direction on the virtual geographic boundary itself can be selected (e.g., at least in part along the virtual geographic boundary before the target heading is adjusted away from the virtual geographic boundary).

In an embodiment, auto-turn 608A can be a low-radius turn to cause a power equipment device to sharply align with a target path (e.g., subsequent parallel line 610A) and a target heading. A low-radius turn can comprise a turn having a radius smaller than a width of a work engine (e.g., a mow deck) of the power equipment device. For example, a low-radius turn can be ¾ of the width of the work engine, or less; ⅔ of the width of the work engine, or less, ½ of the width of the work engine, or less; ⅓ of the width of the work engine, or less; ¼ of the width of the work engine, or less, or any suitable value between a zero radius turn and the width of the work engine.

As depicted by manual turns 621A, 631A and 641A, a manual turn is controlled by an operator and can vary from line to line. Likewise, location along manual turns 621A, 631A, 641A of auto-turn user inputs 622A, 632A and 642A can vary, as well as paths of respective auto-turns 623A, 633A, 643A in response to the auto-turn user inputs 622A, 632A, 642A.

Figure 6B:
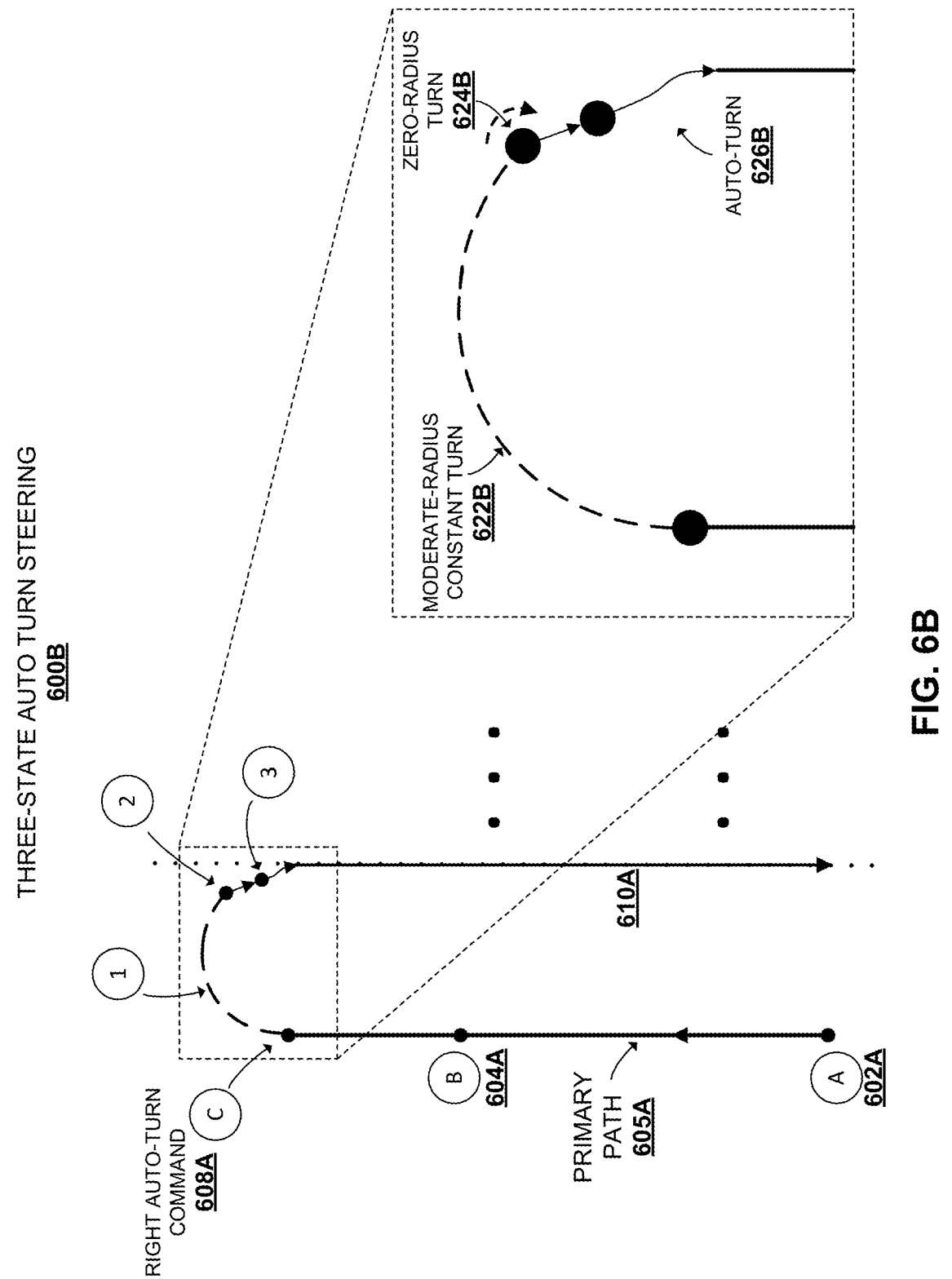
FIG. 6B depicts a diagram of a sample three-state auto-turn according to further embodiments.

FIG. 6B illustrates an embodiment(s) in which an automatic turn is performed utilizing a three-state auto-turn steering 600B. Similar to FIG. 6, a primary path is created (e.g., in response to at least a first user line input 602A and optionally a second user line input 604A), and parallel lines 610A are created at respective threshold distances from primary path 605A.

At point C, an operator initiates a right auto-turn command 608A. The command can be in response to pressing a button a touchscreen display of a graphical user interface (e.g., see FIGS. 14-14C, infra), or button press on a joystick control (e.g., see FIG. 14D), or other suitable embodiments. Once initiated, three-state auto-turn steering 600B begins with a first stage in the direction of the command, with a moderate (or low) radius constant turn 622B. The first stage for the moderate radius constant turn 622B can be guided by an IMU position location system, in some embodiments, in which a constant rate of turn is initiated until a threshold portion of the turn is completed. The threshold portion can be measured in angular displacement (e.g., greater than 90 degrees, 105 degrees, 120 degrees, 140 degrees, 150 degrees, any range or value between 90 to 150 degrees, any suitable value or range there between, or other suitable angular displacement), or can be measured in translational displacement from primary path 605A (or from subsequent parallel line 610A), or the threshold portion can be a combination of angular displacement and translational displacement in various embodiments.

Figure 8A:
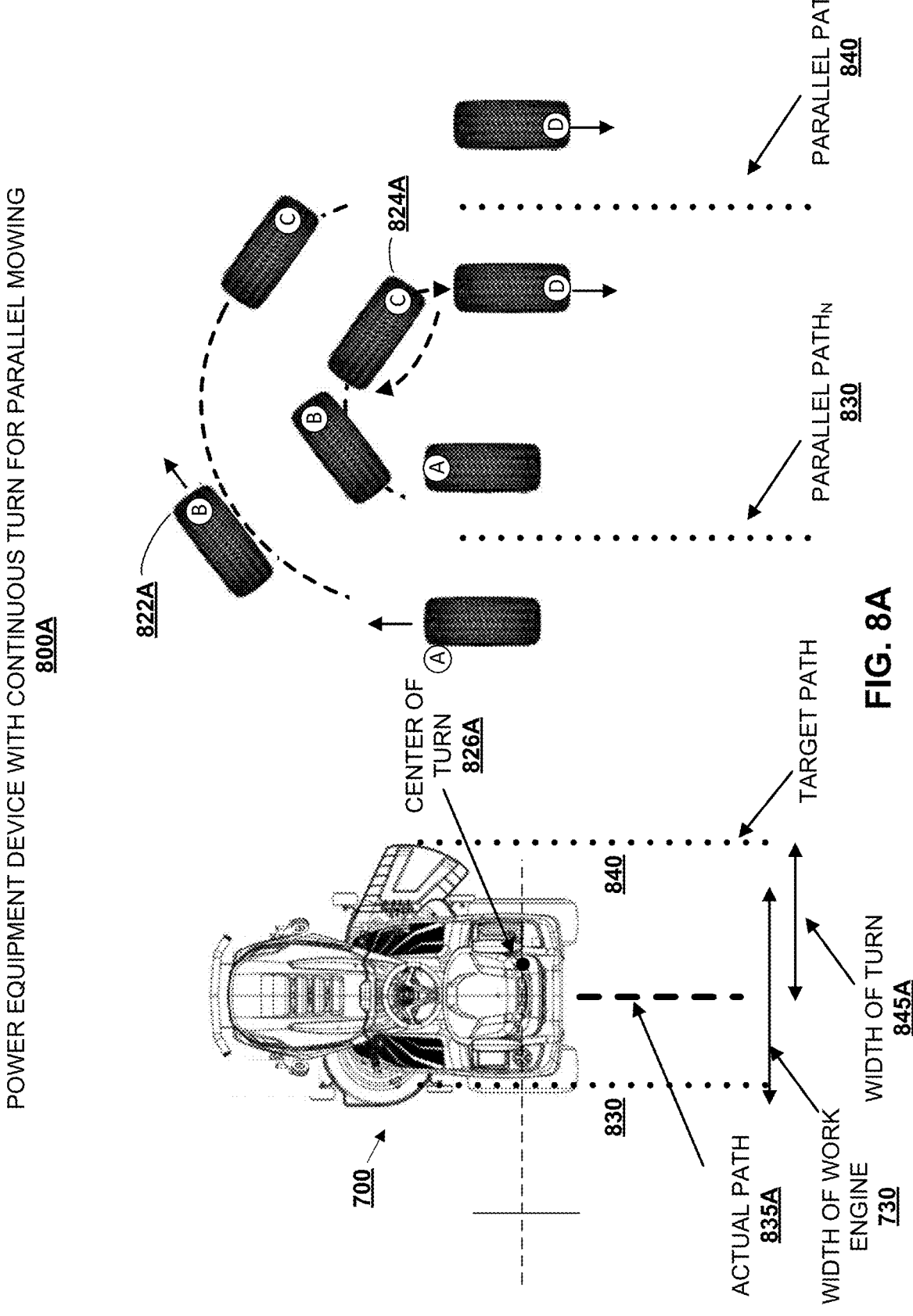
FIG. 8A illustrates a diagram of an example continuous wheel turning embodiment with a turn radius smaller than a width of a power equipment device.

Once the threshold portion of moderate radius constant turn 622B is complete, a second stage zero-radius turn 624B or pivot turn can be implemented (see, e.g., FIG. 8A, infra). The zero-radius turn 624B can be implemented until a current heading of the power equipment device is within a second threshold angular displacement from a completed turn (e.g., 180-degree turn) is performed. The second threshold angular displacement can be between 15 to 30 degrees from completion of the turn, or any suitable value or range there between. Angular rotation of the power equipment device during the second stage zero-radius turn 624B can be measured by IMU position location, in various embodiments.

Upon completion of zero-radius turn 624B, a third stage auto-turn 626B can be implemented, utilizing an algorithm for generating steering adjustment data to align a current heading of the power equipment device with a target heading or target path, as described herein (e.g., see FIG. 6, supra). As one of ordinary skill would understand, similar three-state auto turn steering can be implemented for a left hand turn in response to an operator entry of a left auto-turn command, rather than the right auto-turn command 608A.

Figure 6C:
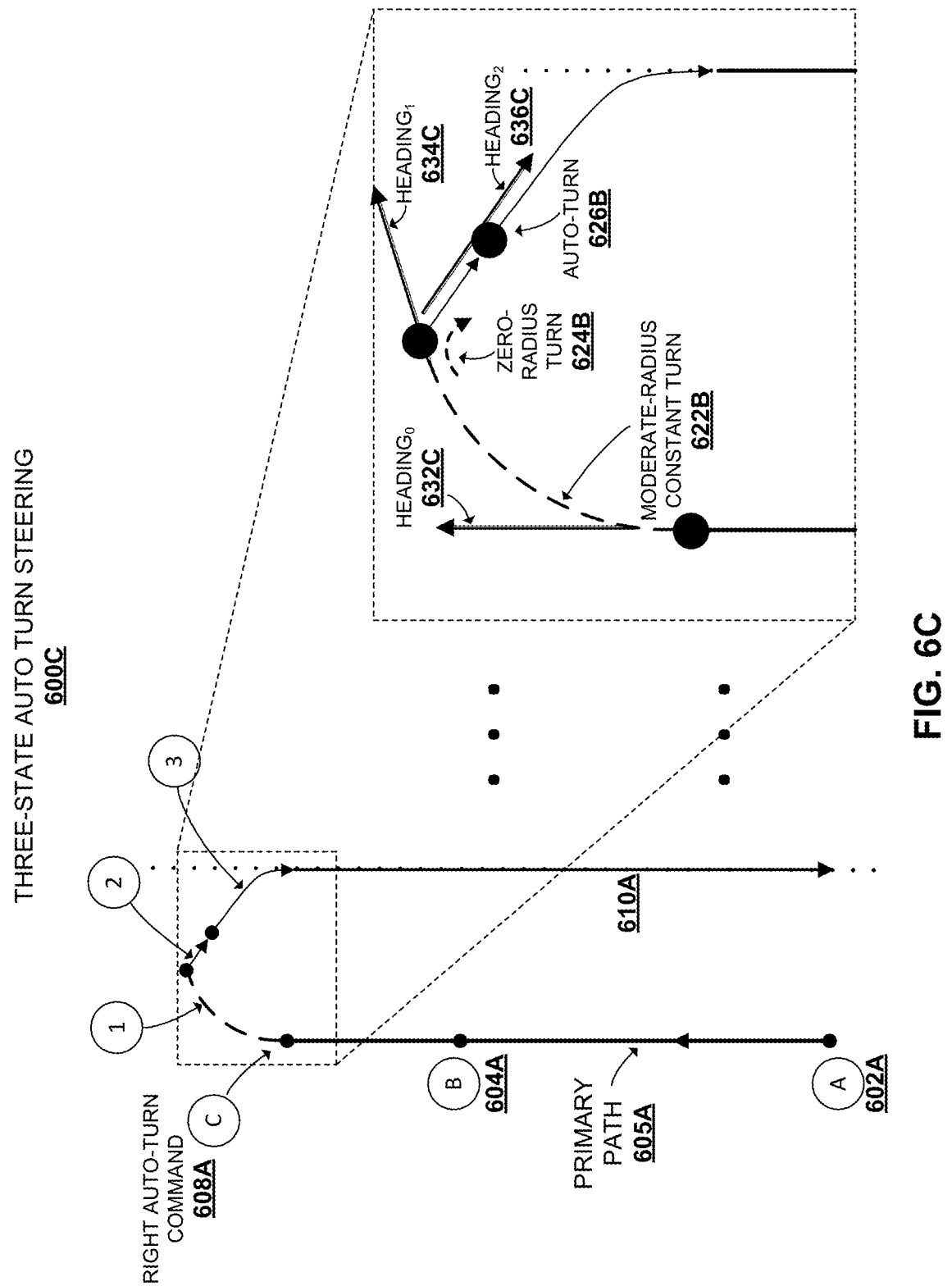
FIG. 6C depicts a diagram of an example three stage auto steering turn algorithm according to additional embodiments of the present disclosure.

FIG. 6C depicts an embodiment of a three-state auto turn steering 600C. A primary path 605A can be determined as described herein, and subsequent paths 610A generated from the primary path 605A. A right auto-turn command 608A is initiated at point C, resulting in initiation of three-state auto turn steering 600C. In an embodiment, continuous motion of all wheels of the power equipment device can be maintained throughout three-state auto turn steering 600C, to minimize or avoid turfing the ground covered throughout the turn, as described herein.

A first state 1 includes a moderate-radius constant turn 622B that changes direction of a power equipment device from an initial $heading_0$ 632C. The constant turn can be implemented in which change in heading over time is constant or approximately constant. In an embodiment, the heading data for moderate-radius constant turn 622B can be determined from a local heading estimation device, rather than GPS or another wireless device. In a further embodiment, the heading data can be switched from a GPS-determined heading (utilized for primary path 605A or subsequent paths 610A) to a local measurement device heading (e.g., determined from relative left-right odometer measurements) upon initiation of moderate-radius constant turn 622B. As a result, a $heading_1$ 634C for moderate-radius constant turn 622B can be determined from the local measurement device. Moderate-radius constant turn 622B can be maintained until a threshold angular displacement between $heading_1$ 634C and $heading_0$ 632C is reached. The threshold angular displacement can be a range of about 20 degrees to about 50 degrees, about 30 degrees to about 40 degrees, or any suitable value or range there between. In an embodiment, the threshold angular displacement can be about 20 degrees, about 25 degrees, about 30 degrees, about 35 degrees, or about 40 degrees or any suitable value there between.

Upon reaching the threshold angular displacement for $heading_1$ 634C, a second state 2 of three-state auto turn steering 600C an initiate. Second state 2 changes from moderate-radius constant turn 622B to a zero-radius turn 624B, that rotates the power equipment device from $heading_1$ 634C to a $heading_2$ 636C with minimal (or no) translational movement of the power equipment device. Zero-radius turn 624B completes when a displacement between $heading_2$ 636C and a target heading along subsequent path 610A is meets a second angular displacement threshold. The second angular displacement threshold can be in a range of about 50 degrees to about 70 degrees, about 55 degrees to about 65 degrees, in other embodiments, or any suitable value or range there between. In at least one embodiment, the second angular displacement threshold can be about 50 degrees, about 55 degrees, about 60 degrees, about 65 degrees or about 70 degrees, or any suitable value there between.

Upon completing the second state 2 of three-state auto turn steering 600C, an auto-turn 626 is implemented, as described herein. Auto-turn 626 is not constrained to a constant (or approximately constant) change in heading over time, nor to a change in heading within minimal or no translation. Rather, auto-turn 626B can employ an algorithm for minimizing linear displacement between the power equipment device and subsequent path 610A, or minimizing angular displacement between a current heading of the power equipment device and a heading of subsequent path 610A, or a suitable combination of the foregoing. In a further embodiment, during auto-turn 626B, heading determinations can switch from the local heading measurement device (e.g., left-right odometer readings) to wireless/satellite-based position location heading determinations once a threshold distance is traversed after initiation of auto-turn 626B. The threshold distance can be set according to position accuracy characteristics of the wireless/satellite-based position location to meet target design constraints.

Figure 6D:
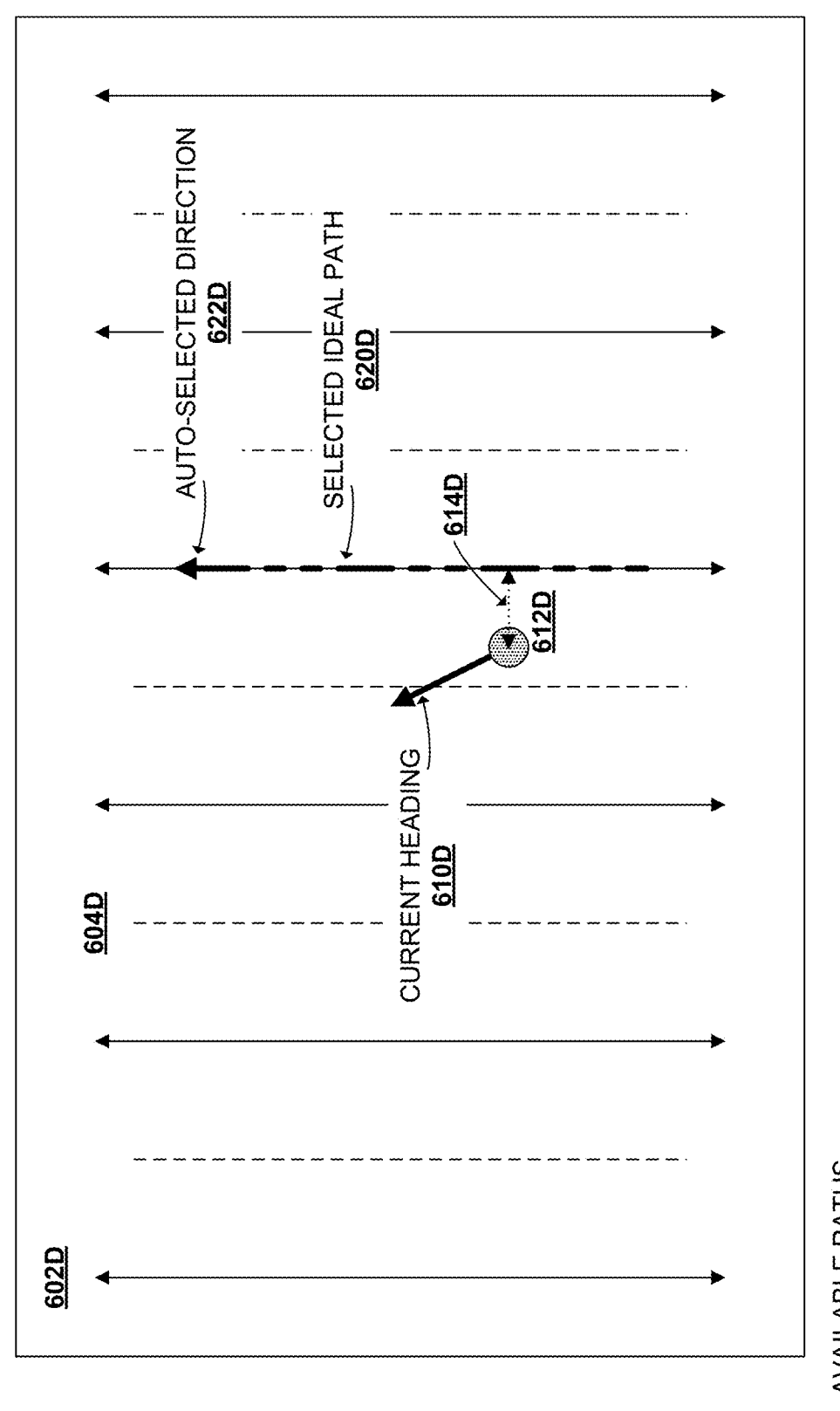
FIG. 6D illustrates a diagram of an example auto-path selection for an assisted steering device, in an embodiment.
Figure 6E:
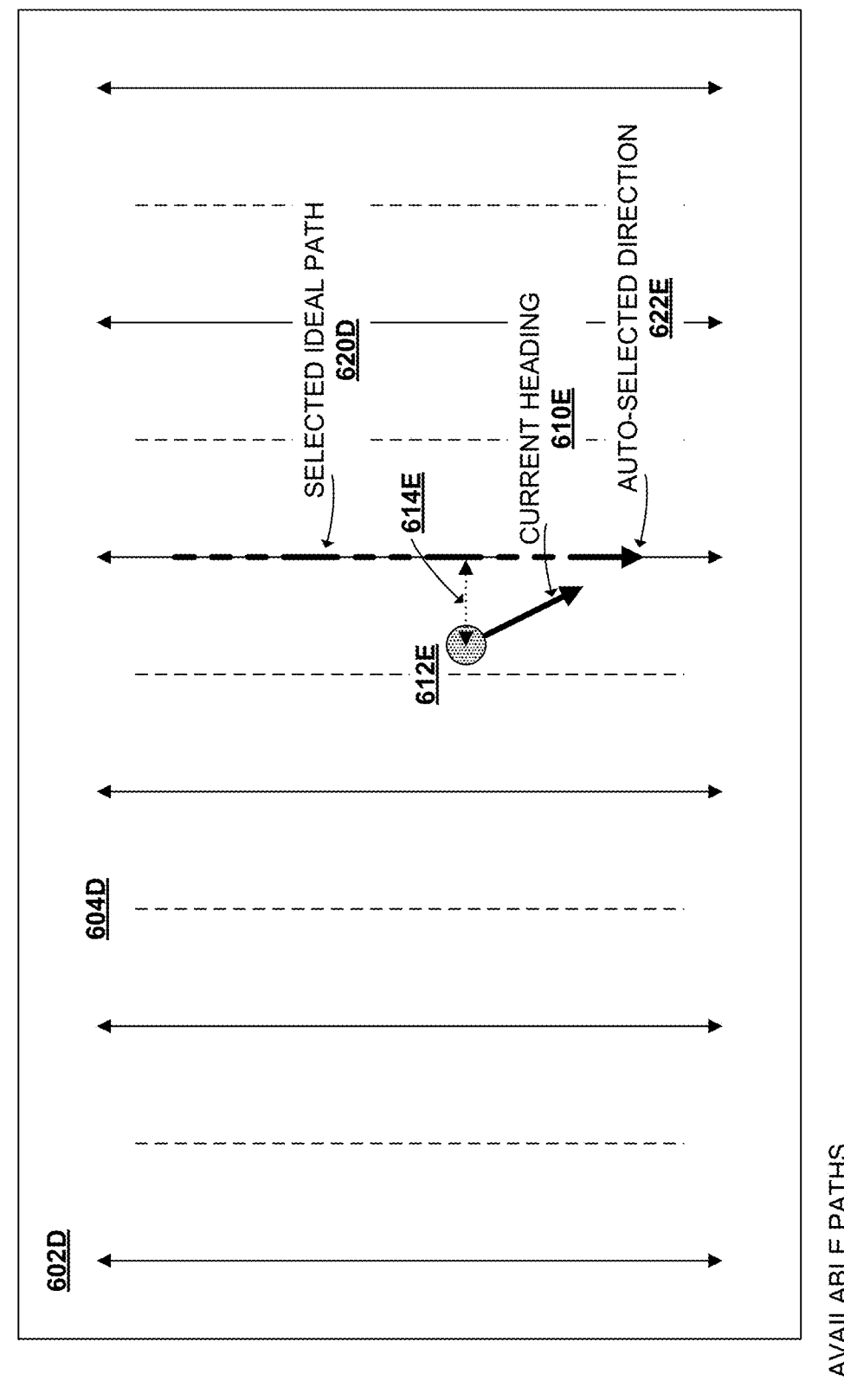
FIG. 6E depicts a diagram of a sample auto-path selection for an assisted steering device, according to another embodiment of the present disclosure.

FIGS. 6D and 6E illustrate embodiments in which different headings are selected by an example auto steering engagement 600D of a disclosed power equipment control unit 502. Referring first to FIG. 6D, available parallel paths 602D are illustrated with solid lines and path separations 604D between available parallel paths 602D. Path separations 604D can serve to illustrate a demarcation between nearest parallel paths 602D to be selected by auto steering engagement 600D. Thus, a power equipment device at position location 612D having a measured distance 614D from selected ideal path 620D, can be determined to be nearest to selected ideal path 620D. As a result, example auto steering engagement 600D will select ideal path 620D as a target path for auto-steering in response to a user auto-turn input at position location 612D. Additionally, a current heading 610D of the power equipment device is acquired and compared with a first direction (e.g., upward on the page along auto-selected direction 622D) or a second direction (e.g., downward on the page). The direction (e.g., first direction or second direction) having the smallest angular deviation from current heading 610D is selected by auto-steering as the target heading. For the example current heading 610D depicted by FIG. 6D, auto-selected direction 622D (upward on the page) has the smaller angular deviation from current heading 610D, and thus is selected by the auto-steering as the target heading.

FIG. 6E illustrates an example auto-steering engagement 600E for a different position location 612E and a different current heading, specifically current heading 610E. Position location 612E, while slightly different from position location 612D of FIG. 6D, is still nearest to selected ideal path 620D as established by measured distance 614E. Accordingly, the auto-steering engagement 600E chooses selected ideal path 620D to be the target path, similar to the example provided above for FIG. 6D. In contract, current heading 610E has a smaller angular deviation from auto-selected direction 622E (downward on the page), rather than an opposite direction upward along the page. Accordingly, auto-selected direction 622E is selected as the target heading by the auto-steering engagement 600E.

Figure 6F:
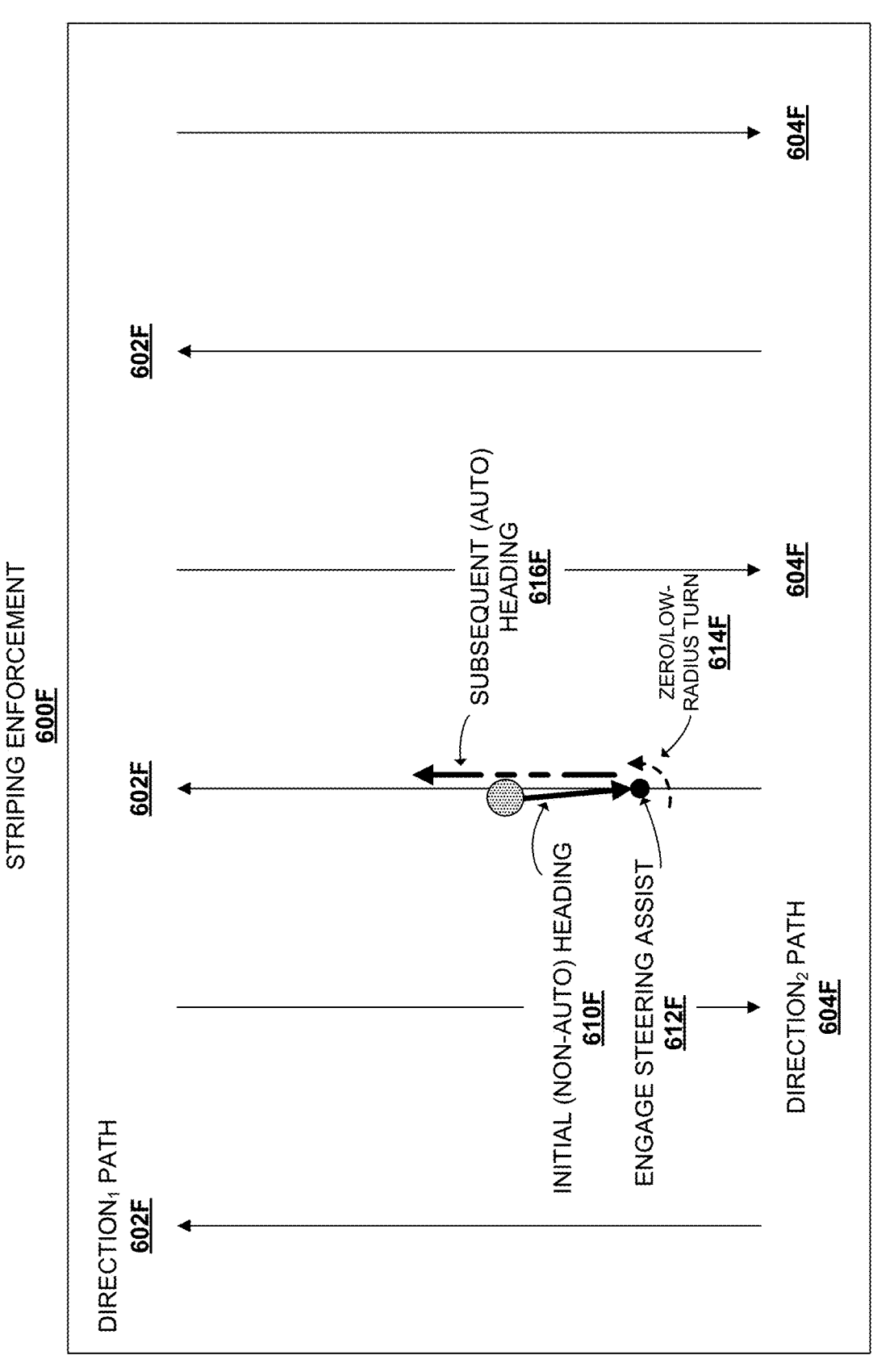
FIG. 6F illustrates a diagram of an example auto-steering algorithm for enforcing direction on predetermined paths of a power equipment device, in an embodiment(s).

FIG. 6F illustrates a diagram of an example embodiment for enforcing striping direction 600F, in an embodiment. Enforcement of striping direction 600F can be implemented to achieve a desired aesthetic appearance resulting from traversing ground with a power equipment in one direction versus a second direction (e.g., see FIG. 5, striping enforcement module 529, supra). In an embodiment, different directions of travel can be enforced for different virtual paths or groups of virtual paths calculated according to various embodiments disclosed herein, known in the art, or the like. Striping enforcement 600F is not limited to any particular number of enforced directions on any number of associated virtual lines, and directions/lines parallel, perpendicular, diagonal or any suitable relative angle and associated direction are envisioned within the scope of the present disclosure.

As illustrated by FIG. 6F, a first set of paths 602F have a first direction: direction$_1$ defined thereto. Additionally, a second set of paths 604F have a second direction: direction$_2$ assigned thereto. With auto-steering disengaged (e.g., in manual user-operated steering mode) an initial heading 610F inconsistent with an enforced direction of a given path 602F, 604F can occur. In response to engaging steering assist at 612F, a target path for the power equipment device is determined. The target path can be stored in memory, in an embodiment (e.g., previously selected, either from distance/location information or in response to a user selection of the target path), or can be selected as the nearest path of first set of paths 602F and second set of paths 604F to the position location of the power equipment device in response to engaging steering assist 612F. Once the target path is determined, an enforced direction: direction$_1$ or direction$_2$ for the target path is determined. Where a current heading of the power equipment device is less than a first threshold angle from the enforced direction of the target path, auto-steering can be utilized to align the current heading with the target path. Where the current heading is larger than the first threshold angle (or larger than a second threshold angle), a zero/low radius turn 614F can be implemented to spin the power equipment in a direction that minimizes the angular displacement between the current heading and the direction of the target path. As illustrated in FIG. 6F, auto-turn is then engaged 616F to maintain a heading along the directions of target path 602F.

FIG. 7 illustrates a block diagram of an example power equipment device 700 with continuous turn for parallel mowing, in further disclosed embodiments. The block diagram on the right of FIG. 7 depicts power equipment device 700 comprising an equipment state and location estimator 708, which can be substantially similar to equipment state and location estimator 504, described supra. A power equipment control unit 704 is provided including a continuous motion turning module 706. Continuous motion turning module 706 is configured to maintain forward (or reverse) rotation of steering and drive wheels about a center of turn 726 of power equipment device 700 when turning. Continuous motion turning module 706 can utilize a steering and drive system 710 to implement a turn, including maintaining forward (or reverse) rotation of the steering wheels, the drive wheels, or both the steering wheels and the drive wheels. It should be appreciated that continuous motion turning module 706 need not maintain constant motion of any wheel; rather, the rate of motion of a wheel(s) can be changed by continuous motion turning module 706 during a turn, and in some embodiments a direction of motion (forward or reverse) can change throughout the turn, according to various embodiments (e.g., see FIG. 8A).

In some embodiments, the steering and drive system 710 can change direction of the steering wheels while allowing the steering wheels to rotate freely and independently (see, e.g., U.S. Pat. No. 9,944,316 or U.S. Pat. No. 9,409,596, assigned to the assignee of the present application for patent and incorporated by reference hereinabove). FIG. 7 illustrates an embodiment of a rear wheel directed turn, in which the rear wheels rotate at different speeds on different axis to accomplish a turn. FIG. 8 illustrates an embodiment of a front wheel directed turn (with front wheel steering), and FIG. 8A a low-radius rear wheel turn, each of which maintain motion of all wheels throughout the turn (though potentially at different speeds and directions).

In the embodiment of FIG. 8, a front wheel traversing a longer outer turn path (e.g., see FIG. 8, 822, infra) can rotate at a faster rate than a second front wheel traversing a shorter (yet non-stationary) inner turn path (e.g., 824 of FIG. 8). Likewise, in the prior embodiment a rear wheel traversing a longer outer turn path 722 rotates faster than a second rear wheel traversing a shorter inner turn path 724. This can be significant for a center of turn 726 that is close to power equipment device 700. For example, a turn that results in a path displaced by one width of a work engine 730 (optionally plus a target overlap 732, for example: several centimeters or less; about 2 cm; etc.) can result in a low radius turn. In some embodiments, although not explicitly depicted, power equipment device 700 can accomplish a zero radius turn (e.g., where center of turn 726 is between the rear wheels). Furthermore, power equipment device 700 can be configured to avoid a turn in which center of turn 826 is coincident with a wheel of power equipment device 700 (e.g., a turn which, if performed, could result in that wheel not rotating to accomplish the turn).

Direction of the steering wheels is selected to cause each of the steering wheels to maintain continuous (though not necessarily constant) rotation throughout the turn, for instance as depicted by inner wheel rotation for non-stationary inner turn path 724. The continuous turn of inner wheel rotation can mitigate or avoid divots, compression or unsightly marks within turf resulting from a pivot about a non-rotating wheel. This can improve aesthetic quality of turf operated upon by power equipment device 700.

In alternative embodiments, steering and drive system 710 can comprise independent left wheel control 712 and right wheel control 714. Wheel controls 712, 714 can turn the left wheel independently of the right wheel. In some embodiments, wheel controls 712, 714 can both turn and drive the left wheel independent of the right wheel (e.g., for a front wheel drive and front wheel steer power equipment device). In either embodiment(s), left wheel control 712 can turn a left steering wheel at a first steering angle to accomplish a turn (e.g., outer turn path 722). Likewise, right wheel control 714 can turn the right steering wheel at a second steering angle to accomplish a turn (e.g., inner turn path 724). In these embodiments, continuous motion turning module 706 is configured to generate suitable turn angles (and optionally drive speeds) for the left wheel and right wheel to accomplish a particular turn. Front wheels 728 can be configured to rotate freely in response to drive from the rear wheels, in other embodiments.

FIG. 8 depicts a diagram of an example power equipment device 700 with continuous turn 800 utilizing front wheel steering for parallel mowing, according to alternative or additional embodiments of the present disclosure. Power equipment device 700 is depicted executing a low radius turn (or can accomplish a zero radius turn in some embodiments) with a center of turn 826 as depicted (or with a center of turn 826 located between the rear wheels for zero radius turn embodiments). Starting from a first path 830, center of turn 826 produces a turn onto a subsequent path 840 displaced by a width of a work engine 810 plus a target overlap 812 (e.g., about 2 cm; about 3 to about 5 cm; several cm or less, or the like).

An outer turn path 822 for an outer drive wheel and inner turn path 824 for an inner drive wheel is depicted. Both drive wheels turn about center of turn 826, and maintain continuous (though not necessarily constant) rotational movement throughout the turn. The outer turn path 822 follows continuous forward rotational motion starting in a first direction (e.g., directed to the top of the page) and ending in a second direction (e.g., directed to the bottom of the page). The inner wheel on the turn path 824 starts at point A and follows a tighter radius at a lower speed about a shorter radius inner turn path 824 from A, B, C and D.

In some embodiments, rotational speeds and angles of outer turn path 822 and inner turn path 824 can be controlled by respective wheel controls. In other embodiments, the non-driven wheels (left and right) can be freely rotating, and speeds determined by respective angular speeds resulting from a drive speed of power equipment device 700 and respective turn radii of turn paths 822, 824.

FIG. 8A illustrates a diagram of power equipment device 700 with a continuous turn 800A according to alternative embodiments of the present disclosure. Continuous turn 800A has a width of turn 845A that is smaller than a width of work engine 730, and thus center of turn 826A is between the rear wheels of power equipment device 700. In the embodiment of FIG. 8A, actual path 835A of power equipment device 700 has shifted inward of parallel path 830 and is closer to parallel path 840 than a full work engine width 730 (plus optional overlap). A turn smaller than the width of work engine 730 is required to align power equipment device 700 with a target path along parallel path 840.

In an embodiment, continuous turn 800A can be a three-state turn, as described above at FIG. 6B or 6C. In this case, the turn can be initiated in response to a turn right command by an operator, causing power equipment device 700 to initiate an automatic right turn with three turn states. An initial state is a moderate radius, constant angle turn at point B. The outer wheel on an outer turn path 822A and inner wheel on an inner turn path 824A move at different speeds but relatively constant steering angle. At point C a zero-radius turn (or pivot turn) is initiated, where outer wheel on outer turn path 822A continues rotating forward, whereas inner wheel on inner wheel path 824A rotates backward as indicated by the dashed inner path line 824A. At point C auto-steering is initiated to align the wheels with a subsequent parallel path 840. Although speed of motion changes for the different tires (and even direction of motion for the inner tire), continuous motion is maintained throughout turn 800A to avoid divots or other marks on turf different from continuous motion or striping.

Figure 9:
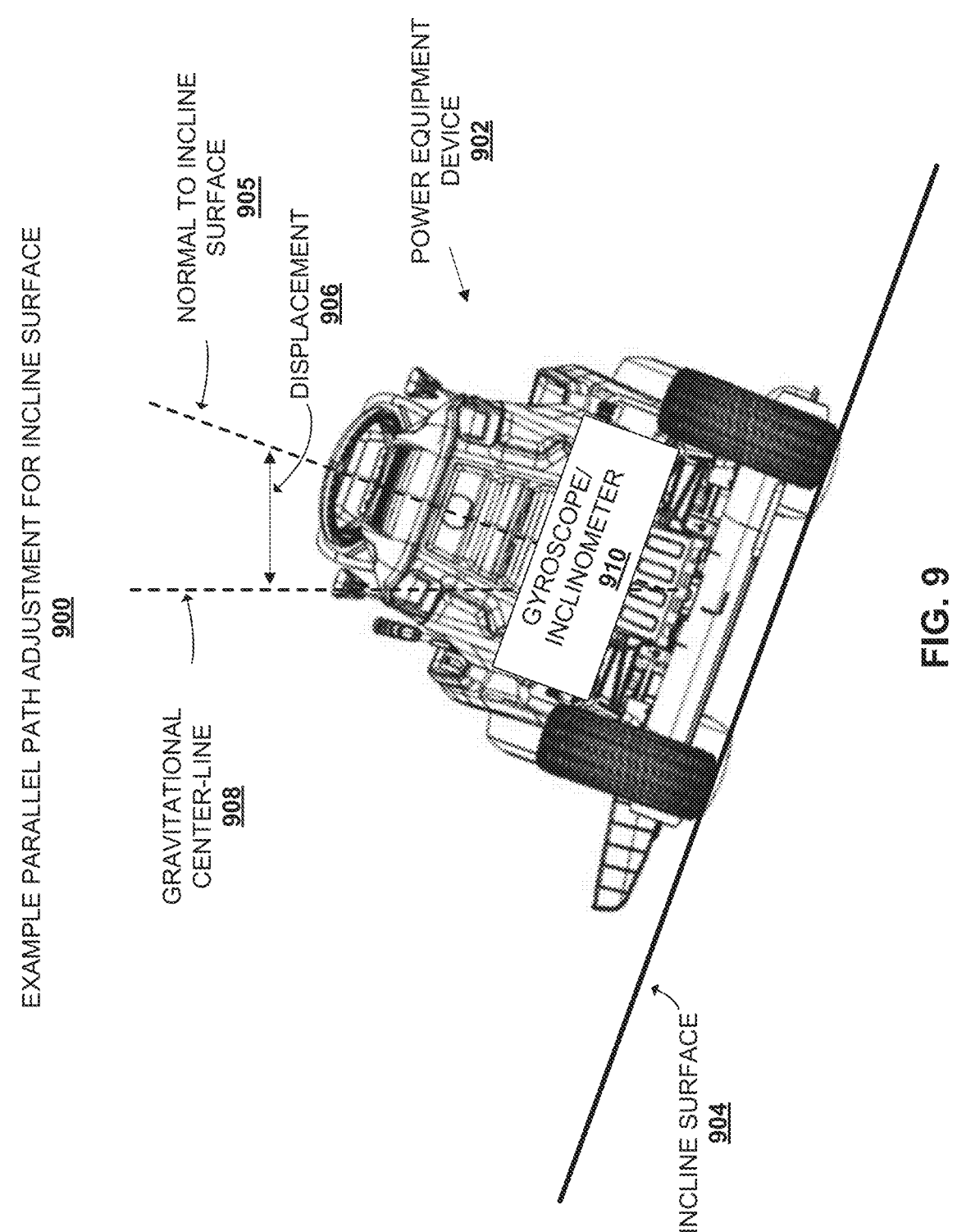
FIG. 9 illustrates a block diagram of a sample power equipment device with position data refinement according to tilt angle of receiver equipment, in an embodiment.

FIG. 9 illustrates a diagram of an example parallel path adjustment 900 for incline surfaces, in further embodiments of the present disclosure. A power equipment device 902 is illustrated that is traversing an incline surface 904. The incline surface causes a rotation of power equipment device 902 about a gravitational center-line 908 of the Earth. A wireless antenna, such as a GPS antenna or wireless communication antenna, aligned along a direction 905 perpendicular to incline surface 904, will experience a displacement 906 from a non-inclined position along gravitational center-line 908 when power equipment device 902 is traversing a flat surface.

A gyroscope/inclinometer 910 is provided to measure an angle of rotation of incline surface 904. Utilizing the measured angle of rotation and a position above ground of the wireless antenna, displacement 906 can be calculated. The displacement 906 can be converted into inclination correction data to refine position location data of power equipment device 902. For instance, the inclination correction data can correct RTK-corrected GPS position location data to further correct for displacement 906, improving accuracy of the position location data.

Figure 9A:
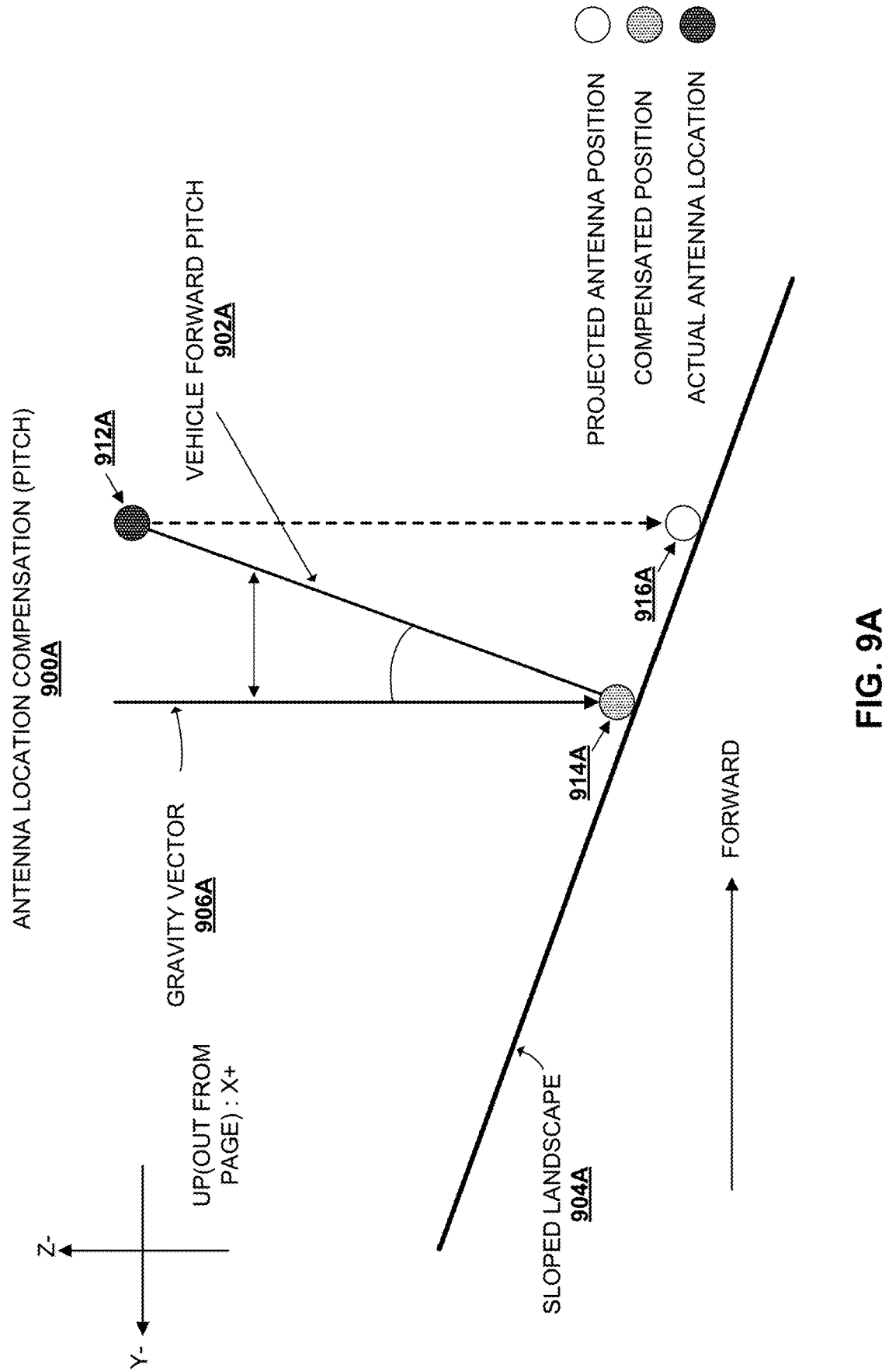
FIG. 9A-9D illustrate example axial and lateral antenna displacement measurement and correction, in an embodiment.

Still further, antenna location compensation 900A for a sloped landscape is illustrated at FIGS. 9A, 9B, 9C and 9D. For instance, FIG. 9A illustrates a sloped landscape 904A having a forward (downward) pitch 902A in a direction of motion of power equipment device 902. An actual antenna position 912A is displaced from a gravity vector 906A of the Earth, as illustrated. For the example depicted by FIG. 9A, actual antenna position 912A is above the ground approximately at the rear axis of the power equipment device 902 (when viewed from a top down orientation). Projected antenna position 916A depicts the location of the antenna as projected onto sloped landscape 904A in a direction of gravity vector 906A.

To correct for oscillations associated with rear axis position location determinations, distance from the projected antenna position 916A to a projected position on flat ground, or a compensated position 914A, is generated. Rough terrain (such as sloped landscape 904A) can appear as noise on antenna-based location data due to actual displacement of actual position 912A of the antenna from gravity vector 906A. This noise can be corrected by compensating for the forward tilt (pitch) caused by the sloped landscape 904A (as well as tilt in a roll direction; see FIG. 9B, infra), utilizing the distance between projected antenna position 916A and compensated position 914A as an offset to position location data received at the antenna. Displacement in the tilt direction can be measured by an onboard IMU (e.g., a gyroscope and accelerometer, among others) and used to calculate tilt adjustment data for axial compensation data, as described in more detail at FIGS. 9C and 9D.

Figure 9B:
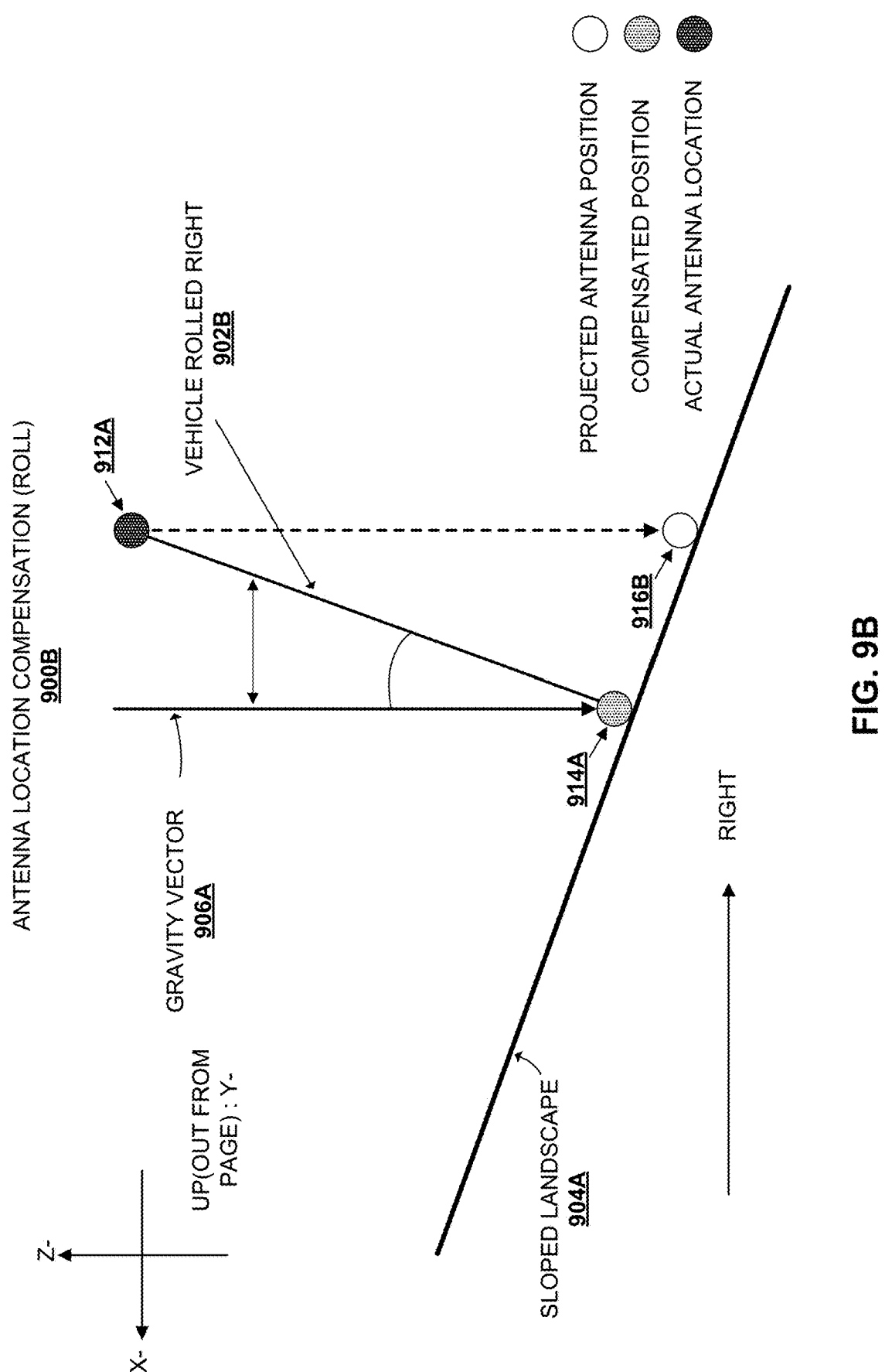

Referring now to FIG. 9B, there is depicted an antenna compensation 900B for tilt in a roll direction (perpendicular to pitch direction of FIG. 9A). In an embodiment, antenna compensation 900B can be the inverse of the roll (left) tilt orientation of power equipment device 902 of FIG. 9, supra. As illustrated by FIG. 9B, sloped landscape 904A can have a slope in a right roll direction perpendicular to the pitch direction illustrated by FIG. 9A, supra. Actual antenna location 912A includes a right roll tilt 902B displaced in the roll direction from gravity vector 906A. As a result, the antenna location 916B projected onto a surface of sloped landscape 904A also has a right roll displacement relative to a projected position of the antenna on flat ground (which would be on gravity vector 906A). This right roll displacement is illustrated at projected antenna location 916B. Similar to the pitch orientation described above at FIG. 9A, roll displacement compensation data can be generated to approximate a shift in position from projected antenna position 916B to compensated antenna position 914A, as illustrated in FIG. 9C.

Figure 9C:
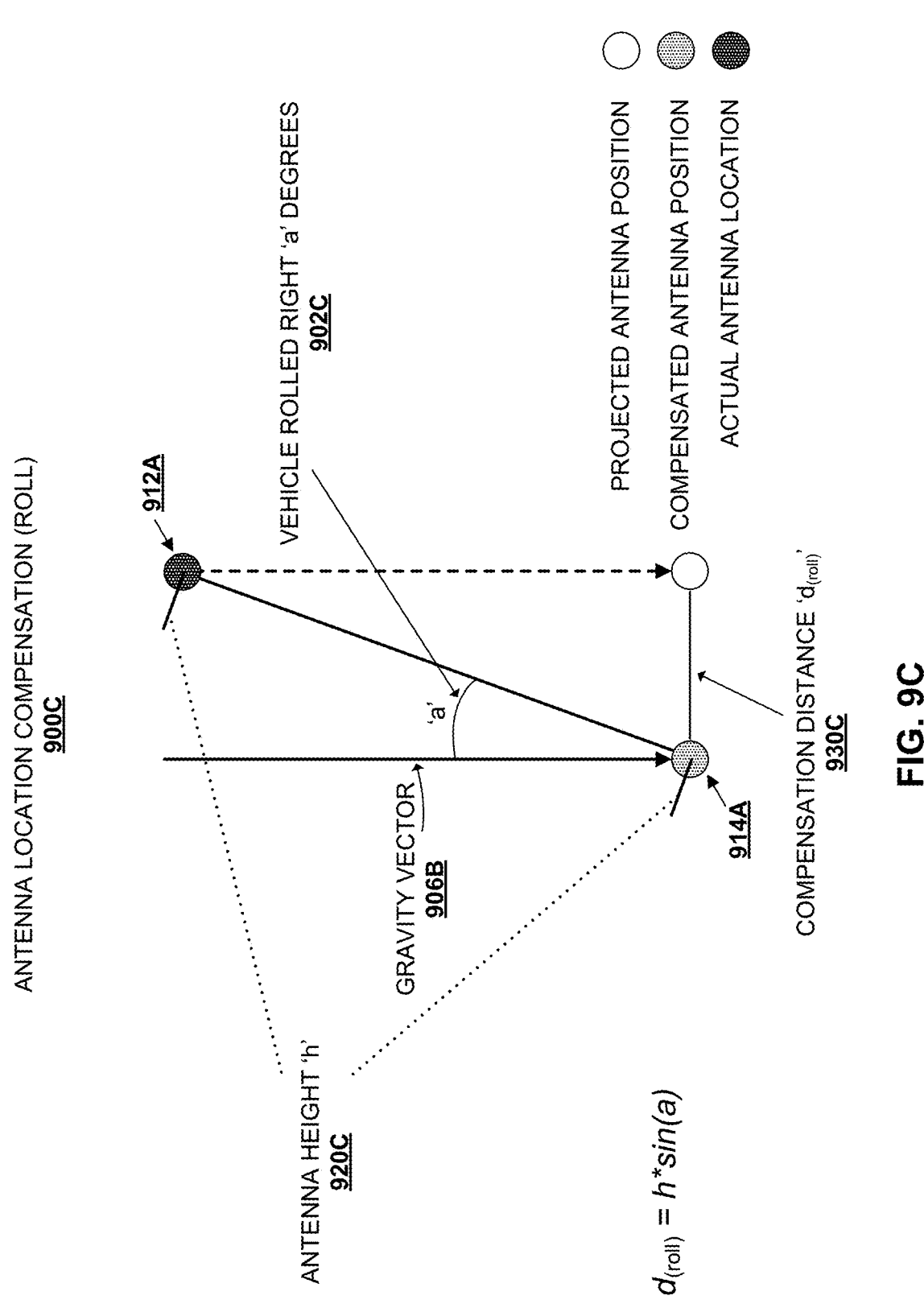

FIG. 9C depicts an antenna compensation 900C for the roll displacement in conjunction with correcting roll and pitch displacements associated with sloped landscape 904A. Although not depicted by FIG. 9C, similar compensation can be implemented for the pitch displacement illustrated by FIG. 9B (see FIG. 9D, infra). As depicted, actual antenna location 912A has a "rolled right" angle 902C of 'a' degrees from gravity vector 906B. This rolled right angle 902C can be utilized in conjunction with the antenna height 'h' 920C to calculate an approximate compensation distance in the roll direction: 'd$_{(roll)}$' 930C. Specifically, 'd$_{(roll)}$' 930C can be calculated as follows:

$$d_{(roll)} = 'h' * \sin('a').$$

Once the roll compensation distance d$_{(roll)}$ is determined, a similar calculation can be implemented to acquire the pitch compensation distance d$_{(pitch)}$, based on antenna height 'h' and an angle of vehicle forward pitch 902A.

Figure 9D:
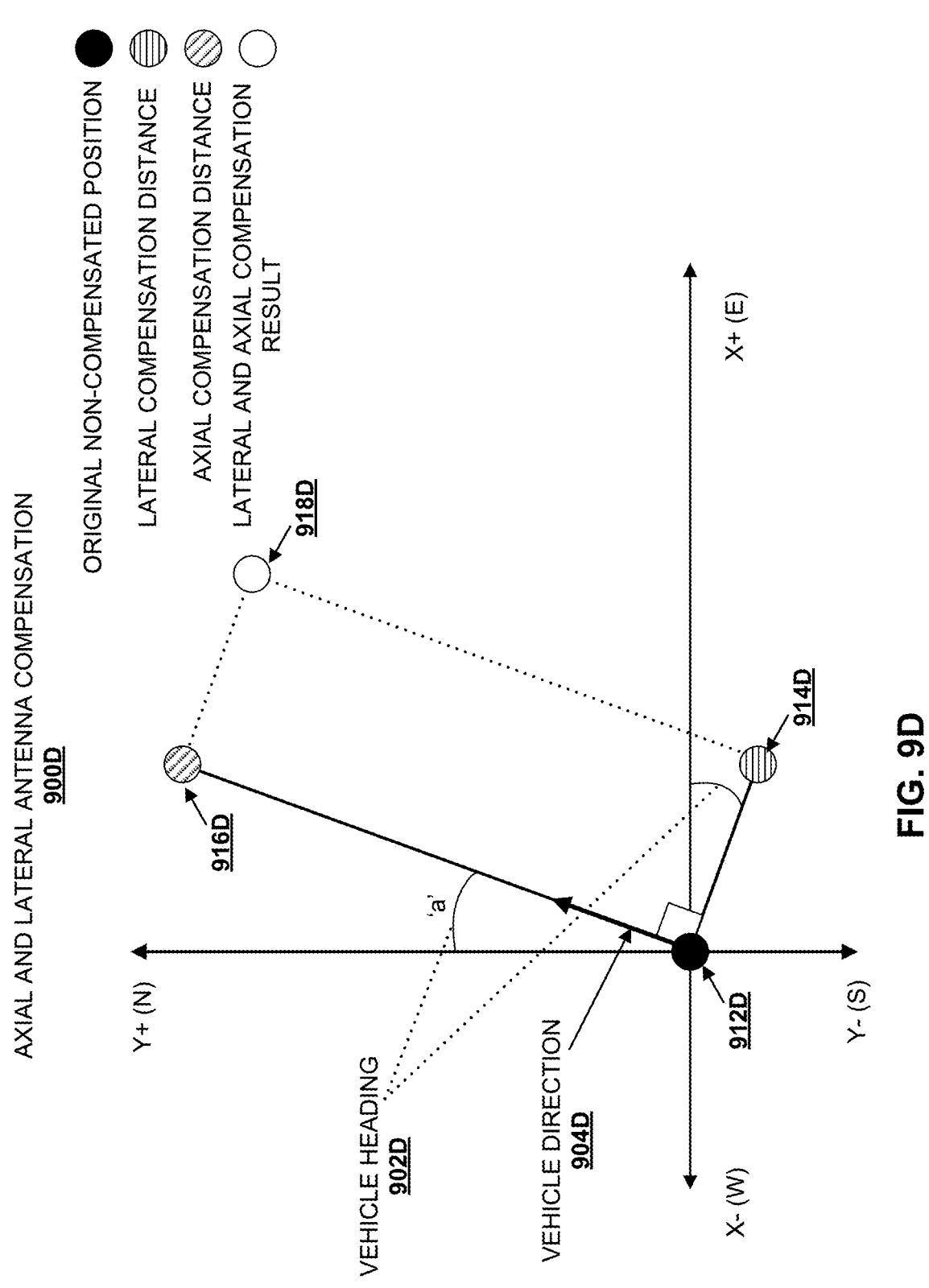

FIG. 9D illustrates an example axial and lateral antenna compensation 900D for a sloped landscape having pitch displacement and roll displacement according to alternative or additional embodiments of the present disclosure. It should be appreciated that similar compensations can be implemented periodically (e.g., several times per second), or when triggered by measurement (e.g., a measured pitch or measured roll exceeding a suitable threshold value, or threshold range), or the like, or a suitable combination of the foregoing. Furthermore, it should be appreciated that axial and lateral antenna compensation 900D is not restricted to the parameters provided for pitch and roll displacements of FIGS. 9A-9C, above, although analogous principles can be applied to correct for those displacements as well.

As illustrated in FIG. 9D, a vehicle direction 904D is mapped within a coordinate system oriented by Y+ (north) and X+ (east) vectors as indicated, for a position location 912D of an antenna of power equipment device 902. For the embodiment depicted, relative x and y values correspond to magnitude of x and y compensation required for position location 912D and vehicle direction 904D as measured from associated roll and pitch displacements (e.g., see FIGS. 9-9C).

Angular displacement from the Y and X axis are given by vehicle heading 902D. Components for lateral compensation 914D and axial compensation 916D can be respectively calculated. A lateral and axial compensation result 918D is generated from the lateral compensation 914D and axial compensation 916D calculations, and utilized to correct for measured pitch and roll displacement for the antenna position location 912D of the power equipment device 902. The corrected pitch and roll displacement values can be utilized to estimate antenna position location data on flat ground. Correcting such displacement values periodically (e.g., for each position location data point and at a frequency the same or similar to the frequency of position location data point generation) or upon detection of a displacement exceeding a threshold displacement, can facilitate correcting noise caused by varying slopes in landscape (see also FIG. 15, infra).

In some embodiments, these pitch and roll compensation calculations can be utilized in conjunction with correction of RTK position location data (e.g., see FIGS. 9J-9L, infra) to provide incline-corrected position location data together with detection and correction of RTK-based errors. In alternative or additional embodiments, these compensated values can be used in conjunction with virtual antenna position location (shifted along a direction of motion) to apply incline-corrected position location data for dampening auto-steering oscillations about a target path, as described at FIG. 9E, infra. Generally, pitch and roll displacement compensations to refine antenna position can be implemented together with other embodiments throughout the disclosure, as would be suitable to one of ordinary skill in the art.

Figure 9E:
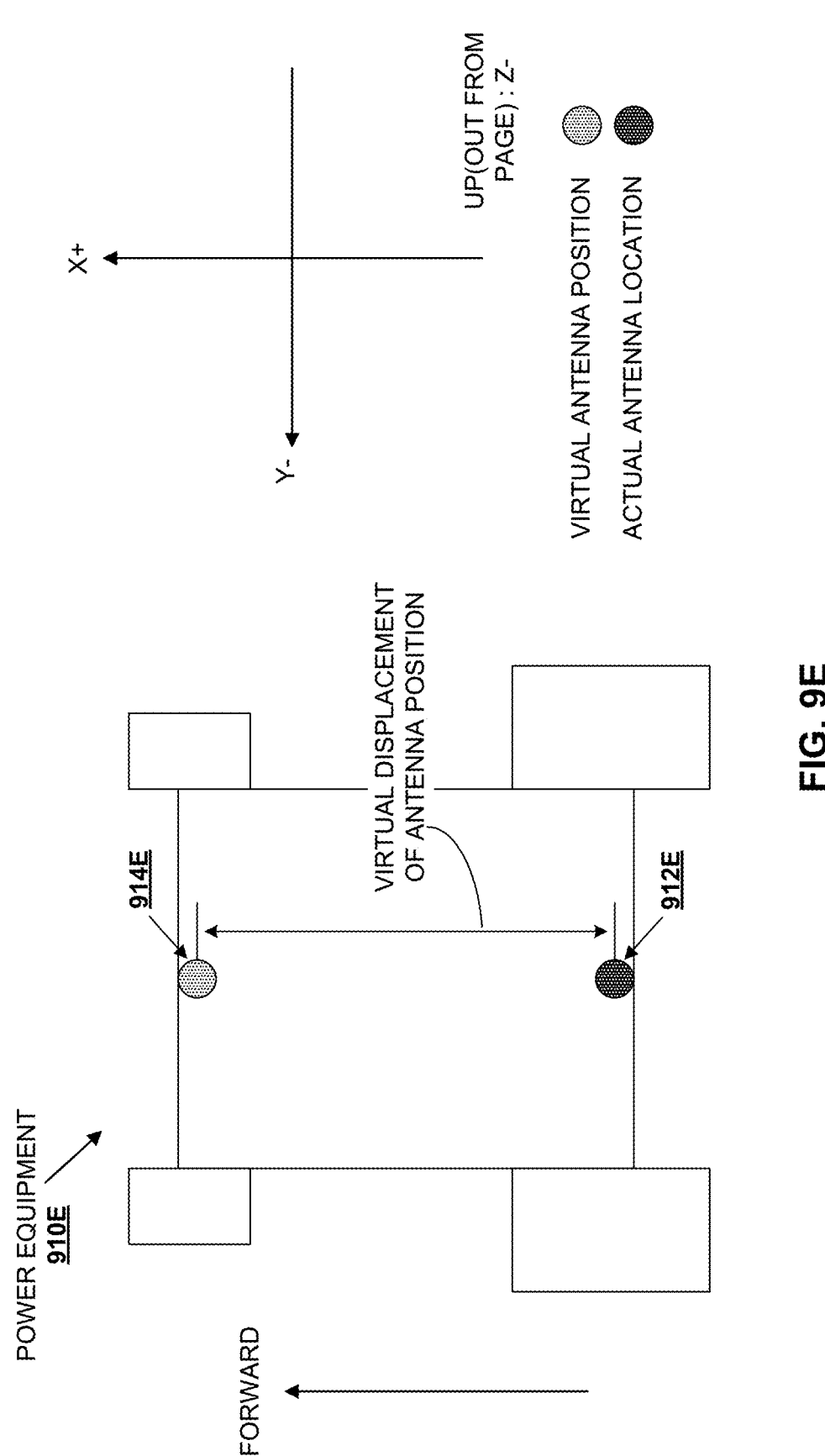
FIG. 9E depicts a diagram of a sample antenna virtual displacement to improve auto-steering for a power equipment device in further embodiments.

FIG. 9E illustrates a diagram of an example virtual antenna location compensation 900E for improving auto-steering results based on comparative position location determinations, according to one or more disclosed embodiments. Satellite based position location data is generally fixed to an antenna that transmits signals received and processed by satellites involved in the position location determinations. This generality extends to RTK-corrected GPS position location data as well. While it may be mechanically convenient to locate a position location antenna near a rear axis of a power equipment device 910E, position data directed at the rear axle can result in auto-steering calculations that tend to cause power equipment device 910E to oscillate with fairly wide magnitude (e.g., several inches or more) and sharp corrections about a target path, rather than travel in a comparatively straight line (e.g., within a few inches or less, such as 1-3 inches or less, 2 inches or less, etc.) with more dampened corrections along the target path.

The virtual antenna location compensation 900E of FIG. 9E provides a mechanism for mitigating or avoiding auto-steering oscillations described above. For example, position location data for an actual antenna location 912E depicted near a rear axis of power equipment device 910E can be virtually displaced to a virtual antenna position 914E near a steering axis (e.g., front axis) of power equipment device 910E. Virtual displacement can be implemented by adding a displacement factor to position location data in a direction of motion of the power equipment device 910E. For instance, where power equipment device 910E is moving forward in a +X direction, the displacement factor can be added to position location data in the +X direction resulting in a virtual antenna position 914E as illustrated in FIG. 9E.

In addition to the foregoing, virtual antenna position 914E can be utilized for generating steering adjustment data to implement auto-steering, in various embodiments. For instance, virtual antenna position 914E can be utilized for determining displacement of power equipment device 910E from a target path (e.g., measured distance 614D from selected ideal path 620D of FIG. 6D, or measured distance 614E of FIG. 6E). In addition, virtual antenna position 914E can be utilized to determine a current heading (e.g., 610D, 610E) of power equipment device 910E, as well as angular displacement of power equipment device 910E from the target path. Correction data for the displacement and angular displacement to steer power equipment device 910E to the target path can be generated for virtual antenna position 914E. As a result, oscillations about the target path resulting from correction data for actual antenna location 912E can be significantly mitigated or even avoided, according to various embodiments.

Figure 9F:
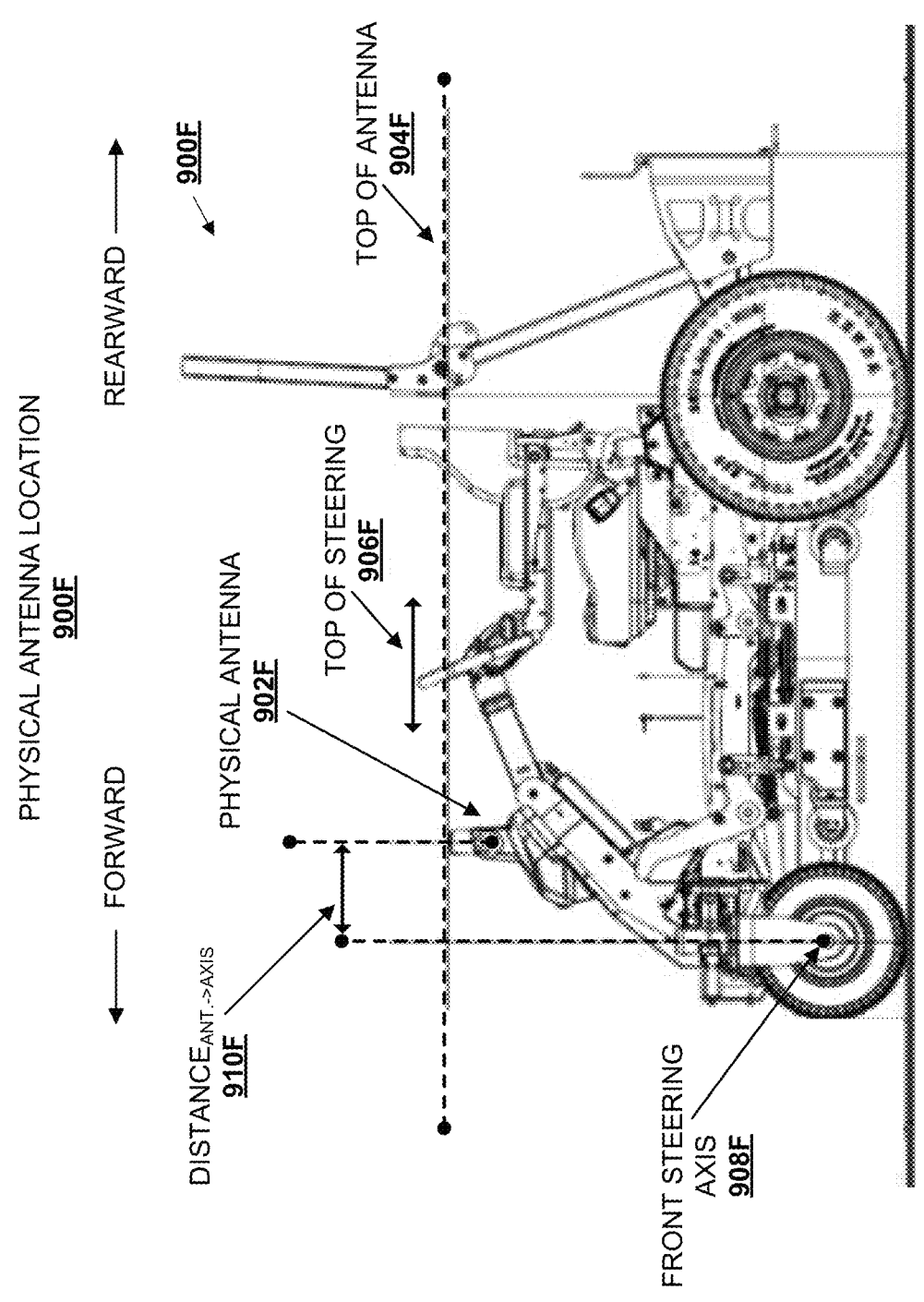
FIG. 9F depicts a diagram of an example power equipment device having a GPS antenna located forward of a driver position, in an embodiment.

FIG. 9F illustrates an alternative embodiment of the present disclosure depicting a physical antenna location relative to a power equipment device 900F. A satellite-based antenna (e.g., GPS, etc.) can be positioned forward of the rear wheels of power equipment device 900F, in an embodiment. In a further embodiment, the physical antenna 902F can be forward of a user operating position (e.g., a user seat, a user standing platform). In yet another embodiment, the physical antenna 902F can be forward of a user steering apparatus (e.g., a steering wheel, a set of lap bar steering controls, a drive-by-wire steering control actuator, and so forth). Physical antenna 902F can be located rearward of a front steering axis 908F, in an embodiment, displaced a distance 910F behind front steering axis 908F. In yet another embodiment, a top surface 904F of physical antenna 902F can be below a top surface of 906F of the user steering apparatus. According to alternative or additional embodiments, physical antenna 902F can be positioned approximately midway between left and right wheels of the power equipment device. In yet another embodiment, physical antenna 902F can be mounted on a steering column of the power equipment device, to which the user steering apparatus is likewise mounted, and physical antenna 902F can be below the user steering apparatus on the steering column.

FIG. 9G illustrates a diagram of an example virtual antenna location compensation 900G for improving auto-steering results based on comparative position location determinations, according to alternative disclosed embodiments. Particularly, virtual antenna location compensation 900G can provide virtual antenna compensation for a physical antenna location 912G as described in FIG. 9F, supra. A physical antenna as mounted at physical antenna location 912G on a power equipment 910G can be virtually displaced at or a near a front steering axis 914G of the power equipment 910G. The virtual displacement of the antenna position 916G can have horizontal and vertical displacement components utilized to calculate a virtual position of the physical antenna, that is displaced from the physical antenna location 912G as described above at FIG. 9E.

Similar to virtual antenna position 914E, virtual antenna position 914G can be utilized for generating steering adjustment data to implement auto-steering, in various embodiments. For instance, virtual antenna position 914G can be utilized for determining displacement of power equipment device 910G from a target path (e.g., measured distance 614D from selected ideal path 620D of FIG. 6D, or measured distance 614E of FIG. 6E). In addition, virtual antenna position 914G can be utilized to determine a current heading (e.g., 610D, 610E) of power equipment device 910G, as well as angular displacement of power equipment device 910G from the target path. Correction data for the displacement and angular displacement to steer power equipment device 910G to the target path can be generated for virtual antenna position 914G. As a result, oscillations about the target path resulting from correction data for actual antenna location 912G can be significantly mitigated or even avoided, according to various embodiments.

Figure 9H:
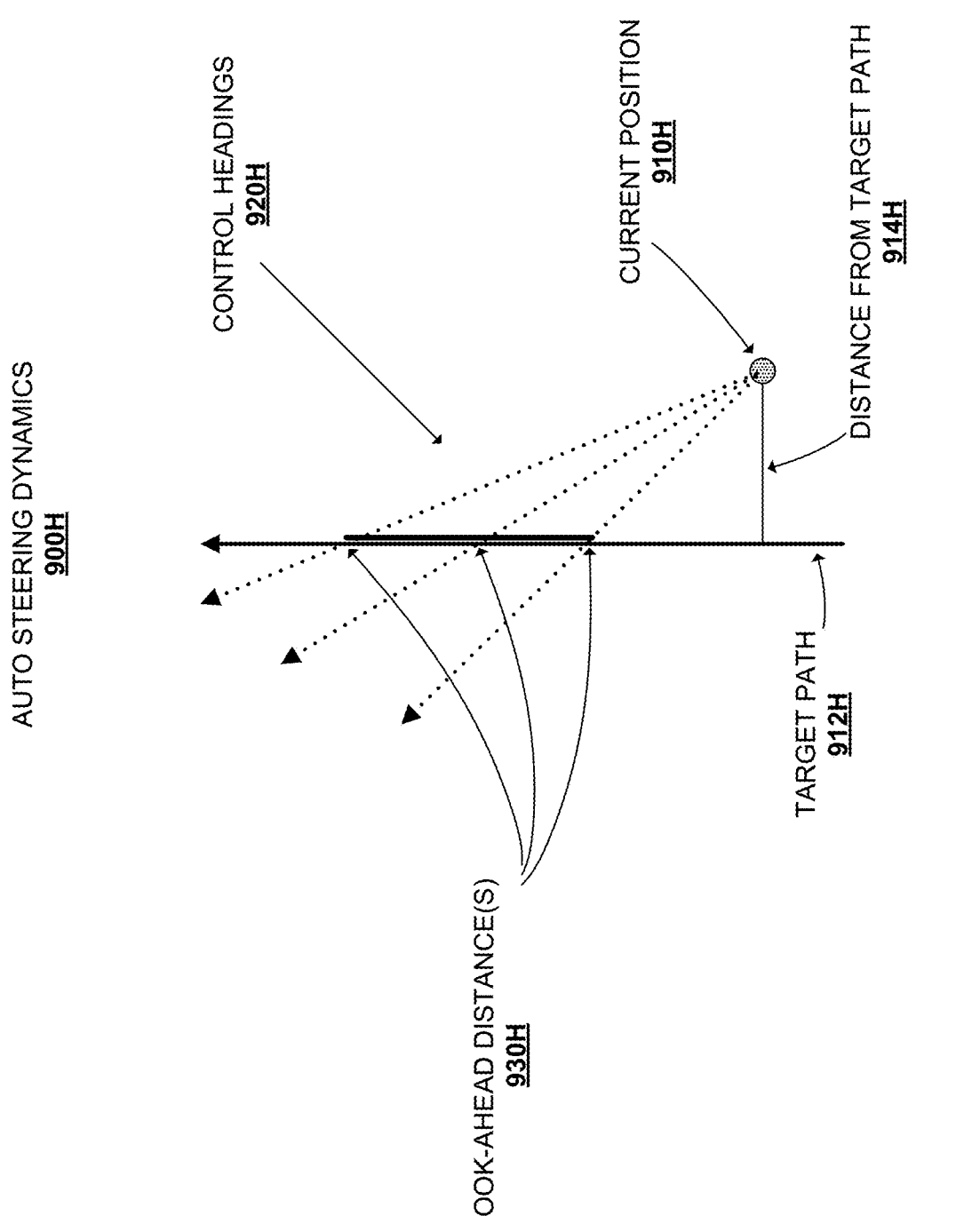
FIG. 9H illustrates a diagram of an example auto-steering path selection compensation analysis, according to one or more further embodiments of the present disclosure.

FIG. 9H provides an illustration of auto steering dynamics 900H according to still further embodiments presented herein. A target path 912H for a power equipment device equipped with autonomous driving (or operator-assisted steering) is illustrated (e.g., power equipment control unit 502, among others disclosed herein). A current position 910H of a power equipment device is illustrated, and a distance from the target path 914H represents displacement of the current position 910H from target path 912H. Location data for the current position 910H and control heading 920H can be determined from current and historical location information (e.g., RTK-based GPS location data) in conjunction with IMU location data. In an embodiment, positive displacement is to the right of target path 912H, and negative displacement is to the left of target path 912H, though a different convention can be employed for other embodiments.

Multiple look-ahead distances 930H are illustrated. A line connecting current position 910H with each look-ahead distance 930H forms a different angle to target path 912H. Respective angles can be calculated from distance from target path 914H and the respective look-ahead distances 930H. In various embodiments, a control heading 920H can be selected based on distance from target path 914H and a selected look-ahead distance 930H. Moreover, the selected look-ahead distance 930H can be dynamically selected based on current speed of a power equipment device, and distance from target path 914H. For instance, larger vehicle speed, greater distance from target path 914H, maintaining a constant vector length, or the like or a suitable combination of the foregoing can be correlated to a shorter look-ahead distance 930H.

Figure 9I:
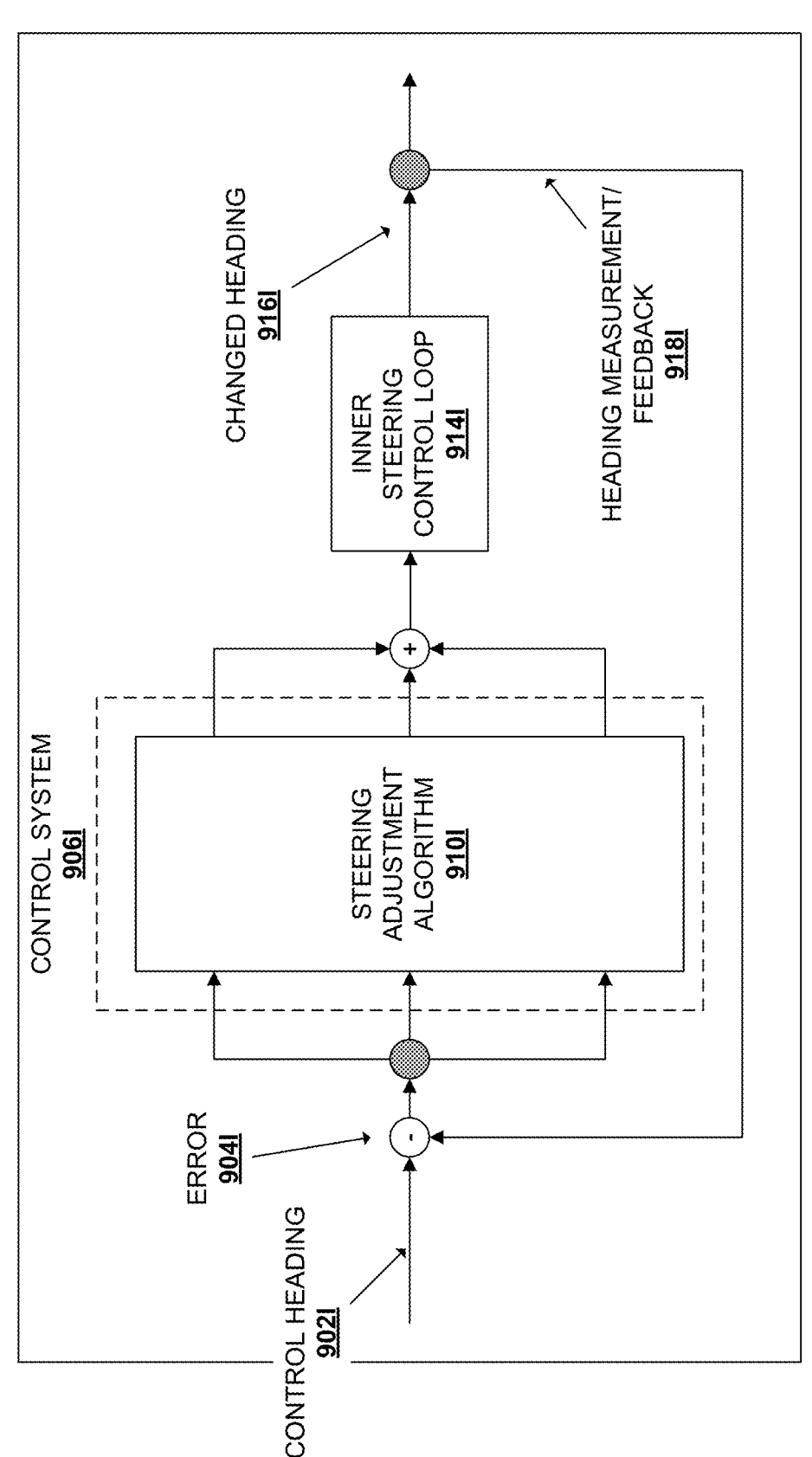
FIG. 9I depicts a block diagram of an example system diagram of an auto steering control system for a power equipment device, in an embodiment.

In additional embodiments of the present disclosure, an auto steering control system 900I is depicted at FIG. 9I. Auto steering control 900I receives a control heading data 902I as an input and a heading measurement/feedback data 918I as a second input and a difference or error 904I between the first input and second input is determined. Control heading data 902I can be a target direction of a target path, such as a parallel line of a set of parallel lines as disclosed herein (e.g., see selected ideal path 620D of FIGS. 6D and 6E, among others). Heading measurement/feedback data 918I can be a direction of travel of a power equipment device generated from position location data (e.g., RTK-based GPS data) or IMU measurement, or a suitable combination thereof (e.g., current heading 610D or current heading 610E, among others disclosed herein). Error 904I can be a difference between control heading 902I and heading measurement/feedback 918I.

The error 904I between the first input and second input is provided to a control system 906I configured to execute a steering adjustment algorithm to generate steering adjustment data to cause a steering control to change direction of the power equipment device to align the power equipment device with the target path. For example, steering adjustment algorithm can provide an output to a summing circuit, which in turn generates a front wheel angle(s) for adjusting steering. In an embodiment, the steering adjustment algorithm 910I can comprise a proportional/integral/differential algorithm, although any other suitable algorithm for receiving an error in heading and generating a correction to the heading to minimize (or reduce) the error, known in the art or reasonably conveyed to one of ordinary skill in the art by way of the context provided herein, can be implemented in alternative embodiments. Steering adjustment data is output from control system to inner steering control loop 914I. Inner steering control loop 914I is configured to change mechanical steering control of the power equipment device to a changed heading 916I (e.g., steering control loop 914I can also utilize a proportional/integral/differential algorithm for changing the mechanical steering control, or other suitable algorithm). Auto steering control 900I can be repeated periodically, as described herein or known in the art, to produce additional changed heading 916I to further align the power equipment device with the target path.

Figure 9J:
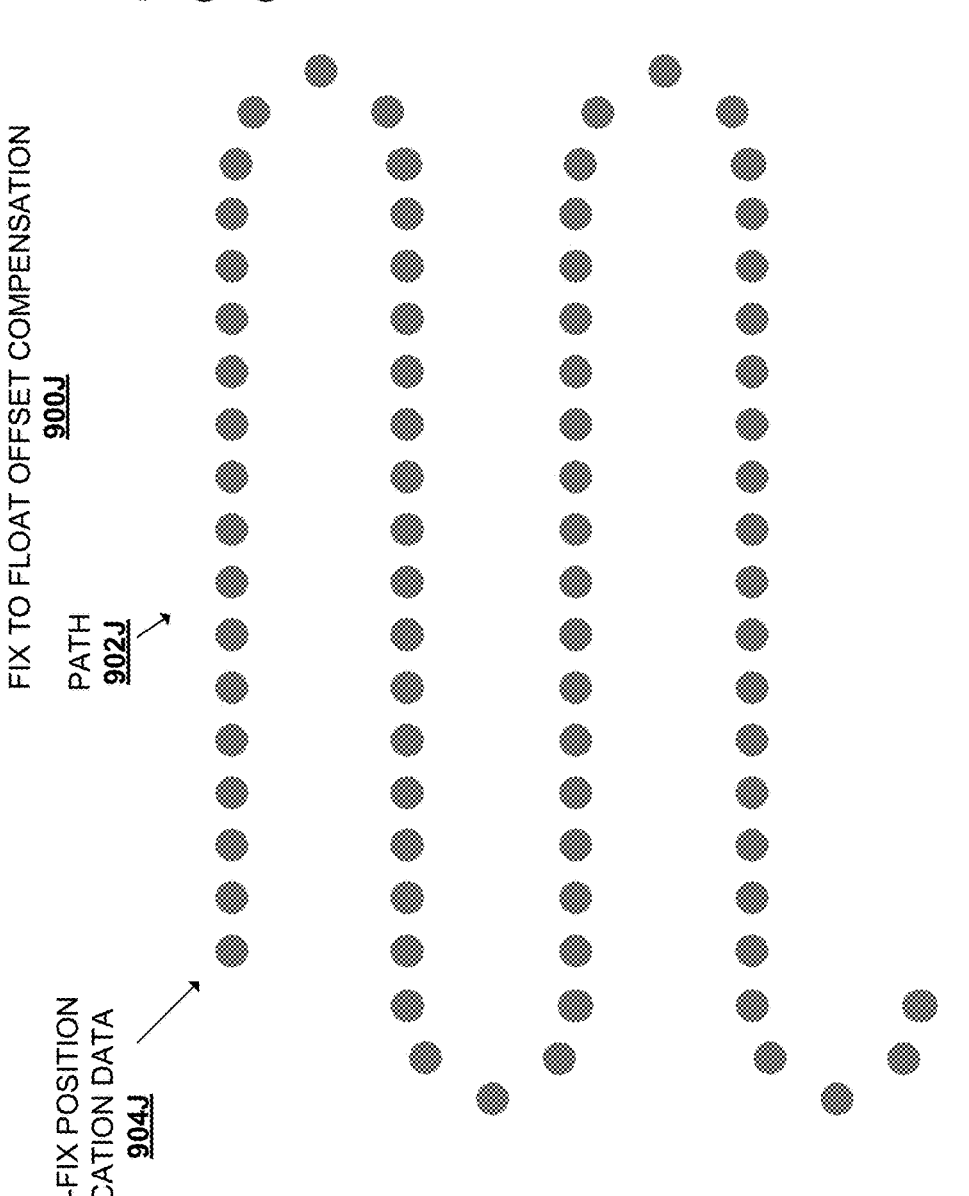
FIG. 9J illustrates a diagram of an example position location path generated by real time kinematic (RTK) Fix position data, in an embodiment.
Figure 9K:
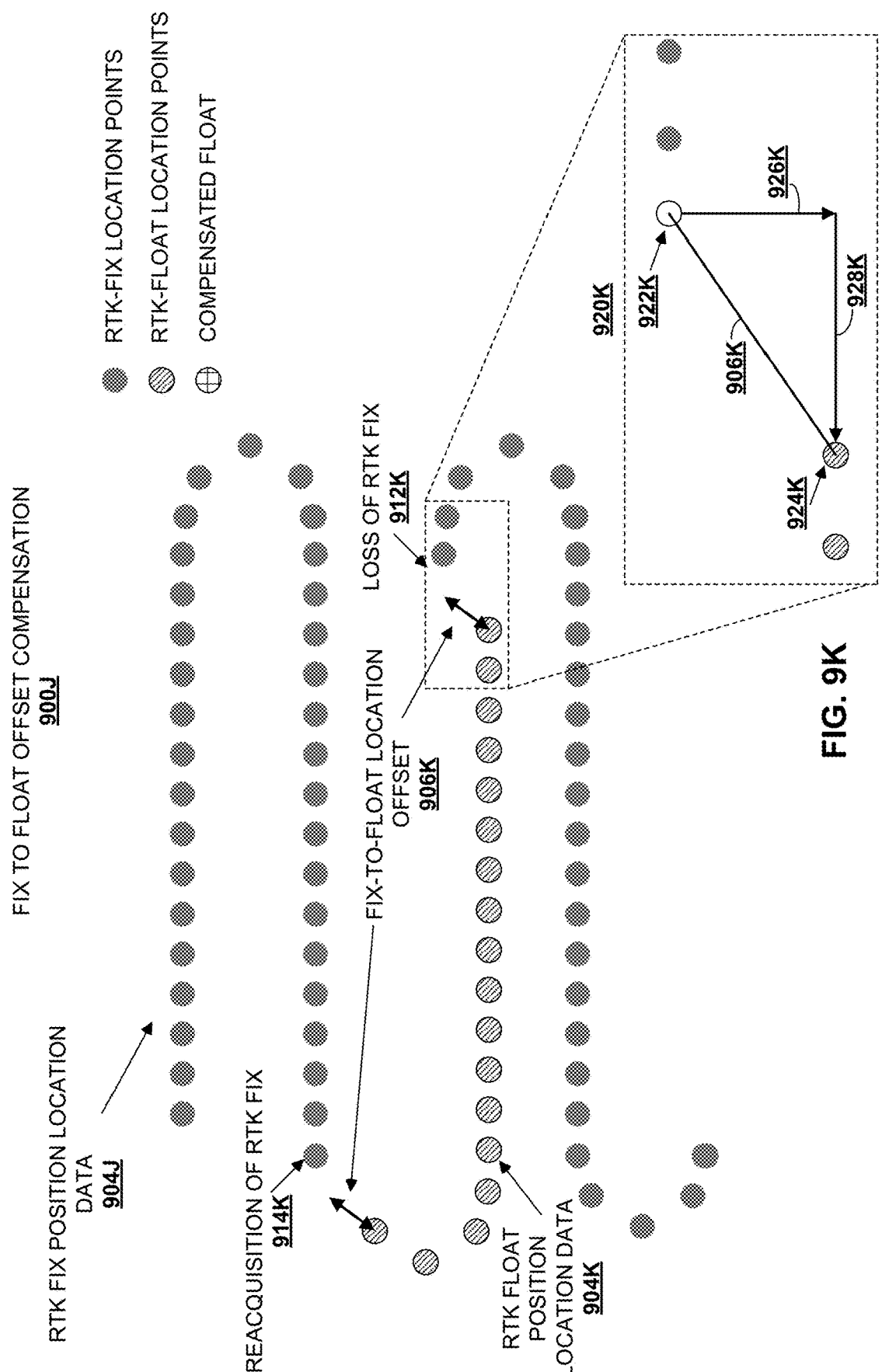
FIG. 9K depicts a diagram of a sample position location path error resulting from RTK Fix position data being lost, and RTK Float position data implemented.
Figure 9L:
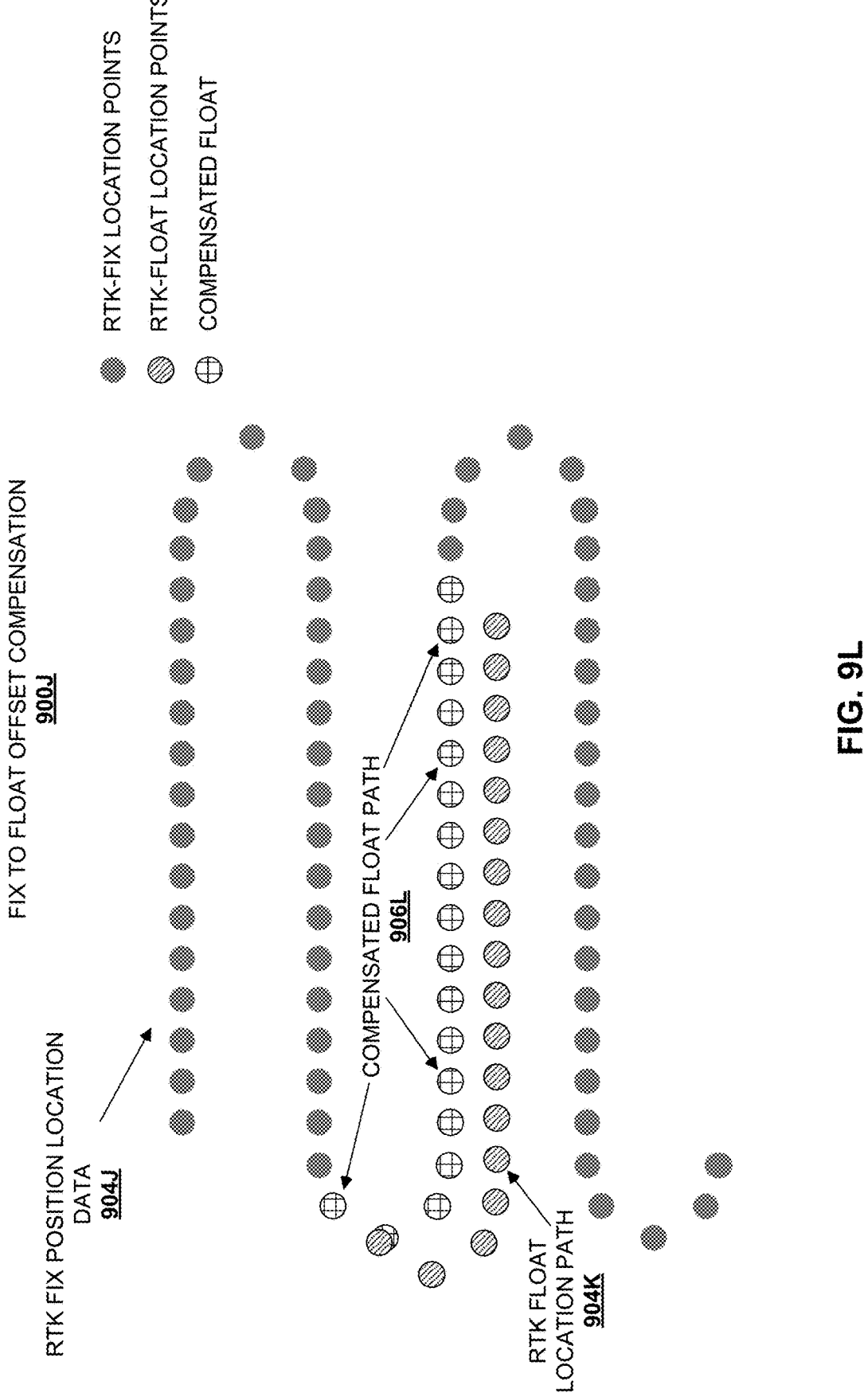
FIG. 9L depicts a diagram of an example RTK Fix to Float error correction for a power equipment device according to some disclosed embodiments.

FIGS. 9J, 9K and 9L illustrate a diagram of fix-to-float compensation 900J for correcting errors in wireless position location data guidance systems, according to one or more embodiments. The wireless position location data can be any suitable positioning system in which reduction of ideal or preferred system conditions can result in offset errors in position location data. The example provided in FIGS. 9J-9L models correction of displacement errors that can occur when a RTK-based GPS position location system loses RTK Fix status and generates position location data from RTK Float calculations. However, other position location systems having system states that produce or result in position location errors, which are known to one of ordinary skill in the art or reasonably conveyed to one of ordinary skill by way of the context provided herein, are considered within the scope of the present disclosure.

Referring initially to FIG. 9J, a path 902J of position location data points for a power equipment device generated with GPS-Fix position location data 904J is illustrated. GPS-Fix position location data 904J is repeatable and generally accurate to within a decimeter or less. (See, for example, Hall, K. W., Gagliardi, P. and Lawton, D. C., *GPS accuracy part 2: RTK float versus RTK fixed*, p. 1, CREWES Research Report, Volume 22 (2010); which is hereby incorporated by reference herein in its entirety and for all purposes). While GPS-Float data is also repeatable, an error offset can occur in GPS-Float data up to about five meters (Id.). Moreover, this error offset can be undetectable by the GPS system itself, without a known point for comparison.

FIG. 9K illustrates an embodiment in which path 902J of the power equipment device is guided by GPS Float position location data 904K for a portion thereof, and guided by GPS Fix position location data 904J for the remainder of path 902J. A legend in the top right of the page defines the association between different pattern schemes and data types for respective position location data points. Solid gray data points are those generated by GPS Fix position location data 904J, whereas diagonally lined pattern data points are generated by GPS Float position location data 904K. Checkered data points are corrected or compensated GPS Float position location data points (see FIG. 9L, infra).

A fix-to-float offset 906K is evident resulting from a relatively constant (e.g., within the accuracy of a GPS Fix position location data system, whether currently known or subsequently described) displacement between the GPS Float position location data 904K and the more accurate GPS Fix position location data 904J. Loss of GPS fix 912K indicates where the offset first occurs and reacquisition of GPS fix 914K is where the offset is closed, or restored.

Embodiments of the present disclosure provide for an auto-steering control unit for a power equipment device that is configured to measure the fix-to-float location offset 906K. It should be appreciated that any disclosed auto-steering control unit described herein can be configured for fix-to-float position location compensation as described with respect to FIGS. 9J-9L. Examples include direction control system 320 of FIG. 3 (or control unit 202), power equipment control unit 502, power equipment control unit 704, auto steering control 900G, power equipment control unit 1502, and so forth.

Referring to cutout 920K of FIG. 9K, fix-to-float location offset 906K between expected GPS Fix position 922K and first offset GPS position (or first GPS Float position) 924K can be detected, and measured by a disclosed auto-steering control unit. Detection can be implemented, as one example, by comparing an expected position location data 922K to an actual subsequent position location data 924K. The expected position location data 922K can be generated by IMU position data, in an embodiment, to be compared with a prior RTK-Fix location data point prior to loss of RTK Fix 912K. In another embodiment, expected position location data 922K can be generated from extending (e.g., extrapolating, or the like) multiple prior GPS Fix position location data points (e.g., GPS Fix position location data 904H prior to loss of GPS Fix 912K) as a baseline, to an extended position location at an equivalent position location data sampling frequency. Extending prior GPS Fix position location data points can be done continuously by a disclosed auto-steering control unit, or can be implemented in response to a condition (e.g., receipt of GPS Float data; receipt of GPS Float data following receipt of GPS Fix data; receipt of a plurality of GPS Float data consecutively; receipt of a threshold number of percentage of GPS Float data, detecting a displacement between a current and prior GPS data position location that exceeds a threshold displacement, or the like, or a suitable combination of the foregoing). Once expected position location data 922K is generated, an offset between an expected GPS Fix position 922K and an actual subsequent GPS position (e.g., 924K) is determined, and the auto-steering control unit can record that offset and utilize the offset to correct for the displacement. As a specific example, the correction can calculate orthogonal components of the offset, such as a y-axis offset 926K and an x-axis offset 928K, and subtract the offset values from each position location data point of GPS Float position location data 904K.

A result of subtracting the offset values is illustrated at FIG. 9L by compensated Float path 906L. By utilizing an IMU device or extrapolating prior GPS Fix data to detect an offset in position location data points, and subtracting the offset from the position location data points, path 902J can be reproduced (or at least approximated) by a disclosed auto-steering control unit. That is, compensated float position location points can be utilized for determining a location of the power equipment device, and utilized for determining a current heading and generating steering adjustment data to maintain a target path, as described herein. Accordingly, path 902J can be maintained despite the offset resulting from GPS Float position location data. Comparison of IMU position location data to GPS position location data can continue, and once the offset between an expected position location data point and an actual position location data point (acquired from RTK-based GPS) drops below the threshold value, or upon re-acquiring GPS Fix data, offset correction can be terminated by the auto-steering control unit (e.g., at reacquisition of GPS-Fix 914K).

In various embodiments, the disclosed auto-steering control unit can be configured to detect a fix-to-float offset (or termination of the fix-to-float offset) utilizing multiple position location data points, instead of a single point. Thus, if an offset (e.g., 50 centimeters) is spread over multiple position location data points (e.g., 4 position location data points) instead of just two position location data points, such that the offset between any two given data points might not exceed a predetermined threshold offset (e.g., 25 centimeters), the auto-steering control unit can be configured to measure a displacement over multiple data points to detect the offset. As a particular non-limiting example, if the expected displacement over 4 position location data points is about 40 centimeters (an average of about 13.3 cm between each position location data), but is measured to be 70 centimeters, the difference of 30 centimeters if averaged over each point would only displace each point by 23.3 cm, less than the threshold offset. However, when measured over the 4 points the difference of 30 cm does exceed the threshold offset (e.g., 25 centimeters) and can trigger the generation of compensated float position location points to correct for the offset, as described above. This example is not limiting, however, and other implementations known in the art or reasonably conveyed to one of ordinary skill in the art by way of the context provided herein are considered within the scope of the present disclosure.

Figure 10:
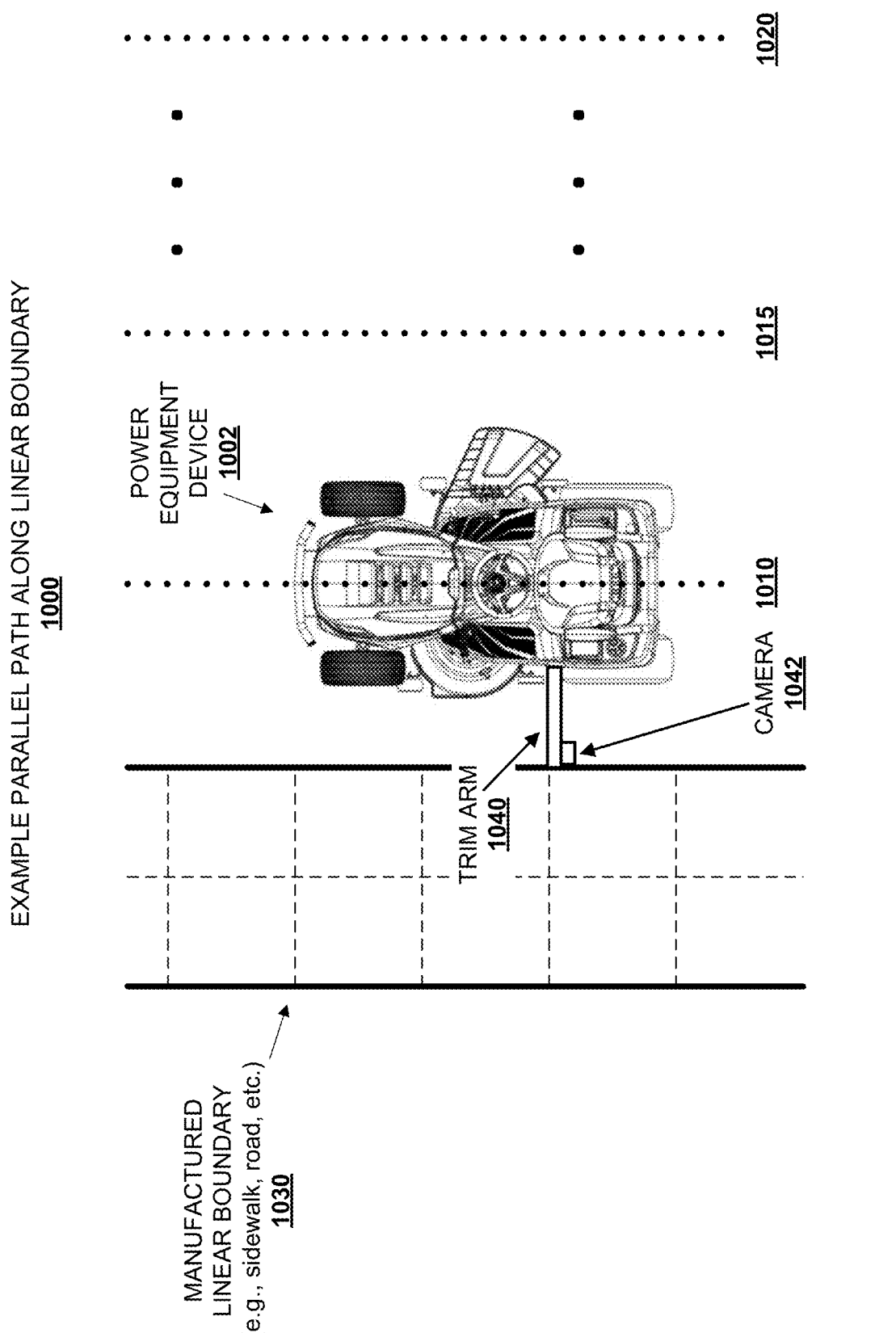
FIG. 10 depicts a diagram of an example embodiment utilizing assisted path steering utilizing optical identification of an external line boundary, in further embodiments.

FIG. 10 illustrates a diagram of an example parallel path 1000 according to still further embodiments of the present disclosure. Parallel path 1000 can comprise a power equipment device 1002 traversing a set of parallel lines 1010, 1015, 1020, adjacent a manufactured linear boundary 1030. Manufactured linear boundary 1030 can be any suitable construct having an edge that can be imaged by a camera 1042. Examples can include, but are not limited to, a sidewalk, a road, a walkway, a wall, an edge of a building, and so forth.

Camera 1042 can be positioned along a trim arm 1040 extending laterally from power equipment device 1002 in at least one embodiment. Trim arm 1040 can comprise an edge trimming device, for trimming turf along manufactured linear boundary 1030, or other suitable device. In some embodiments, camera 1042 can be substantially similar to camera vision 522 of FIG. 5, supra.

Camera 1042 can image an edge of manufactured linear boundary 103 and monitor lateral changes in position of the edge of manufactured linear boundary 1030 relative to a path of motion of power equipment device 1002 (e.g., the path of motion being along parallel line 1010, as illustrated). The monitored lateral changes can be utilized to refine a position of power equipment device 1002, and optionally correct position location data of power equipment device 1002, in one or more embodiments. As one example, changes in position of the edge of manufactured linear boundary 1030 can be monitored and utilized to determine error in the position location data. Corrections to the error can be calculated, once the error is determined. In other embodiments, automated steering for power equipment device 1002 can be implemented by maintaining constant lateral position of the edge of manufactured linear boundary 1030, as yet another example. Thus, camera 1042 and manufactured linear boundary 1030 can be utilized to maintain power equipment device 1002 along parallel path 1010 in response to loss of GPS position location data, or the like.

Generally, the illustrated embodiments disclosed herein are not provided as strict limitations on how the disclosed aspects can be practiced by one of ordinary skill in the art, but are intended to be provided as examples that can be modified, interchanged, added to or subtracted from as would be suitable to one of ordinary skill in the art. As an example, an arrangement of components depicted in one embodiment can be swapped with components depicted in another embodiment, optionally excluding some components or including other components illustrated in a third embodiment, according to design creativity of one of ordinary skill in the art. For instance, location refinement device 108, server devices 106 and server data store(s) 122 of FIG. 1 can be incorporated within FIG. 2 as communicatively connected with direction control system 210, as suitable. As a further example, components of disclosed devices can be implemented as external to and communicatively or operably connected to other components of a parent device, rather than included within the parent device. For instance, motor drive 208 can be external to control unit 202 and communicatively connected thereto instead of implemented as a component thereof. Alternatively, the opposite orientation can be implemented within the scope of the disclosure: one component (e.g., wireless device 340 and direction control system 320, or user input/output 310) depicted separate from another component (e.g., positioning device 330, or control unit 202) can be aggregated as a single component in some embodiments. Embodiments or portions thereof depicted in one Figure can be exchanged with or incorporated with embodiments depicted in other Figures; embodiments or portions thereof in the one Figure can be combined with the other Figure(s), and the like as would be suitable to one of ordinary skill in the art, or reasonably conveyed to one of ordinary skill in the art by way of the context provided herein. Additionally, it is noted that one or more disclosed processes can be combined into a single process providing aggregate functionality. Still further, components of disclosed machines/devices/sensors/control units can also interact with one or more other components not specifically described herein but known by those of skill in the art.

In view of the exemplary diagrams described herein, process methods that can be implemented in accordance with the disclosed subject matter will be better appreciated with reference to the flowchart of FIGS. 4 and 11. While for purposes of simplicity of explanation the methods of FIGS. 4 and 11 are shown and described as a series of blocks, it is to be understood and appreciated that the scope of the disclosure and the claimed subject matter is not limited by the order of the blocks, as some blocks can occur in different orders or concurrently with other blocks from what is depicted and described herein. Moreover, not all illustrated blocks are necessarily required to implement the methods described herein. Additionally, it should be further appreciated that some or all the methods disclosed throughout this specification are capable of being stored on an article of manufacture to facilitate transporting and transferring such methods to an electronic device. The term article of manufacture, where utilized, is intended to encompass a computer program accessible from any computer-readable device, device in conjunction with a carrier, or storage medium.

Figure 11A:
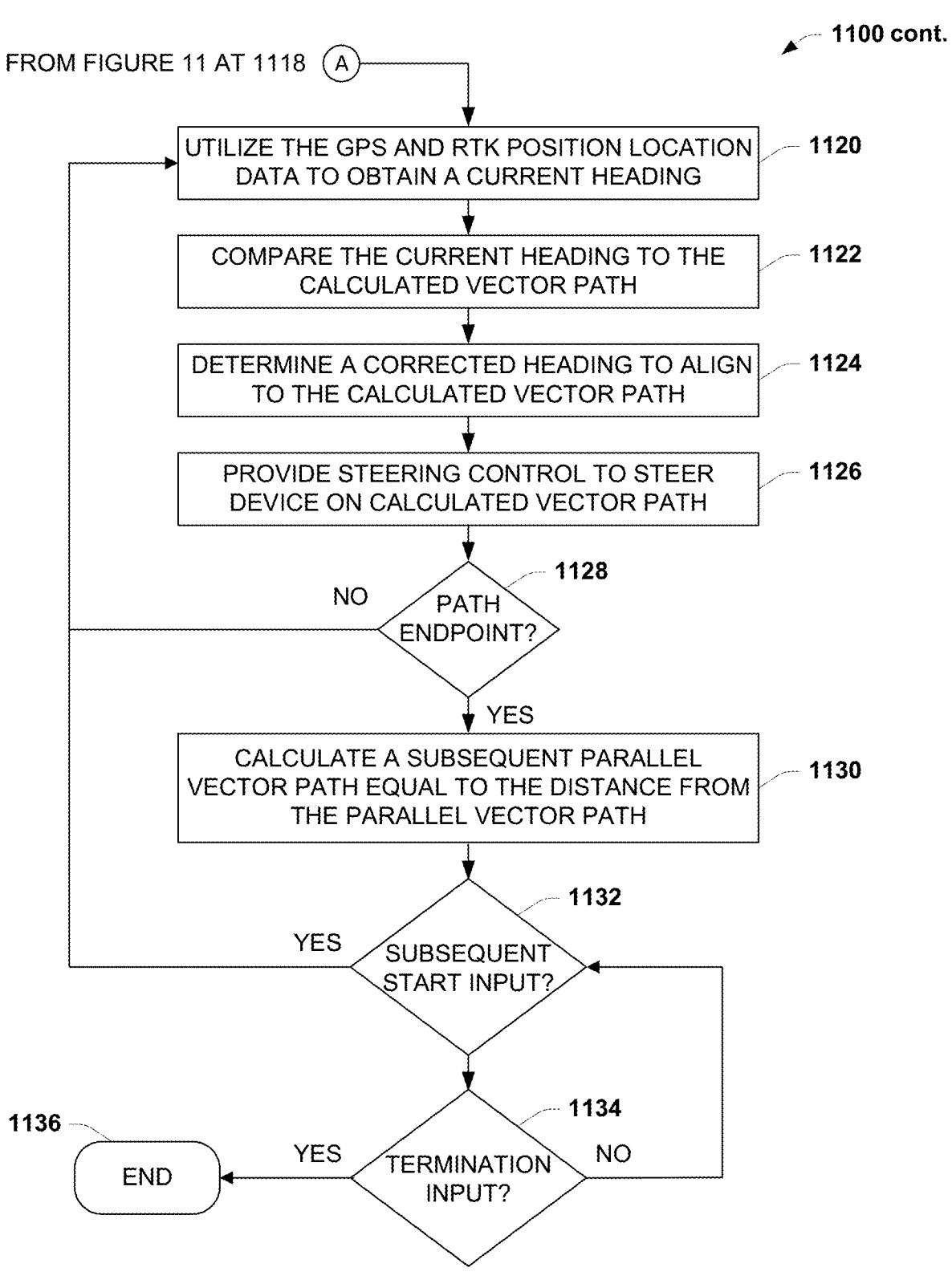

FIGS. 11 and 11A illustrate a flowchart of a sample method 1100 according to alternative or additional embodiments of the present disclosure. At 1102, method 1100 can comprise receiving GPS and RTK position location data of a power equipment device. At 1104, method 1100 can comprise receiving a primary path start input and, at 1106, method 1100 can comprise storing a first position location data point for the received start input. At 1108, method 1100 can comprise receiving a primary path stop input. At 1110, method 1100 can comprise storing a second position location data point for the received stop input. At 1112, method 1100 can comprise calculating and storing a primary path vector at least from the first position location data point and second position location data point. In at least some embodiments, method 1100 can receive more than two primary path inputs, and can generate the primary path vector from the more than two primary path inputs.

At 1114, method 1100 can optionally obtain a geographic boundary within a geographical map, and limit the primary path to a length contained within the geographic boundary. At 1116, method 1100 can comprise receiving an automated parallel steering start input. At 1118, method 1100 can comprise calculating a parallel vector path a distance from the primary path vector. The distance can be a value related to a width of the power equipment device, in an embodiment. In another embodiment, the distance can be a value related to a width of a mower deck of the power equipment device. In still other embodiments, the distance can be a value related to the width of the power equipment device or the width of the mower deck, plus an overlap distance. From 1118, method 1100 can continue at reference number 1120 of FIG. 11A.

Referring now to FIG. 11A, at 1120 method 1100 can comprise utilizing the GPS and RTK position location data to obtain a current heading of the power equipment device. At 1122, method 1100 can comprise comparing the current heading to the calculated vector path and, at 1124, determining a corrected heading to align the current heading with the calculated vector path. At 1126, method 1100 can comprise activating a steering drive motor to change the steering to the corrected heading and steer the power equipment device onto the calculated vector path.

At 1128, method 1100 can comprise determining whether a most recent GPS and RTK position location point is equivalent to an endpoint for the calculated vector path. If the position location point is not equivalent to the endpoint method 1100 can return to reference number 1120. Otherwise, method 1100 can advance to 1130.

At 1130, method 1100 can comprise calculating a subsequent parallel vector path equal to the distance from the parallel vector path. At 1132, method 1100 can comprise determining whether a subsequent start input is received. If yes, method 1132 can return to reference number 1120. Otherwise, method 1100 proceeds to 1134 and determines whether a termination input has been received. If so, method 1100 can end at 1136; otherwise, method 1100 can return to reference number 1132.

FIG. 12 illustrates an example set of bounded parallel lines 1200 according to alternative or additional embodiments of the present disclosure. Any parallel line of the set of parallel lines 1206 can be a primary parallel line, in which an operator of a power equipment machine provides initial inputs to define the primary parallel line. As an example, the line marked with points A and B can be such a primary parallel line. Other lines of the parallel lines 1206 can be generated (e.g., by path generation module 506, or other suitable module disclosed herein, known in the art are reasonably conveyed to one of ordinary skill in the art) at integer multiples of a threshold distance from the primary parallel line. As a result, each line is separated from neighboring lines by the threshold distance (or approximately the threshold distance). Moreover, parallel lines 1206 can be generated to the right of the primary parallel line (e.g., positive integer multiple threshold values) and to the left of the primary parallel line (e.g., negative integer multiple threshold values).

Additionally, parallel lines 1206 can be bounded by an exterior boundary 1202. Where a parallel line 1206 approaches exterior boundary 1202, an auto-turn 1208 is inserted to facilitate continuity of parallel lines 1206, without crossing exterior boundary 1202. The combination of parallel lines 1206 and auto-turns 1208 provide a path over which a power equipment device can traverse the area bounded by exterior boundary 1202. Additionally, example bounded parallel lines 1200 includes an interior exclusion zone 1204. Parallel lines 1206 are constrained to not cross interior exclusion zone 1204, and auto-turns 1208 are provided near the boundary of interior exclusion zone 1204 to facilitate traversal of the area within exterior boundary 1202 and outside interior exclusion zone 1204 by the power equipment device.

In some embodiments, a predetermined direction can be applied to each parallel line of parallel lines 1206, with alternating lines having alternating directions. As an illustrative example, a first direction can be enforced by a power equipment control unit on the primary parallel line and an opposite direction can be enforced by the power equipment control unit on nearest adjacent lines (e.g., +/−1× integer multiple), and the first direction again enforced on the second lines from the primary parallel line (e.g., +/−2× integer multiple), and so forth. Enforcing predetermined directions can maintain aesthetic appeal of turf mowing stripes, as one example, for a mowing power equipment device (or for multiple power equipment devices operating in coordination). This can be beneficial where different portions of the area within exterior boundary 1202 are traversed non-sequentially. For instance, in the case of a lawn mower device, where several lines near a left side of parallel lines 1206 are initially mowed, and the lawn mower device travels along exterior boundary 1202 to a right side of parallel lines 1206, it may be difficult for an operator to manually identify where a nearest parallel line of parallel lines 1206 is centered upon re-entering the interior of exterior boundary 1202, or determining a direction that maintains the alternating opposing directions described above (e.g., to maintain aesthetic appeal of alternating turf striping patterns). In such case, an auto-steering device can enforce a predetermined directionality when traversing any parallel line of parallel lines 1206. In at least some embodiments, directionality can be extended to non-contiguous areas for similar reasons (e.g., see FIG. 13, infra).

In further embodiments, exterior boundary 1202 and interior exclusion zone 1204 boundary can themselves be traversable paths for the power equipment device. In at least one embodiment, exterior boundary 1202 or interior exclusion zone 1204 can also have an enforced direction. This can ensure that turf discharge (e.g., from a mowing power equipment device) is directed in a single direction (e.g., inside a boundary; outside a boundary). In other embodiments exterior boundary or interior exclusion zone 1204 can be traversed without a direction constraint (e.g., bidirectionally, omnidirectionally, one or more turn profiles, etc.).

FIG. 13 illustrates a diagram of bounded parallel paths extended to non-contiguous virtual boundaries 1300 according to further embodiments of the present disclosure. As illustrated, parallel lines 1206 generated in and constrained to an exterior boundary 1202 are depicted. In various embodiments, the parallel lines 1206 can be constrained out of an interior exclusion zone 1204 as well. In an embodiment, parallel lines 1206 can be generated from a primary parallel line indicated by points A and B. It should be appreciated that points A and B can be associated (and used to generate) any other line of parallel lines 1206, other than that depicted.

Two additional areas non-contiguous with exterior boundary 1202 are also illustrated. The additional areas include non-contiguous area$_1$ 1310 and non-contiguous area$_2$ 1320. Parallel lines 1206 can be extended to the non-contiguous areas external to exterior boundary 1202. Thus, extended parallel lines 1316 are generated within non-contiguous area$_1$ 1310 and extended parallel lines 1326 are generated within non-contiguous area$_2$ 1320. Moreover, extended parallel lines 1316 and extended parallel lines 1326 can be generated to be parallel to parallel lines 1206. In some embodiments, distance between respective extended parallel lines 1316 or respective extended parallel lines 1326 can be the same (or similar) threshold distance between lines of parallel lines 1206. In alternative embodiments, distance between extended parallel lines 1316 or extended parallel lines 1326 can be narrower or wider than the threshold distance between parallel lines 1206.

FIGS. 14, 14A, 14B and 14C (collectively: FIGS. 14-14C) illustrate an example graphical user interface 1400 facilitating operator-control of user-assisted steering, according to various disclosed embodiments. For instance, graphical user interface 1400 can embody or be utilized in conjunction with user input/output 310, user input/output 1506 of FIG. 15, infra, or other suitable device disclosed herein, known in the art or reasonably conveyed to one of ordinary skill in the art by way of the context provided herein.

GUI 1400 includes operator accessible functions including user controls 1410, status displays 1420 and command control 1430. Status displays 1420 provide status data, power equipment device metric data or a combination thereof, that can be updated periodically or in response to changes in status data. RTK Status can indicate whether GPS position location data is RTK Fix location data, or RTK Float location data. Steering mode can indicate whether manual operator or automatic steering is active, heading indicates a direction in degrees, line status can indicate progress of parallel line generation, distance from line indicates a displacement from a current target path, and velocity indicates a speed of the power equipment device. As status changes (e.g., RTK Status, Steering Mode, Line Status) or as power equipment device metrics change (e.g., heading, distance from line, velocity), status displays 1420 are updated to reflect the new status or metric.

Command control 1430 includes left turn 1432 and right turn 1434 command buttons, primary parallel line input 1436 buttons, and GPS status 1438. Display characteristics (color, brightness, etc.) of different buttons can update to indicate a command is disabled, or enabled for user input, has received user input, or has received no input, a first input, or a second input, as suitable. In the embodiment of FIG. 14, primary parallel line input 1436 is in a state indicating no input, and left turn 142 and right turn 1434 command buttons display a command disable state.

Figure 14A:
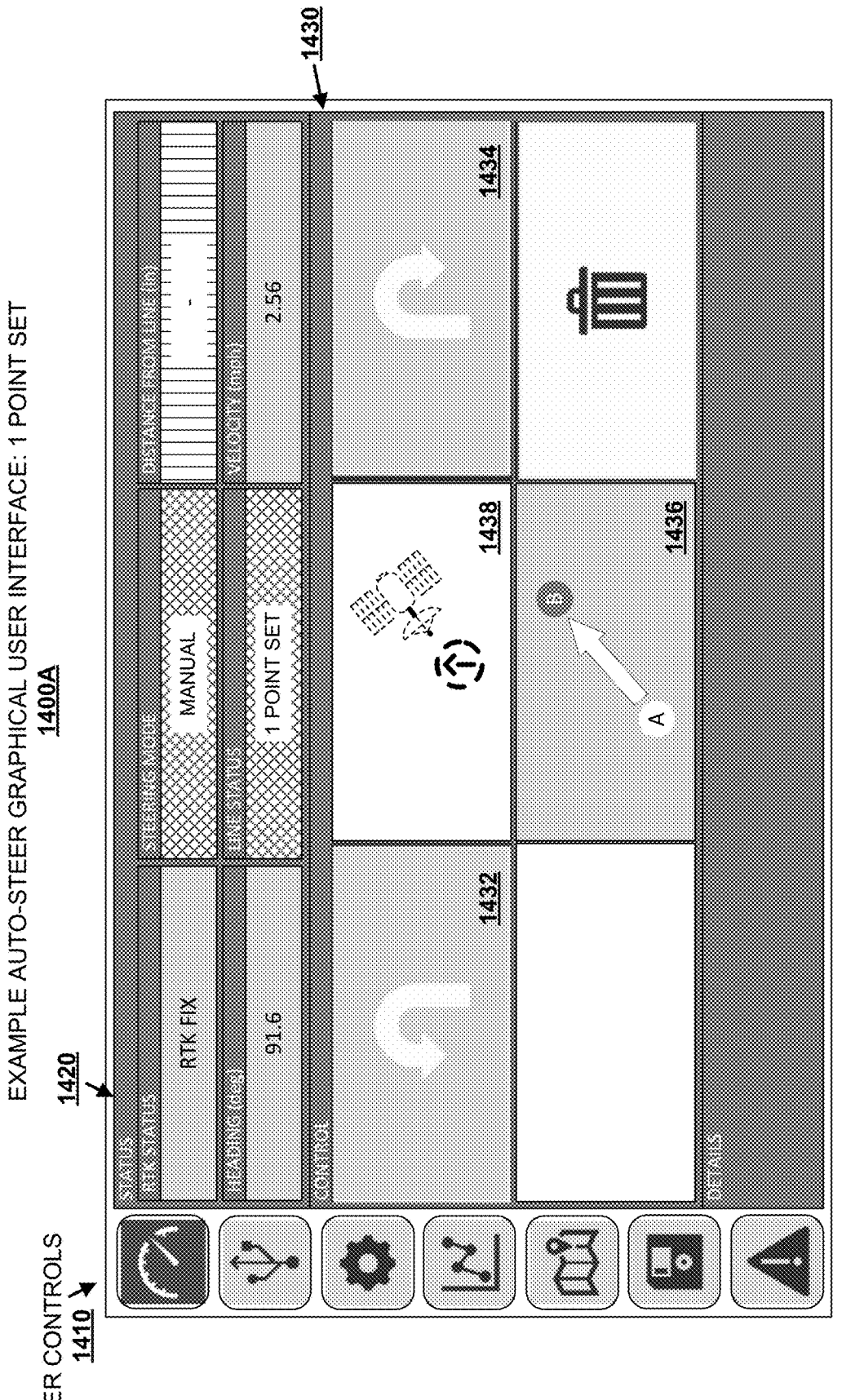
FIG. 14D depicts a picture of a user-operated joystick control for auto-steering and auto-turn commands, according to one or more other embodiments.
FIG. 14E illustrates a user-operated joystick control for engaging auto-steering operations of a power equipment device, in further embodiments.

FIG. 14A depicts an example of graphical user interface 1400 with auto-steer graphical user interface: one point set 1400A. Line status display of status displays 1420 indicates 1 point is set. Primary parallel line input 1436 button can display a different color from no points set, or point A can be highlighted and lit, or a combination of the foregoing. The 1 point set 1400A status indicates that point A of the primary parallel line is set, and point B is not set.

Figure 14B:
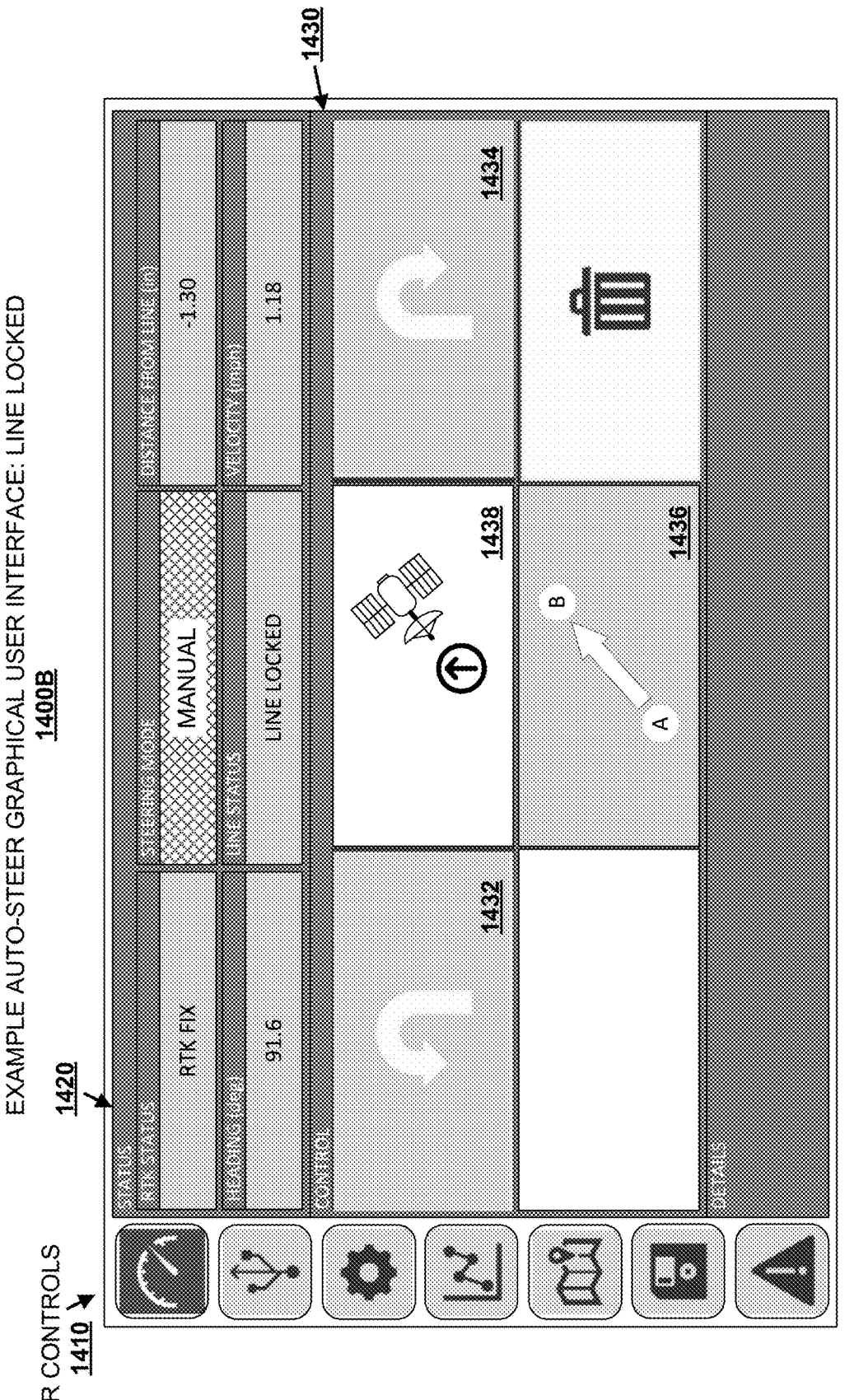
Figure 14C:
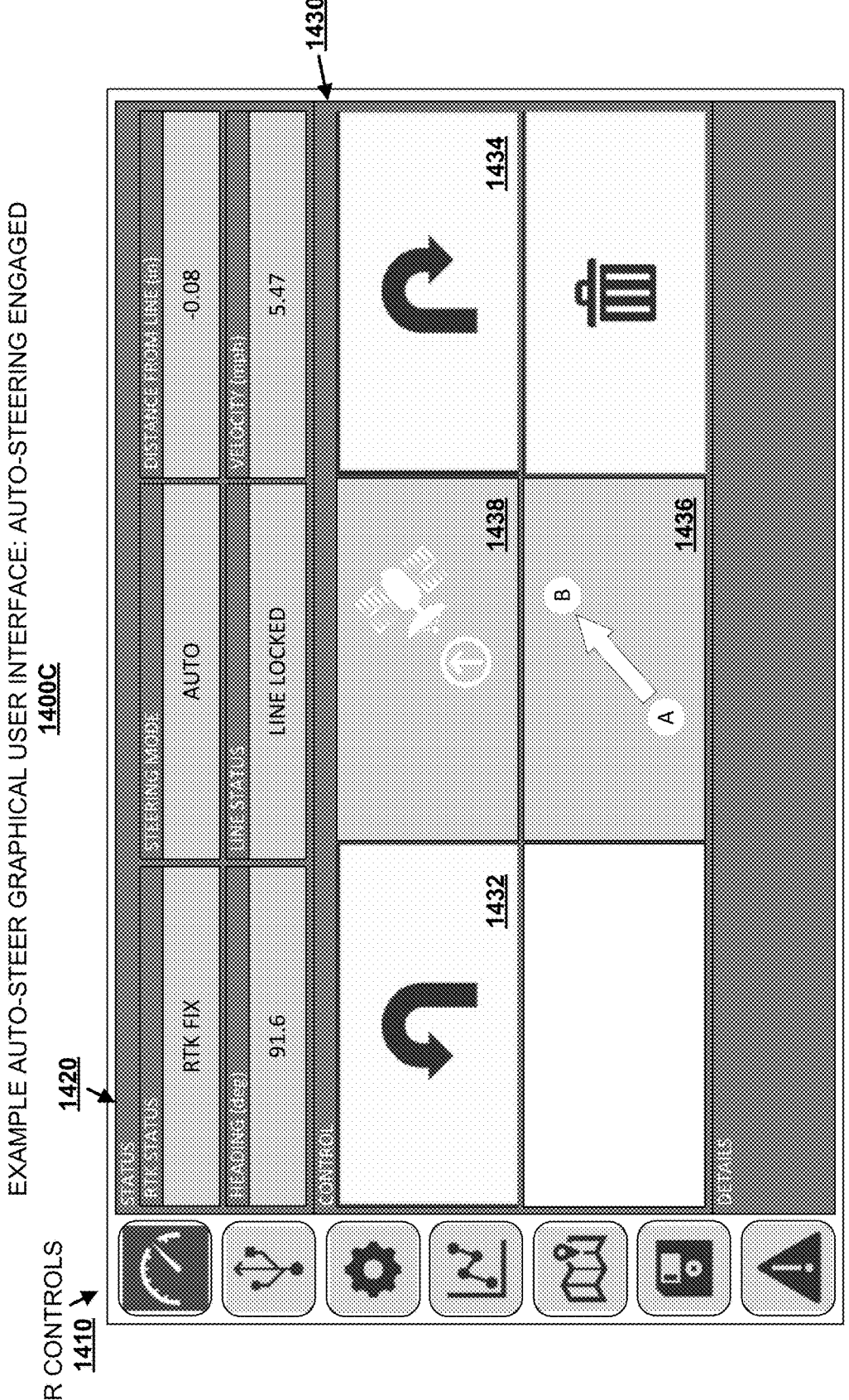

FIG. 14B depicts an example of graphical user interface 1400 with auto-steer graphical user interface: line locked (two points set) 1400B. Line status display of RTK Status 1420 indicates a line is locked, and thus two points A and B are set. The primary parallel line input 1436 button is updated to highlight or light both point A and point B, and a primary parallel line input 1436 button can display a third color (e.g., green, etc.) to indicate that primary parallel line inputs are fully entered, and active. Additionally, GPS status 1438, previously grayed out, can be displayed as solid and active.

FIG. 14C depicts a final example of graphical user interface 1400 with auto-steering engaged 1400C. In this example, steering mode displays 'Auto' in the status displays 1420. Further, GPS status 1438 can be backlit to indicate a auto-steering (or drive-by-wire) status, and left turn command 1432 and right turn command 1434 buttons can both by backlit to indicate their respective commands are active and functional. It should be appreciated that different indicators, displays, color schemes, and the like can be employed to indicate different status, command enable/disable states, and the like in various embodiments. Thus, other embodiments known in the art or reasonably conveyed to one of ordinary skill in the art by way of the context provided herein are considered within the scope of the present disclosure.

Figure 14D:
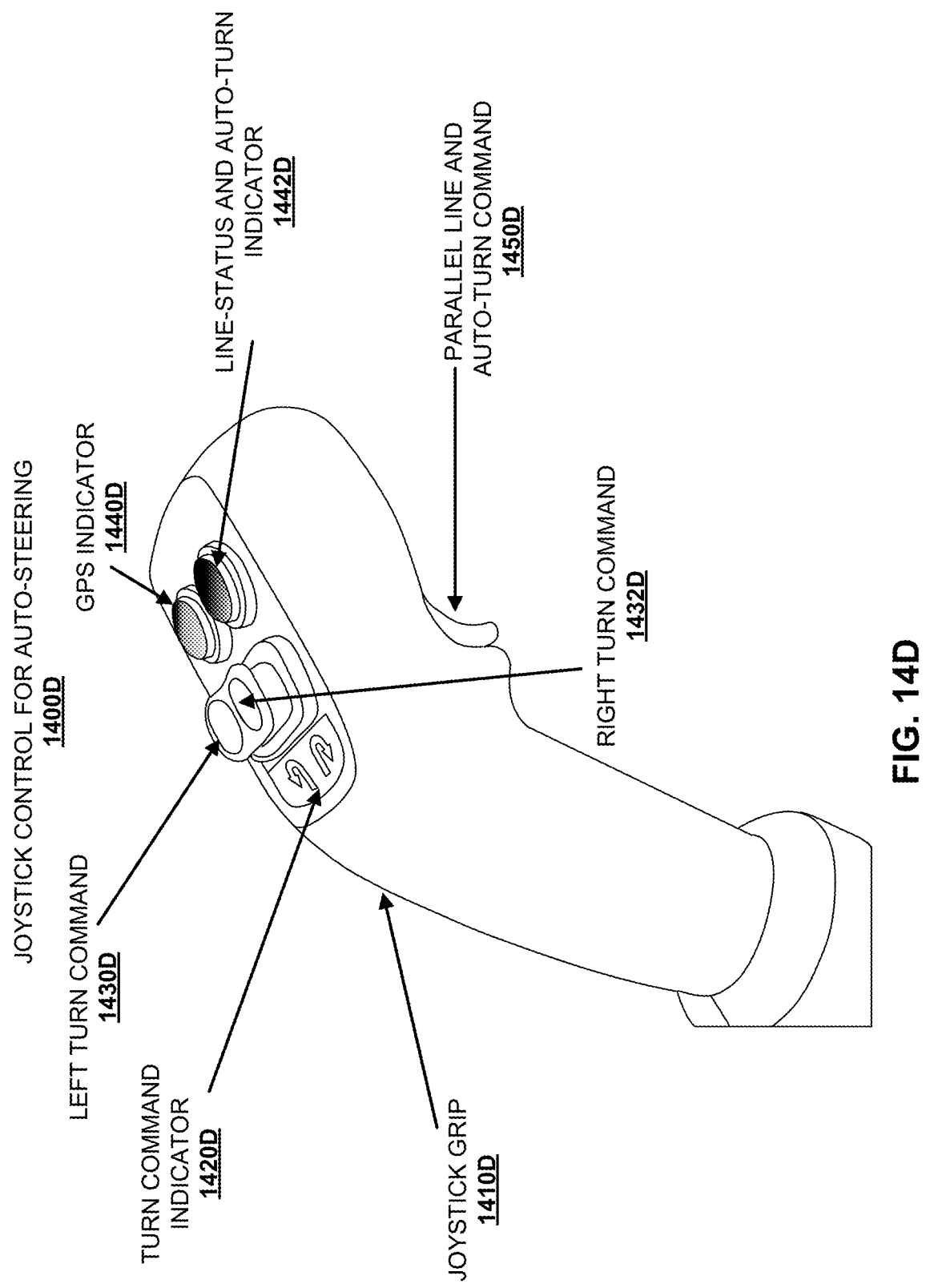

FIG. 14D illustrates a diagram of an example of a joystick control 1400D for user assisted auto-steering according to alternative or additional embodiments. Joystick control 1400D can be utilized in conjunction with a graphical user interface, in an embodiment(s). For instance, the graphical user interface can output power equipment device status and status data, and the joystick control 1400D can be provided for operator input commands for left and right turn commands, establishing a primary parallel line for parallel line generation, and the like.

Joystick control 1400D includes a joystick grip 1410D for hand position of an operator. At a face of the joystick control 1400D are left turn command button 1430D and right turn command button 1432D. Turn command indicators 1420D identifying the turn direction for the left turn command button 1430D and right turn command button 1432D are provided. Additionally, a GPS indicator 1440D displays status of GPS connection. A line-status and auto-turn indicator 1442D can display state of A-B primary parallel line establishment, and engagement of auto-turn status for the power equipment device. A trigger button for joystick grip 1410D functions as a parallel line and auto-turn command button 1450D. A first press of the parallel line and auto-turn command button 1450D operates as a point A selection for a primary parallel line, as described herein, and a second press of the parallel line and auto-turn command button 1450D operates as a point B selection for the primary parallel line. Moreover, a third press of the parallel line and auto-turn command 1450D can activate auto-steering status for the power equipment device, causing the power equipment device to establish a target path and heading, auto-steer onto the target path and heading, and allow the operator to execute an auto-turn to an adjacent parallel line (which is updated to be the target path and heading) in response to left turn command 1430D and right turn command 1432D. Variations of the type, arrangement and function of buttons and display indicators for joystick control 1400D can be reconfigured within the scope of the present disclosure, as would be understood by one of ordinary skill in the art or reasonably conveyed to one of ordinary skill by way of the context provided herein.

Figure 14E:
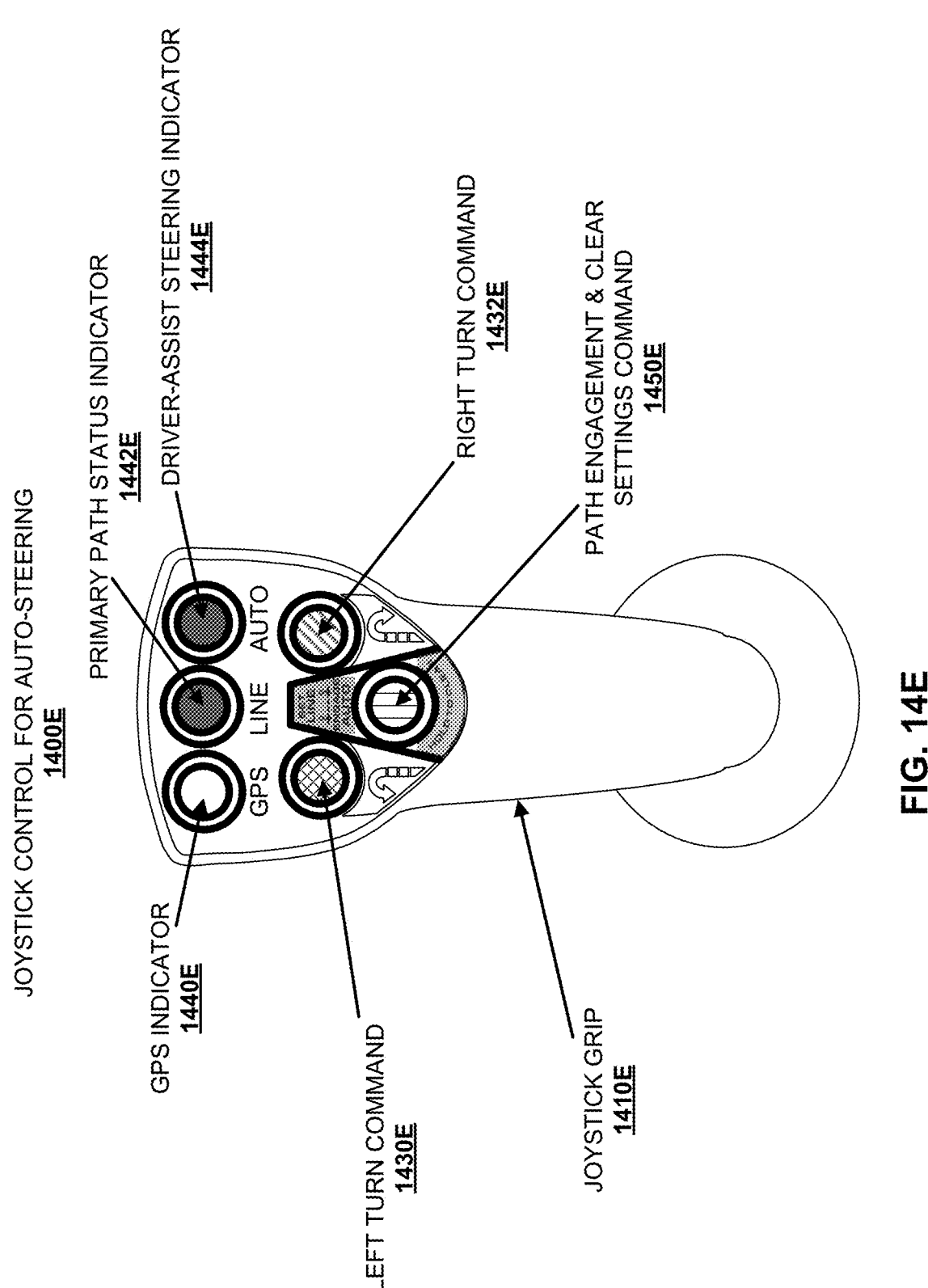

FIG. 14E illustrates a diagram of an additional example joystick control 1400E for user assisted auto-steering according to alternative or additional embodiments. Joystick control 1400E can be utilized in conjunction with a graphical user interface, in an embodiment(s), or can be utilized without a graphical user interface. For instance, the joystick control 1400E can be configured to receive operator input commands for left and right turn commands for turning to an adjacent (left or right) path, establishing a primary parallel line for parallel line generation, and the like. Additionally, joystick control 1400E can be configured to output status of received operator input commands, status of GPS connectivity or GPS data, and status of auto-steering.

Joystick control 1400E includes a joystick grip 1410E for hand operation, and three input buttons for entering user commands including a left turn command 1430E and right turn command 1432E and a path engagement and settings command 1450E. Path engagement and settings command 1450E can receive at least one user input to establish a primary path, from which adjacent parallel paths are generated as described herein. Moreover, holding path engagement and settings command 1450E can clear the primary path and adjacent parallel paths, in an embodiment. A GPS indictor 1440E can indicate GPS acquisition/non-acquisition, in an embodiment, or can indicate GPS Fix position location status or GPS Float position location status. In an embodiment, a range of visual indicators (e.g., colors, brightness, or the like, or a combination thereof) can be employed by GPS indicator 1440E to indicate GPS acquisition/non-acquisition as well as GPS Fix or GPS Float status. A primary path status indicator 1442E can indicate whether a primary path is set (or partially set, utilizing multiple colors, brightness, or other visual indicators). Likewise, a driver-assist steering indicator 1444E can indicate whether auto-steering is engaged or disengaged.

FIG. 15 illustrates a block diagram of an example steering assist and property management device 1500 for a power equipment device, according to alternative or additional embodiments of the present disclosure. The power equipment device can be any suitable power equipment device disclosed herein or known in the art. Suitable examples include, but are not limited to, a mowing device, a lawn tractor, a riding mower, a fertilizing or seed sowing device, an edge trimming device, a snow-thrower, and so forth.

Power equipment control unit 1502 can be configured to control mechanical, electrical or electro-mechanical functions of a power equipment device, according to one or more commands, instructions, data (e.g., steering adjustment data), etc., generated by one or more applications of steering assist and property management device 1500. In some embodiments, power equipment control unit 1502 can include some or all functionality of control unit 202 of FIG. 3 or of power equipment control unit 502 of FIG. 5 with respect to control of mechanical functions of the power equipment device (e.g., steering, drive and brake system 508 of FIG. 5) and electrical functions of the power equipment device (e.g., electrical power system 230 or motor 220 of FIG. 3), among other functions described hereinbelow. Thus, power equipment control unit 1502 can be configured to operate a motor drive (or engine) to mechanically power wheels, a drivetrain, etc. of the power equipment device. Further, power equipment control unit 1502 can be configured to receive steering adjustment data generated by one or more of the applications, and control steering functionality of the power equipment device to align a heading of the power equipment device with a target path or target heading consistent with the steering adjustment data, among other capabilities described herein.

In addition to the foregoing, power equipment control unit 1502 is connected to user input/output 1506 for receipt of user commands (e.g., input of primary parallel line commands, input of turn left or turn right commands, or other function or maintenance related controls for steering assist and property management device 1500) and display of status data associated with steering assist and property management device 1500 or the power equipment device. In an embodiment, user input/output 1506 can include graphical user interface 1400 of FIGS. 14-14C. In another embodiment, user input/output 1506 can include a hand-formed joystick-type device (e.g., 1400D of FIG. 14D) with user input buttons for inputting user commands (e.g., entering point A and point B of a primary parallel line; turn left button; turn right button; manual/auto steering selection or override, or the like).

A geo-fencing area module 1520 can be configured to receive user input data representing a geographic area. In an embodiment, geo-fencing area module 1520 can include a touchscreen display for drawing a geographic area boundary on a display of a geographic area of a digital map of a navigation device (e.g., RTK-based GPS display device). The user input data can be utilized to generate a boundary to constrain parallel lines over which the steering assist and property management device 1500 will auto-steer the power equipment device, as described herein. An area aggregation module 1522 can receive additional user input data representing additional geographic areas. Where the additional geographic area is contained within the geographic area boundary, area aggregation module 1522 can generate the additional user input data as an interior exclusion zone (e.g., interior exclusion zone 1204) within the geographic area boundary, as described at FIGS. 12 and 13, supra. Where the additional geographic area is exterior to the geographic area boundary, area aggregation module 1522 can generate the additional user input data as a non-contiguous area (e.g., 1310, 1320 of FIG. 13) to which parallel lines of the geographic area boundary can be extended (e.g., 1316, 1326 of FIG. 13), maintaining parallelism of the extended parallel lines with the parallel lines of the geographic area boundary (e.g., 1206).

Additionally, steering assist and property management device 1500 can comprise a property management module 1530. Property management module 1530 can be configured to identify and store different geographic areas as worksites. Worksites can be associated with distinct geographic areas, among other data (e.g., operator-supplied labels, names, etc.), to distinguish a saved worksite from other saved worksites. In addition, a set of parallel paths for a given worksite can be saved and associated with that worksite utilizing a saved paths module 1532. A fuel consumption module 1537 can be provided to track fuel use and time involved in traversing parallel lines of a worksite, and a job estimation module 1536 can utilize historical time and fuel consumption tracked by fuel consumption module 1537 to estimate a cost of traversing a saved worksite at a future time. In an embodiment, job estimation module 1536 can acquire environmental condition data (e.g., precipitation, temperature, ground moisture, turf moisture, turf thickness, etc.) and incorporate the environment condition data into the estimate of cost of traversing the saved worksite.

In further embodiments, an efficiency optimization module 1535 can be configured to adjust speed of the power equipment device or adjust an overlap factor included within threshold distance calculations for determining width of parallel lines. Efficiency optimization module 1535 can be configured to adjust the speed or overlap factor to minimize completion time for the power equipment device to traverse the user-supplied geographic boundary. Power equipment control unit 1502 can receive optimized speed and overlap factor information to adjust a speed of the power equipment device, or adjust distance between parallel lines to achieve the time efficiency calculated by efficiency optimization module 1535.

In another embodiment, property management module 1530 can include a track and trace component 1538 that tracks location of a wireless transmitter associated with the power equipment device, and with one or more additional wireless transmitters of additional power equipment devices to maintain location and operation status of a fleet of power equipment devices. Further, a maintenance sensing module 1534 can be configured to track time between maintenance applications of saved worksites for different maintenance functions (e.g., lawn mowing, edge trimming, fertilizing, harvesting, etc.) and output reminder data to indicate upcoming maintenance timelines for the saved worksites.

In still further embodiments, power equipment control 1502 can include a RTK correction module 1542 associated with a set of state sensors 1540 and an equipment state and location estimator 1504. State sensors 1540 and equipment state and location estimator 1504 can be substantially as described hereinabove (e.g., see FIGS. 3 and 5, supra, among other relevant components). Specifically, state sensors 1540 can be configured to identify position location information for a power equipment device, including RTK-based GPS position location data for the power equipment device and IMU position location data for the power equipment device. RTK correction module 1542 can detect a variance between the RTK-based GPS position location data and the IMU position location data and generate RTK Float compensation data to correct the RTK-based GPS position location data, and output the compensated data to equipment state and location estimator 1504 and power equipment control unit 1502. Thus, errors in position location data resulting from a switch from GPS-Fix position location data to GPS-Float position location data can be corrected by RTK correction module 1542 as described herein (e.g., see FIGS. 9J-9L, supra).

In addition to the foregoing, steering assist and property management device 1500 can comprise an antenna compensation module 1550. Antenna compensation module 1550 can be configured to measure displacements of a GPS antenna due to uneven terrain (e.g., pitch or roll displacements; see FIG. 9) and correct antenna-based position location data utilizing the measured displacement data. To this end, antenna compensation module 1550 can include an incline measurement module 1554 that can monitor and measure pitch and roll displacement of an antenna (e.g., see FIGS. 9, 9A and 9B) utilized for wireless position location determination systems (e.g., RTK-based GPS system, or the like). A compensated data generation module 1556 can generate offset data based on pitch and roll measurements acquired by incline measurement module 1554 (e.g., see FIGS. 9C and 9D), and modify position location data of the wireless position location determination system with the offset data to generate compensated position location data that approximates antenna location on a non-inclined surface. This compensated position location data more accurately reflects position location of a work engine of a power equipment device that is generally more proximate to the ground (and in many cases parallel to the ground) than a physical antenna location.

In some embodiments, antenna compensation module 1550 can comprise a virtualization module 1552 configured to virtually displace antenna-based position location data in a direction of motion of a power equipment device. The antenna-based position location data can be compensated position location data generated by compensated data generation module 1556 in some embodiments, or RTK corrected position location data generated by 1542 in other embodiments, or a combination of the foregoing, where suitable, in still further embodiments. The virtualization module 1552 can be configured to adjust the antenna-based position location data, to shift such data in a direction of motion of the power equipment device (e.g., see FIG. 9E). The shifted data can be utilized to generate steering adjustment data for aligning a heading of the power equipment device with a target heading or target path as disclosed herein.

In connection with FIG. 16, the systems and processes described below can be embodied within hardware, such as a single integrated circuit (IC) chip, multiple ICs, an application specific integrated circuit (ASIC), or the like. A suitable operating environment 1600 for implementing various aspects of the claimed subject matter includes a computer 1602. In various embodiments, a control unit (e.g., control unit 112, control unit 202, power equipment control unit 502, 704, 1502, and so forth) of a power equipment device can be embodied in part by computer 1602, or an analogous computing device known in the art, subsequently developed, or made known to one of ordinary skill in the art by way of the context provided herein.

The computer 1602 includes a processing unit 1604, a system memory 1610, a codec 1614, and a system bus 1608. The system bus 1608 couples system components including, but not limited to, the system memory 1610 to the processing unit 1604. The processing unit 1604 can be any of various available processors. Dual microprocessors and other multiprocessor architectures also can be employed as the processing unit 1604.

The system bus 1608 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1610 can include volatile memory 1610A, non-volatile memory 1610B, or both. Functions of control unit 112 (among other control units: 202, 502, 704, 1502, . . . , depicted herein) described in the present specification can be programmed to system memory 1610, in various embodiments. The basic input/output system (BIOS), containing the basic routines to transfer information between elements within the computer 1602, such as during start-up, is stored in non-volatile memory 1610B. In addition, according to present innovations, codec 1614 may include at least one of an encoder or decoder, wherein the at least one of an encoder or decoder may consist of hardware, software, or a combination of hardware and software. Although, codec 1614 is depicted as a separate component, codec 1614 may be contained within non-volatile memory 1610B. By way of illustration, and not limitation, non-volatile memory 1610B can include read only memory (ROM), programmable ROM (PROM), electrically programmable ROM (EPROM), electrically erasable programmable ROM (EEPROM), or Flash memory. Non-volatile memory 1610B can be embedded memory (e.g., physically integrated with computer 1602 or a mainboard thereof), or removable memory. Examples of suitable removable memory can include a secure digital (SD) card, a compact Flash (CF) card, a universal serial bus (USB) memory stick, or the like. Volatile memory 1610A includes random access memory (RAM), which can serve as operational system memory for applications executed by processing unit 1604. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM), and so forth.

Computer 1602 may also include removable/non-removable, volatile/non-volatile computer storage medium. FIG. 16 illustrates, for example, disk storage 1606. Disk storage 1606 includes, but is not limited to, devices such as a magnetic disk drive, solid state disk (SSD) floppy disk drive, tape drive, Flash memory card, memory stick, or the like. In addition, disk storage 1606 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1606 to the system bus 1608, a removable or non-removable interface is typically used, such as interface 1612. In one or more embodiments, disk storage 1606 can be limited to solid state non-volatile storage memory, providing motion and vibration resistance for a control unit (e.g., control unit 112, among others) operable in conjunction with a power equipment machine (e.g., power equipment machine 102, 702, 902, etc.).

Figure 16:
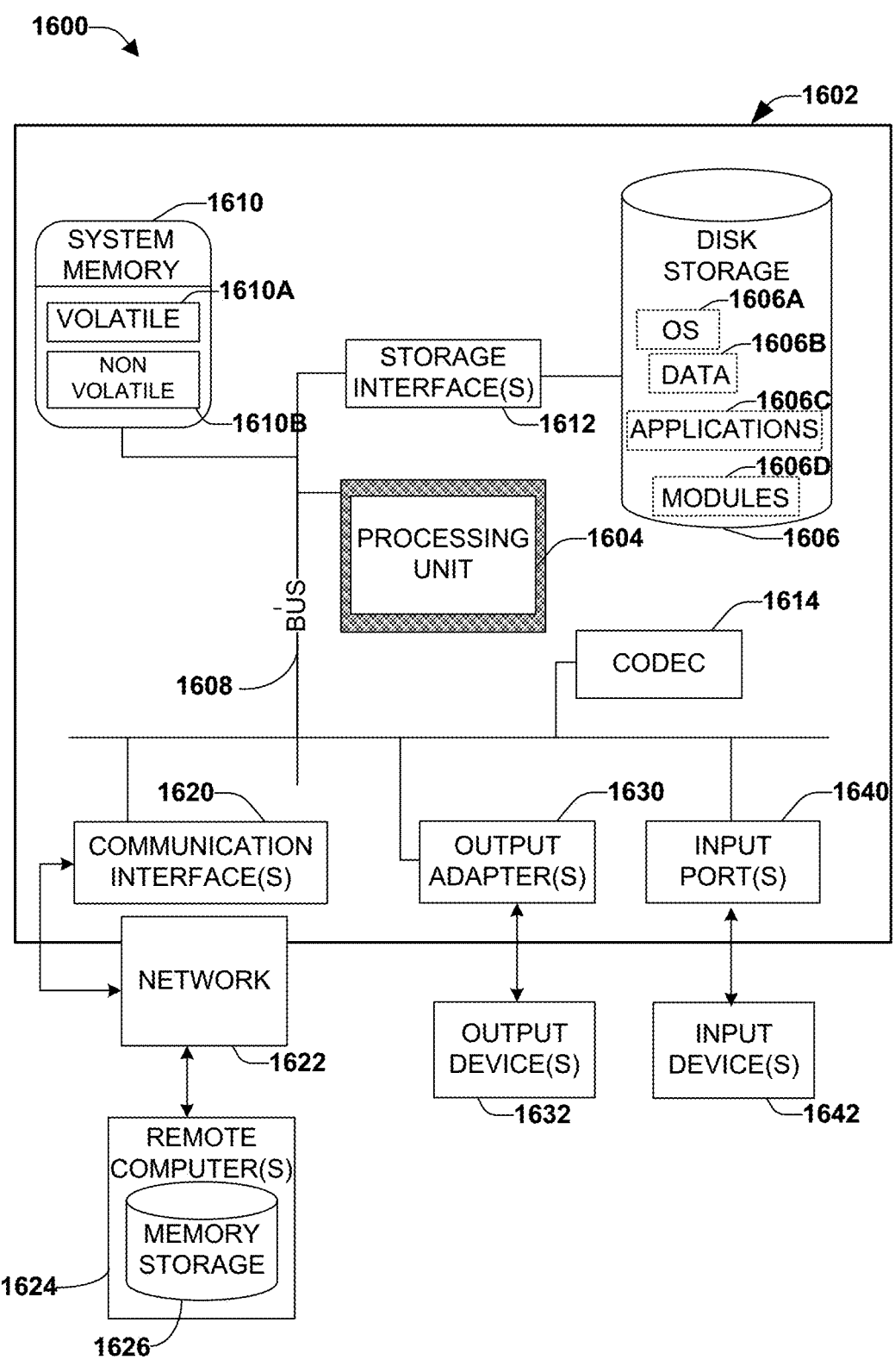
FIG. 16 depicts a diagram of an example computing environment for electronic and data management and computer control for a power equipment machine, in an embodiment.

It is to be appreciated that FIG. 16 describes software that can program computer 1602 to operate as an intermediary between an operator of a power equipment machine (e.g., power equipment machine 102, and others), or operate as an intermediary between the power equipment machine and an autonomous steering system (or partially autonomous, user-assisted steering system) for operating the power equipment machine embodied within operating environment 1600. Such software includes an operating system 1006A. Operating system 1606A, which can be stored on disk storage 1606, acts to control and allocate resources of the computer 1602. Applications 1606C take advantage of the management of resources by operating system 1606A through program modules 1606D, and program data 1606B, such as the boot/shutdown transaction table and the like, stored either in system memory 1610 or on disk storage 1606. It is to be appreciated that the claimed subject matter can be implemented with various operating systems or combinations of operating systems.

Input device(s) 1642 connects to the processing unit 1604 and facilitates operator interaction with operating environment 1600 through the system bus 1608 via interface port(s) 1630. Input port(s) 1640 can include, for example, a serial port, a parallel port, a game port, a universal serial bus (USB), among others. Output device(s) 1632 use some of the same type of ports as input device(s) 1642. Thus, for example, a USB port may be used to provide input to computer 1602 and to output information from computer 1602 to an output device 1632. Output adapter 1630 is provided to illustrate that there are some output devices, such as graphic display, speakers, and printers, among other output devices, which require special adapters. The output adapter 1630 can include, by way of illustration and not limitation, video and sound cards that provide a means of connection between the output device 1632 and the system bus 1608. It should be noted that other devices or systems of devices provide both input and output capabilities such as remote computer(s) 1624 and memory storage 1626.

Computer 1602 can operate in conjunction with one or more electronic devices described herein. For instance, computer 1602 can embody a power equipment control unit 502 configured to operate steering, drive and brake system 508 to provide user-assisted steering along defined paths, as described herein. Additionally, computer 1602 can communicatively couple with equipment state and location estimator 504, 708, 1504, etc., path generation module 506 or user input/output module 310, among other disclosed components and devices to generate steering data to maintain a target path, including position and direction of motion, of a power equipment device. Computer 1602 can communicatively couple with various disclosed components by way of a network interface 1622 (e.g., a wireless network interface, a wired network interface, a global positioning system (GPS) interface, and so forth), in an embodiment.

Communication connection(s) 1620 refers to the hardware/software employed to connect the network interface 1622 to the system bus 1608. While communication connection 1620 is shown for illustrative clarity inside computer 1602, it can also be external to computer 1602. The hardware/software necessary for connection to the network interface 1622 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for correcting real-time kinematic (RTK) global positioning data for a machine, comprising:

receiving, at one or more wireless devices of a direction control system, first real-time kinematic (RTK) position location data for a power equipment device in motion defining a first position location for the power equipment device;

acquiring, from a wireless positioning device of the one or more wireless devices, a fix RTK data status for the first RTK position location data;

receiving, at the one or more wireless devices, second RTK position location data for the power equipment device defining a second position location for the power equipment device;

acquiring, from the wireless positioning device, the fix RTK data status for the second RTK position location data;

determining, utilizing a processing device of the direction control system, a heading and speed of the power equipment device in motion from the first and second RTK position location data;

receiving, at the one or more wireless devices, third RTK position location data for the power equipment device defining a third position location for the power equipment device;

acquiring, from the wireless positioning device, a float RTK data status for the third RTK position location data;

determining, utilizing the processing device, an expected third position location for the power equipment device in motion independent of satellite signals following the acquiring the float RTK data status;

determining, utilizing the processing device, a correction factor at least in part from the expected third position location of the power equipment device determined independent of satellite signals and utilizing the correction factor to adjust subsequent RTK position location data for the power equipment device having the float RTK data status; and adjusting, by a steering controller of the power equipment device, a travel direction of the power equipment device at least in part based on the adjusted subsequent RTK position location data.

2. The method of claim 1, wherein determining, utilizing the processing device, the expected third position location for the power equipment device in motion further comprises obtaining, at the direction control system, an alternate third position location for the power equipment device from a secondary position location apparatus independent of the satellite signals and utilizing the alternate third position location for the expected third position location.

3. The method of claim 2, wherein generating the alternate third position location for the power equipment device in motion is in response to acquiring the float RTK data status for the third RTK position location data.

4. The method of claim 2, wherein generating the alternate third position location for the power equipment device in motion is part of regular alternate position location determinations of the secondary position location apparatus.

5. The method of claim 2, wherein the secondary position location apparatus comprises an inertial measurement unit (IMU) that includes a gyroscope, an accelerometer or a wheel odometer or a combination of the foregoing.

6. The method of claim 1, wherein determining, utilizing the processing device, the expected third position location further comprises:

extrapolating, utilizing the processing device, a position location for the power equipment device at least from the second RTK position location data, the speed and heading of the power equipment device and time between receiving the second RTK position location data having the fix RTK data status and receiving the third RTK position location data having the float RTK data status, the extrapolated position location being the expected third position location.

7. The method of claim 6, wherein determining, utilizing the processing device, the correction factor further comprises:

determining, utilizing the processing device, a displacement vector between the expected third position location and the third RTK position location having the float RTK data status;

subtracting, utilizing the processing device, the displacement vector from the third RTK position location having the float RTK data status; and generating, utilizing the processing device, corrected third RTK position location data for the power equipment device.

8. The method of claim 7, further comprising receiving, at the one or more wireless devices, subsequent RTK position location data having the float RTK data status and subtracting, utilizing the processing device, the displacement vector from the subsequent RTK position location data for determining a position location of the power equipment device.

9. The method of claim 1, further comprising receiving, at the one or more wireless devices, subsequent RTK position location data defining a subsequent position location for the power equipment device, the subsequent RTK position location data having the fix RTK data status.

10. The method of claim 9, further comprising terminating the adjusting subsequent RTK position location data for the power equipment device in response to receiving the subsequent RTK position location data having the fix RTK data status.

11. A method for determining position location of a powered machine, comprising:

tracking, via a wireless communication device of a direction control system operationally coupled to a drive and direction control unit of the powered machine, real-time kinematic (RTK) status for global positioning satellite (GPS) location data of a GPS antenna coupled to the powered machine;

saving discrete position data for instances of the GPS position location data and a respective time for each instance;

calculating contemporaneous speed and heading data for the powered machine from a plurality of the discrete position data over time;

identifying a change in RTK status from a fix RTK status to a float RTK status;

determining an expected position of the powered machine while in motion and independent from satellite signals from one or more discrete position data saved prior to identifying the change in RTK status, and from the speed and the heading;

determining a correction for the GPS position location data at least in part from the expected position; and modifying a subsequent GPS position location data having the float RTK status with the correction, wherein the drive and control unit of the powered machine adjusts a steering controller of the drive and control unit in response to the correction for the GPS position location data.

12. The method of claim 11, wherein determining the expected position of the powered machine further comprises receiving a further GPS position location data having the float RTK status following identifying the change in RTK status and determining a spatial difference in the expected position from the further GPS position location data.

13. The method of claim 12, wherein modifying the subsequent GPS position location data having the float RTK status further comprises subtracting the spatial difference from each of the subsequent GPS position location data to generate corrected GPS position location data for the powered machine.

14. The method of claim 11, further comprising receiving an additional GPS position location data having the fix RTK status following the identifying the change in RTK status.

15. The method of claim 14, further comprising terminating the modifying the subsequent GPS position location data with the correction following receiving the additional GPS position location data having the fix RTK status.

16. A method for determining position location of a powered machine, comprising:

tracking, via a wireless communication device of a direction control system operationally coupled to a drive and direction control unit of the powered machine, real-time kinematic (RTK) status for global positioning satellite (GPS) location data of a GPS antenna coupled to the powered machine;

saving discrete position data for instances of the GPS position location data and a respective time for each instance;

identifying a change in RTK status from a fix RTK status to a float RTK status;

receive a subsequent GPS location data at a subsequent time following the identifying the change in RTK status;

access an alternate position location apparatus of the powered machine and obtain an alternate position location independent of satellite signals for the powered machine in motion at the subsequent time;

determine a correction for the GPS position location data from the subsequent GPS location data and the alternate position location obtained independent of satellite signals for the powered machine in motion; and adjust subsequent GPS position location data having the float RTK status utilizing the correction, wherein the drive and control unit of the powered machine adjust a steering controller of the drive and control unit in response to the correction for the GPS position location data.

17. The method of claim 16, wherein obtaining the alternate position location is in response to identifying the change in RTK status from the fix RTK to the float RTK status.

18. The method of claim 16, wherein obtaining the alternate position location is in conjunction with regular generation of alternate position location data utilizing the alternate position location apparatus.

19. The method of claim 16, wherein the alternate position location apparatus comprises an inertial measurement unit (IMU) that includes a gyroscope, an accelerometer or a wheel odometer or a combination of the foregoing.

20. The method of claim 16, wherein determining the correction further comprises determining a spatial difference between the alternate position location and the subsequent GPS location data and adjusting subsequent GPS position location data having the float RTK status further comprises subtracting the spatial difference from respective position data of the subsequent GPS position location data.

* * * * *